(12) United States Patent
Do

(10) Patent No.: US 7,880,981 B2
(45) Date of Patent: Feb. 1, 2011

(54) IMAGING LENS

(75) Inventor: Satoshi Do, 1-2-56 Miyado, Asaka-shi, 351-0031, Saitama (JP)

(73) Assignees: Satoshi Do, Saitama (JP); Milestone Co., Ltd., Tokyo (JP)

( * ) Notice: Subject to any disclaimer, the term of this patent is extended or adjusted under 35 U.S.C. 154(b) by 0 days.

(21) Appl. No.: 12/225,967

(22) PCT Filed: Dec. 18, 2007

(86) PCT No.: PCT/JP2007/074293

§ 371 (c)(1),
(2), (4) Date: Oct. 3, 2008

(87) PCT Pub. No.: WO2008/139657

PCT Pub. Date: Nov. 20, 2008

(65) Prior Publication Data

US 2010/0165485 A1 Jul. 1, 2010

(30) Foreign Application Priority Data

May 9, 2007 (JP) ............................. 2007-124819

(51) Int. Cl.
*G02B 9/12* (2006.01)
*G02B 3/02* (2006.01)
*G02B 9/00* (2006.01)

(52) U.S. Cl. ........................ 359/784; 359/716; 359/739; 359/740

(58) Field of Classification Search .................. 359/716, 359/739, 740, 784, 785–792
See application file for complete search history.

(56) References Cited

U.S. PATENT DOCUMENTS 3,524,699 A 8/1970 Mori (Continued)

FOREIGN PATENT DOCUMENTS

EP 0 989 417 3/2000

(Continued)

OTHER PUBLICATIONS

International Search Report (Japanese), dated Mar. 18, 2008.

(Continued)

*Primary Examiner*—Jack Dinh
(74) *Attorney, Agent, or Firm*—Venable LLP; Jeffri A. Kaminski

(57) ABSTRACT

The present invention is an imaging lens of which optical performance does not deteriorate even in a high temperature environment, various aberrations are well corrected, optical length is short, and back focus is sufficiently secured, the imaging lens comprising a first lens 14, an aperture stop S, a second lens 16, and a third lens 18, which are arranged in this sequence from an object side to an image side. For the first lens, a single lens is used. The second lens comprises a first sub-lens $L_1$, a second sub-lens $L_2$ and a third sub-lens $L_3$, arranged in this sequence from the object side to the image side. The third lens comprises a fourth sub-lens $L_4$, a fifth sub-lens $L_5$ and a sixth sub-lens $L_6$, arranged in this sequence from the object side to the image side. The first lens is formed of a transparent curable silicone resin, and the first, third, fourth and sixth sub-lenses are also formed of the transparent curable silicone resin. The second sub-lens and the fifth sub-lens are formed of a high softening temperature glass material.

19 Claims, 28 Drawing Sheets

U.S. PATENT DOCUMENTS

| | | |
|---|---|---|
| 5,321,550 A | 6/1994 | Maruyama et al. |
| 5,808,808 A | 9/1998 | Yamanashi |
| 6,498,689 B2 | 12/2002 | Katsuma |
| 6,551,530 B2 | 4/2003 | Koizumi et al. |
| 6,560,037 B2 | 5/2003 | Dou |
| 6,862,804 B2 | 3/2005 | Nishio et al. |
| 7,342,731 B2 | 3/2008 | Lee et al. |
| 2006/0050399 A1 | 3/2006 | Nakagawa |

FOREIGN PATENT DOCUMENTS

| | | |
|---|---|---|
| JP | 58-26003 | 2/1983 |
| JP | 59-046601 | 3/1984 |
| JP | 61-203401 | 9/1986 |
| JP | 2001-242308 | 9/2001 |
| JP | 2001-305309 | 10/2001 |
| JP | 2002-055274 | 2/2002 |
| JP | 2002-154169 | 5/2002 |
| JP | 2002-154170 | 5/2002 |
| JP | 2003-311757 | 11/2003 |
| JP | 2004-053834 | 2/2004 |
| JP | 2004-328474 | 11/2004 |
| JP | 2005-067999 | 3/2005 |
| JP | 2005-084273 | 3/2005 |
| JP | 2005-258239 | 9/2005 |
| JP | 2005-305938 | 11/2005 |
| JP | 2006-121079 | 5/2006 |
| JP | 2006-133270 | 5/2006 |
| JP | 2006-195053 | 7/2006 |
| JP | 2006-308669 | 11/2006 |
| JP | 2006-337731 | 12/2006 |

OTHER PUBLICATIONS

Official Notification of Reasons for Refusal (Japanese Office Action) dated Jun. 19, 2007 for priority application No. JP 2007-124819.

(A)

(B)

(C)

IMAGING LENS

TECHNICAL FIELD

The present invention relates to an imaging lens, and more particularly to an imaging lens that can be suitably mounted on a portable telephone or the like.

BACKGROUND ART

In a portable telephone with a built-in digital camera, an imaging lens is mounted on a printed circuit board. As a method for mounting an imaging lens on a printed circuit board, a reflow soldering processing is used. Hereafter the reflow soldering processing may simply be called "reflow processing". Reflow processing is a method for soldering an electronic component by placing a solder ball in advance at a location where the electronic component is connected, placing the electronic component there, heating to melt the solder ball, then cooling the solder down.

Generally in mass production steps, a reflow step for performing reflow processing is used as a method for mounting electronic elements or such components as an imaging lens on a printed circuit board. If the reflow step is used, the mounting cost of components on a printed circuit board can be decreased, and manufacturing quality can be maintained at a predetermined level.

In the reflow step of the manufacturing steps of a portable telephone comprising an imaging lens, not only are electronic components arranged at predetermined positions on a printed circuit board, but also the imaging lens itself or a socket for installing the imaging lens is disposed on the printed circuit board.

The imaging lens installed in portable telephones are largely made of plastic in order to decrease the manufacturing cost, and to insure lens performance. Therefore a heat resistant socket component is used for installing an imaging lens in order to prevent thermal deformation of the imaging lens in a high temperature environment, which makes it impossible to maintain optimal performance thereof.

In other words, in the reflow step, a heat resistant socket component for installing an imaging lens is mounted on the printed circuit board of the portable telephone, and the imaging lens is installed on this socket after the reflow step ends, so that the imaging lens is not exposed to high temperature in the reflow step (e.g. see Patent Documents 1 to 3). However, using a heat resistant socket component for installing an imaging lens makes the manufacturing steps complicated, and increases the manufacturing cost, including the cost of this heat resistant socket.

A recent demand is that the optical performance of an imaging lens installed in a portable telephone does not deteriorate even if the portable telephone itself is placed in about a 150° C. high temperature environment, considering the case of a portable telephone being left in an automobile which temporarily becomes a high temperature environment. A conventional imaging lens made of plastic material cannot meet this demand.

In order to implement an imaging lens of which optical performance is maintained even in a high temperature environment, forming an imaging lens using a high softening temperature mold glass material is possible (e.g. see Patent Document 4). According to this, the deterioration of optical performance of an imaging lens in a high temperature environment can be avoided, since the temperature for the high softening temperature mold glass material to be softened is several hundred degrees or more, but at the moment an imaging lens made of mold glass material is not very popular, because the manufacturing cost is very high.

In addition to the above mentioned thermal characteristics, an imaging lens installed in a portable telephone must satisfy the following conditions related to optical characteristics. One condition is that the optical length must be short. The optical length is a distance from an entrance plane at an object side to an image formation plane (may also be called "image sensing plane") of the imaging lens. In other words, when a lens is designed, the ratio of the optical length to the composite focal distance of the imaging lens must be minimized. In the case of a portable telephone, for example, this optical length must at least be shorter than the thickness of the portable telephone main unit.

On the other hand, a back focus, which is defined as a distance from the outgoing plane at the image side to the image sensing plane of the imaging lens, should be as long as possible. In other words, when the lens is designed, the ratio of the back focus to the focal distance must be maximized. This is because such components as a filter and a cover glass must be inserted between the imaging lens and the image sensing plane.

In addition to this, it is naturally demanded for the imaging lens that various aberrations are corrected to be small enough that the distortion of the image is not visually recognized, and the integration density of the elements in minimal units (also called "pixels"), which are arranged in a matrix on the light receiving plane of a CCD (Charge Coupled Device) image sensor, is sufficiently satisfied. In other words, various aberrations of the imaging lens must be well corrected. Hereafter, an image, of which various aberrations are well corrected, may be called a "good image".

Patent Document 1: Japanese Patent Application Laid-Open No. 2006-121079 (Patent No. 3799615)

Patent Document 2: Japanese Patent Application Laid-Open No. 2004-328474 (Patent No. 3915733)

Patent Document 3: Japanese Patent Application Laid-Open No. 2004-063787 (Patent No. 3755149)

Patent Document 4: Japanese Patent Application Laid-Open No. 2005-067999

DISCLOSURE OF THE INVENTION

Problems to be Solved by the Invention

With the foregoing in view, it is an object of the present invention to provide an imaging lens suitable for being installed in a portable telephone, and of which heat resistance is guaranteed, and optical performance does not deteriorate even in a reflow step, or even if the imaging lens is installed in a portable telephone and is temporarily placed in a maximum temperature environment of the design specifications.

It is another object of the present invention to provide an imaging lens of which optical length is short enough to be installed in a portable telephone, of which back focus is long enough to insert such components as a filter and a cover glass between the imaging lens and the image sensing plane, and with which good images can be acquired.

Means for Solving the Problems

To achieve the above objects, an imaging lens of a first aspect of the present invention is constructed as follows. In other words, the imaging lens of the first aspect of the present invention comprises a first lens, second lens and a third lens.

One of the first lens, the second lens and the third lens is a single lens formed of a curable resin material or a high softening temperature optical lens formation material. One of the remaining two lenses is a junction type compound lens comprising three sub-lenses, which are, a first sub-lens, a second sub-lens and a third sub-lens bonded in this sequence, and the other one of the two lenses is a junction type compound lens comprising three sub-lenses, that is, a fourth sub-lens, a fifth sub-lens and a sixth sub-lens bonded in this sequence. In each of the two junction type compound lenses, the first sub-lens and the third sub-lens are formed of a curable resin material, the second sub-lens is formed of a high softening temperature optical lens formation material, the fourth sub-lens and the sixth sub-lens are formed of a curable resin material, and the fifth sub-lens is formed of a high softening temperature optical lens formation material. The imaging lens of the first aspect of the present invention satisfies the following Conditions (a-1) to (a-8).

$$0 \leq |N_2 - N_1| \leq 0.1 \quad \text{(a-1)}$$

$$0 \leq |N_2 - N_3| \leq 0.1 \quad \text{(a-2)}$$

$$0 \leq |\nu_2 - \nu_1| \leq 30.0 \quad \text{(a-3)}$$

$$0 \leq |\nu_2 - \nu_3| \leq 30.0 \quad \text{(a-4)}$$

$$0 \leq |N_5 - N_4| \leq 0.1 \quad \text{(a-5)}$$

$$0 \leq |N_5 - N_6| \leq 0.1 \quad \text{(a-6)}$$

$$0 \leq |\nu_5 - \nu_4| \leq 30.0 \quad \text{(a-7)}$$

$$0 \leq |\nu_5 - \nu_6| \leq 30.0 \quad \text{(a-8)}$$

where $N_1$: refractive index of the first sub-lens $N_2$: refractive index of the second sub-lens $N_3$: refractive index of the third sub-lens $\nu_1$: Abbe number of the first sub-lens $\nu_2$: Abbe number of the second sub-lens $\nu_3$: Abbe number of the third sub-lens $N_4$: refractive index of the fourth sub-lens $N_5$: refractive index of the fifth sub-lens $N_6$: refractive index of the sixth sub-lens $\nu_4$: Abbe number of the fourth sub-lens $\nu_5$: Abbe number of the fifth sub-lens $\nu_6$: Abbe number of the sixth sub-lens An imaging lens of a second aspect of the present invention is constructed as follows. In other words, the imaging lens of the second aspect of the present invention comprises a first lens, a second lens and a third lens. Two lenses out of the first lens, the second lens and the third lens are single lenses formed of a curable resin material or a high softening temperature optical lens formation material. The remaining one lens is a junction type compound lens comprising three sub-lenses of a first sub-lens, a second sub-lens and a third sub-lens bonded in this sequence. In this junction type compound lens, the first sub-lens and the third sub-lens are formed of a curable resin material, and the second sub-lens is formed of a high softening temperature optical lens formation material. The imaging lens of the second aspect of the present invention satisfies the following Conditions (b-1) to (b-4).

$$0 \leq |N_2 - N_1| \leq 0.1 \quad \text{(b-1)}$$

$$0 \leq |N_2 - N_3| \leq 0.1 \quad \text{(b-2)}$$

$$0 \leq |\nu_2 - \nu_1| \leq 30.0 \quad \text{(b-3)}$$

$$0 \leq |\nu_2 - \nu_3| \leq 30.0 \quad \text{(b-4)}$$

where $N_1$: refractive index of the first sub-lens $N_2$: refractive index of the second sub-lens $N_3$: refractive index of the third sub-lens $\nu_1$: Abbe number of the first sub-lens $\nu_2$: Abbe number of the second sub-lens $\nu_3$: Abbe number of the third sub-lens The curable resin material here refers to both a thermosetting resin material and a UV curable resin material. The high softening temperature optical lens formation material refers to a high softening temperature mold glass material or an optical glass such as a later mentioned BK7.

The second sub-lens formed of an optical glass and the first sub-lens or the third sub-lens formed of a curable resin material are bonded as follows. A curable resin in a liquid state is contacted to the second sub-lens formed of optical glass, and the first sub-lens or the third sub-lens is bonded to the second sub-lens by solidifying, that is by curing, this curable resin. This bonding may be called a "direct bonding" herein below. The second sub-lens and the first sub-lens or the third sub-lens may be bonded by using an adhesive between the second sub-lens and the first sub-lens or the third sub-lens. This bonding may be called an "indirect bonding" herein below.

When indirect bonding is implemented, the reflection in the interface between the second sub-lens and the first sub-lens or the third sub-lens can be decreased if the adhesive is selected so that the optical characteristics of the adhesive an be actively utilized, such as selecting an appropriate refractive index of the adhesive with respect to the refractive index of the optical glass and the refractive index of the curable resin material. If coating processing is performed on the surface of the second sub-lens facing the first sub-lens or the third sub-lens, and these lenses are bonded, whether the adhesive is used there or not, then the reflection in the interface with the first sub-lens (or third sub-lens) can be decreased.

In other words, bonding sub-lenses includes not only direct bonding, which bonds sub-lenses without using adhesive, but also indirect bonding, which is implemented by using adhesive between sub-lenses.

The imaging lens of this invention is, more concretely, constructed as a first to sixth imaging lenses.

The first imaging lens comprises a first lens, an aperture stop, a second lens and a third lens, which are arranged in the sequence of the first lens, the aperture stop, the second lens and the third lens, from the object side to the image side.

The first lens is a meniscus type single lens of which convex surface faces the object side on a paraxial line. The second lens is a junction type compound lens where a first sub-lens, a second sub-lens and a third sub-lens are arranged in this sequence from the object side to the image side, and the first sub-lens and the second sub-lens are bonded, and the second sub-lens and the third sub-lens are bonded. The third sub-lens is a junction type compound lens where a fourth sub-lens, a fifth sub-lens and a sixth sub-lens are arranged in this sequence from the object side to the image side, and the fourth sub-lens and the fifth sub-lens are bonded, and the fifth sub-lens and the sixth sub-lens are bonded.

The first lens is formed of a curable resin material or a high softening temperature optical lens formation material, the first sub-lens, the third sub-lens, the fourth sub-lens and the sixth sub-lens are formed of a curable resin material, and the second sub-lens and the fifth sub-lens are formed of a high softening temperature optical lens formation material.

The first imaging lens satisfies the following Conditions (1-1) to (1-8).

$$0 \leq |N_5 - N_4| \leq 0.1 \tag{1-1}$$

$$0 \leq |N_5 - N_6| \leq 0.1 \tag{1-2}$$

$$0 \leq |\nu_5 - \nu_4| \leq 30.0 \tag{1-3}$$

$$0 \leq |\nu_5 - \nu_6| \leq 30.0 \tag{1-4}$$

$$0 \leq |N_9 - N_8| \leq 0.1 \tag{1-5}$$

$$0 \leq |N_9 - N_{10}| \leq 0.1 \tag{1-6}$$

$$0 \leq |\nu_9 - \nu_8| \leq 30.0 \tag{1-7}$$

$$0 \leq |\nu_9 - \nu_{10}| \leq 30.0 \tag{1-8}$$

where $N_4$: refractive index of the first sub-lens $N_5$: refractive index of the second sub-lens $N_6$: refractive index of the third sub-lens $\nu_4$: Abbe number of the first sub-lens $\nu_5$: Abbe number of the second sub-lens $\nu_6$: Abbe number of the third sub-lens $N_8$: refractive index of the fourth sub-lens $N_9$: refractive index of the fifth sub-lens $N_{10}$: refractive index of the sixth sub-lens $\nu_8$: Abbe number of the fourth sub-lens $\nu_9$: Abbe number of the fifth sub-lens $\nu_{10}$: Abbe number of the sixth sub-lens It is preferable that the first imaging lens is constructed as follows. In other words, it is preferable that the first to the third sub-lenses and the fourth to the sixth sub-lenses constituting the second lens and the third lens, which are composing elements of the first imaging lens, are constructed respectively as follows.

Out of the sub-lenses constituting the second lens, the second sub-lens is a plane parallel glass plate, the first sub-lens is a plano-concave lens where the object side face of this first sub-lens is a concave surface facing the object side on a paraxial line, and the third sub-lens is a plano-convex lens where the image side face of this third sub-lens is a convex surface facing the image side as a paraxial line. The plane parallel glass plate may also be called an "optical-parallel glass plate". A plane parallel glass plate is normally not referred to as a lens, but in this description, a plane parallel glass plate may be included in a lens for convenience, regarding this as a special case where the radius of curvature of the lens surface is infinite.

Out of the sub-lenses constituting the third lens, the fifth sub-lens is a plane parallel glass plate, the fourth sub-lens is a plano-convex lens where the object side face of this fourth sub-lens is a convex surface facing the object side on a paraxial line, and the sixth sub-lens is a plano-concave lens where the image side face of this sixth sub-lens is a concave surface facing the image side on a paraxial line.

It is preferable that the first imaging lens is constructed as follows. In other words, it is preferable that the first to the sixth sub-lenses constituting the second lens and the third lens, which are composing elements of the first imaging lens, are constructed as follows.

Out of the sub-lenses constituting the second lens, the second sub-lens is a meniscus lens of which convex surface is facing the image side, the first sub-lens is a lens where the object side face of this first sub-lens is a concave surface facing the object side on a paraxial line, and the third sub-lens is a lens where the image side face of this third sub-lens is a convex surface facing the image side on a paraxial line.

Out of the sub-lenses constituting the third lens, the fifth sub-lens is a biconvex lens of which both side faces are convex surfaces, the fourth sub-lens is a lens where the object side face of this fourth sub-lens is a convex surface facing the object side on a paraxial line, and the sixth sub-lens is a lens where the image side face of this sixth sub-lens is a concave surface facing the image side on a paraxial line.

The second imaging lens comprises an aperture stop (first diaphragm), a first lens, a second diaphragm, a second lens and a third lens, which are arranged in the sequence of the aperture stop, the first lens, the second diaphragm, the second lens and the third lens from the object side to the image side.

The first lens is a junction type compound lens, where a first sub-lens, a second sub-lens and a third sub-lens are arranged in this sequence from the object side to the image side, the first sub-lens and the second sub-lens are bonded, and the second sub-lens and the third sub-lens are bonded. The second lens is a meniscus type single lens of which convex surface faces the image side on a paraxial line. The third lens is a junction type compound lens, where a fourth sub-lens, a fifth sub-lens and a sixth sub-lens are arranged in this sequence from the object side to the image side, the fourth sub-lens and the fifth sub-lens are bonded, and the fifth sub-lens and the sixth sub-lens are bonded.

The first sub-lens, the third sub-lens, the fourth sub-lens and the sixth sub-lens are formed of a curable resin material, the second lens is formed of a curable resin material or a high softening temperature optical lens formation material, and the second sub-lens and the fifth sub-lens are formed of a high softening temperature optical lens formation material.

The second imaging lens satisfies the following Conditions (2-1) to (2-8).

$$0 \leq |N_3 - N_2| \leq 0.1 \tag{2-1}$$

$$0 \leq |N_3 - N_4| \leq 0.1 \tag{2-2}$$

$$0 \leq |\nu_3 - \nu_2| \leq 30.0 \tag{2-3}$$

$$0 \leq |\nu_3 - \nu_4| \leq 30.0 \tag{2-4}$$

$$0 \leq |N_{10} - N_9| \leq 0.1 \tag{2-5}$$

$$0 \leq |N_{10} - N_{11}| \leq 0.1 \tag{2-6}$$

$$0 \leq |\nu_{10} - \nu_9| \leq 30.0 \tag{2-7}$$

$$0 \leq |\nu_{10} - \nu_{11}| \leq 30.0 \tag{2-8}$$

where $N_2$: refractive index of the first sub-lens $N_3$: refractive index of the second sub-lens $N_4$: refractive index of the third sub-lens $\nu_2$: Abbe number of the first sub-lens $\nu_3$: Abbe number of the second sub-lens $\nu_4$: Abbe number of the third sub-lens $N_9$: refractive index of the fourth sub-lens $N_{10}$: refractive index of the fifth sub-lens $N_{11}$: refractive index of the sixth sub-lens $\nu_9$: Abbe number of the fourth sub-lens $\nu_{10}$: Abbe number of the fifth sub-lens $\nu_{11}$: Abbe number of the sixth sub-lens It is preferable that the second imaging lens is constructed as follows. In other words, it is preferable that the first to the third sub-lenses and the fourth to the sixth sub-lenses constituting the first and third lenses, which are composing elements of the second imaging lens, are constructed respectively as follows.

Out of the sub-lenses constituting the first lens, the second sub-lens is a plane parallel glass plate, the first sub-lens is a plano-convex lens where the object side face of this first sub-lens is a convex surface facing the object side on a paraxial line, and the third sub-lens is a plano-convex lens where the image side face of this third sub-lens is a convex surface facing the image side on a paraxial line.

Out of the sub-lenses constituting the third lens, the fifth sub-lens is a plano-parallel glass plate, the fourth sub-lens is a plano-convex lens where the object side face of this fourth sub-lens is a convex surface facing the object side on a paraxial line, and the sixth sub-lens is a plano-concave lens where the image side face of this sixth sub-lens is a concave surface facing the image side on a paraxial line.

It is preferable that the second imaging lens is constructed as follows. In other words, it is preferable that the first to the sixth sub-lenses constituting the first and third lenses, which are composing elements of the second imaging lens, are constructed as follows.

Out of the sub-lenses constituting the first lens, the second sub-lens is a biconvex lens of which both side faces are convex surfaces, the first sub-lens is a lens where the object side face of this first sub-lens is the convex surface facing the object side on a paraxial line, and the third sub-lens is a lens where the image side face of this third sub-lens is the convex surface facing the image side on a paraxial line.

Out of the sub-lenses constituting the third lens, the fifth sub-lens is a meniscus lens of which the convex surface faces the image side, the fourth sub-lens is a lens where the object side face of this fourth sub-lens is a convex surface facing the object side on a paraxial line, and the sixth sub-lens is a lens where the image side face of this sixth sub-lens is a concave surface facing the image side on a paraxial line.

The third imaging lens comprises an aperture stop (first diaphragm), a first lens, a second diaphragm, a second lens and a third lens, which are arranged in the sequence of the aperture stop, the first lens, the second diaphragm, the second lens and the third lens from the object side to the image side.

The first lens is a junction type compound lens where a first sub-lens, a second sub-lens and a third sub-lens are arranged in this sequence from the object side to the image side, the first sub-lens and the second sub-lens are bonded, and the second sub-lens and the third sub-lens are bonded. The second lens is a junction type compound lens, where a fourth sub-lens, a fifth sub-lens and a sixth sub-lens are arranged in this sequence from the object side to the image side, the fourth sub-lens and the fifth sub-lens are bonded, and the fifth sub-lens and the sixth sub-lens are bonded. The third lens is a meniscus type single lens, of which concave surface faces the image side.

The first sub-lens, the third sub-lens, the fourth sub-lens and the sixth sub-lens are formed of a curable resin material, the second sub-lens and the fifth sub-lens are formed of a high softening temperature optical lens formation material, and the third lens is formed of a curable resin material or a high softening temperature optical lens formation material.

The third imaging lens satisfies the following Conditions (3-1) to (3-8).

$$0 \leq |N_3 - N_2| \leq 0.1 \quad (3\text{-}1)$$

$$0 \leq |N_3 - N_4| \leq 0.1 \quad (3\text{-}2)$$

$$0 \leq |\nu_3 - \nu_2| \leq 30.0 \quad (3\text{-}3)$$

$$0 \leq |\nu_3 - \nu_4| \leq 30.0 \quad (3\text{-}4)$$

$$0 \leq |N_8 - N_7| \leq 0.1 \quad (3\text{-}5)$$

$$0 \leq |N_8 - N_9| \leq 0.1 \quad (3\text{-}6)$$

$$0 \leq |\nu_8 - \nu_7| \leq 30.0 \quad (3\text{-}7)$$

$$0 \leq |\nu_8 - \nu_9| \leq 30.0 \quad (3\text{-}8)$$

where $N_2$: refractive index of the first sub-lens $N_3$: refractive index of the second sub-lens $N_4$: refractive index of the third sub-lens $\nu_2$: Abbe number of the first sub-lens $\nu_3$: Abbe number of the second sub-lens $\nu_4$: Abbe number of the third sub-lens $N_7$: refractive index of the fourth sub-lens $N_8$: refractive index of the fifth sub-lens $N_9$: refractive index of the sixth sub-lens $\nu_7$: Abbe number of the fourth sub-lens $\nu_8$: Abbe number of the fifth sub-lens $\nu_9$: Abbe number of the sixth sub-lens It is preferable that the third imaging lens is constructed as follows. In other words, it is preferable that the first to the third sub-lenses and the fourth to the sixth sub-lenses constituting the first and second imaging lenses, which are composing elements of the third imaging lens, are constructed respectively as follows.

Out of the sub-lenses constituting the first lens, the second sub-lens is a plane parallel glass plate, the first sub-lens is a plano-convex lens where the object side face of this first sub-lens is a convex surface facing the object side on a paraxial line, and the third sub-lens is a plano-convex lens where the image side face of this third sub-lens is a convex surface facing the image side on a paraxial line.

Out of the sub-lenses constituting the second lens, the fifth sub-lens is a plane parallel glass plate, the fourth sub-lens is a plano-concave lens where the object side face of this fourth sub-lens is a concave surface facing the object side on a paraxial line, and the sixth sub-lens is a plano-convex lens where the image side face of this sixth sub-lens is a convex surface facing the image side on a paraxial line.

It is preferable that the third imaging lens is constructed as follows. In other words, it is preferable that the first to the sixth sub-lenses constituting the first and second lenses, which are composing elements of the third imaging lens, are constructed as follows.

The second sub-lens is a biconvex lens of which both side faces are convex surfaces, the first sub-lens is a lens where the object side face of this first sub-lens is a convex surface facing the object side on a paraxial line, and the third sub-lens is a lens where the image side face of this third sub-lens is a convex surface facing the image side on a paraxial line. The fifth sub-lens is a meniscus lens of which convex surface faces the image side, the fourth sub-lens is a lens where the object side face of this fourth sub-lens is a concave surface facing the object side on a paraxial line, and the sixth sub-lens is a lens where the image side face of this sixth sub-lens is a convex surface facing the image side on a paraxial line.

The fourth imaging lens comprises a first lens, an aperture stop, a second lens and a third lens, which are arranged in the sequence of the first lens, the aperture stop, the second lens and the third lens from the object side to the image side. The first lens is a meniscus type single lens of which convex surface faces the object side on a paraxial line, and the second lens is a meniscus type single lens of which convex surface faces the image side on a paraxial line. The third lens is a junction type compound lens, where the first sub-lens, a second sub-lens and a third sub-lens are arranged in this sequence from the object side to the image side, and the first sub-lens and the second sub-lens are bonded, and the second sub-lens and the third sub-lens are bonded.

The first lens, the second lens, the first sub-lens and the third sub-lens are formed of a curable resin material, and the second sub-lens is formed of a high softening temperature optical lens formation material.

The fourth imaging lens satisfies the following Conditions (4-1) to (4-4).

$$0 \leq |N_7 - N_6| \leq 0.1 \quad (4\text{-}1)$$

$$0 \leq |N_7 - N_8| \leq 0.1 \quad (4\text{-}2)$$

$$0 \leq |v_7 - v_6| \leq 30.0 \quad (4\text{-}3)$$

$$0 \leq |v_7 - v_8| \leq 30.0 \quad (4\text{-}4)$$

where $N_6$: refractive index of the first sub-lens $N_7$: refractive index of the second sub-lens $N_8$: refractive index of the third sub-lens $v_6$: Abbe number of the first sub-lens $v_7$: Abbe number of the second sub-lens $v_8$: Abbe number of the third sub-lens It is preferable that the fourth imaging lens is constructed as follows. In other words, it is preferable that the first to the third sub-lenses constituting the third lens, which is a composing element of the fourth imaging lens, are constructed as follows.

The second sub-lens constituting the third lens is a plane parallel glass plate, the first sub-lens is a plano-convex lens where the object side face of this first sub-lens is a convex surface facing the object side on a paraxial line, and the third sub-lens is a plano-concave lens where the image side face of this third sub-lens is a concave surface facing the image side on a paraxial line.

The fifth imaging lens comprises an aperture stop (first diaphragm), a first lens, a second diaphragm, a second lens and a third lens, which are arranged in the sequence of the aperture stop, the first lens, the second diaphragm, the second lens and the third lens from the object side to the image side. The first lens is a biconvex lens of which both side faces are convex surfaces. The second lens is a junction type compound lens, where a first sub-lens, a second sub-lens and a third sub-lens are arranged in this sequence from the object side to the image side, the first sub-lens and the second sub-lens are bonded, and the second sub-lens and the third sub-lens are bonded. The third lens is a meniscus type single lens of which concave surface faces the image side on a paraxial line.

The first lens, the first sub-lens and the third sub-lens are formed of a curable resin material, and the second sub-lens and the third sub-lens are formed of a high softening temperature optical lens formation material.

The fifth imaging lens satisfies the following Conditions (5-1) to (5-4).

$$0 \leq |N_6 - N_5| \leq 0.1 \quad (5\text{-}1)$$

$$0 \leq |N_6 - N_7| \leq 0.1 \quad (5\text{-}2)$$

$$0 \leq |v_6 - v_5| \leq 30.0 \quad (5\text{-}3)$$

$$0 \leq |v_6 - v_7| \leq 30.0 \quad (5\text{-}4)$$

where $N_5$: refractive index of the first sub-lens $N_6$: refractive index of the second sub-lens $N_7$: refractive index of the third sub-lens $v_5$: Abbe number of the first sub-lens $v_6$: Abbe number of the second sub-lens $v_7$: Abbe number of the third sub-lens It is preferable that the fifth imaging lens is constructed as follows. In other words, the second sub-lens, which is a composing element of the fifth imaging lens, is a plane parallel glass plate, the first sub-lens is a plano-concave lens where the object side face of this first sub-lens is a concave surface facing the object side on a paraxial line, and the third sub-lens is a plano-convex lens where the image side face of this third sub-lens is a convex surface facing the image side on a paraxial line.

The sixth imaging lens comprises an aperture stop (first diaphragm), a first lens, a second diaphragm, a second lens and a third lens, which are arranged in the sequence of the aperture stop, the first lens, the second diaphragm, the second lens and the third lens from the object side to the image side.

The first lens is a junction type compound lens where a first sub-lens, a second sub-lens and a third sub-lens are arranged in this sequence from the object side to the image side, the first sub-lens and the second sub-lens are bonded, and the second sub-lens and the third sub-lens are bonded. The second lens is a meniscus type single lens of which convex surface faces the image side on a paraxial side, and the third lens is a meniscus type single lens of which concave surface faces the image side on a paraxial line.

The first sub-lens, the third sub-lens and the second lens are formed of a curable resin material, and the second sub-lens and the third lens are formed by a high softening temperature optical lens formation material.

The sixth imaging lens satisfies the following Conditions (6-1) to (6-4).

$$0 \leq |N_3 - N_2| \leq 0.1 \quad (6\text{-}1)$$

$$0 \leq |N_3 - N_4| \leq 0.1 \quad (6\text{-}2)$$

$$0 \leq |\nu_3 - \nu_2| \leq 30.0 \quad (6\text{-}3)$$

$$0 \leq |\nu_3 - \nu_4| \leq 30.0 \quad (6\text{-}4)$$

where $N_2$: refractive index of the first sub-lens $N_3$: refractive index of the second sub-lens $N_4$: refractive index of the third sub-lens $\nu_2$: Abbe number of the first sub-lens $\nu_3$: Abbe number of the second sub-lens $\nu_4$: Abbe number of the third sub-lens It is preferable that the sixth imaging lens is constructed as follows. In other words, the second sub-lens, which is a composing element of the sixth imaging lens, is a plane parallel glass plate, the first sub-lens is a plano-convex lens where the object side face of this first sub-lens is a convex surface facing the object side on a paraxial line, and the third sub-lens is a plano-convex lens where the image side face of this third sub-lens is a convex surface facing the image side face on a paraxial line.

When the first to the sixth imaging lenses of the present invention are formed, it is preferable that the object side face of the first lens, the image side face of the first lens, the object side face of the second lens, the image side face of the second lens, the object side face of the third lens and the image side face of the third lens are aspherical.

When the first to the sixth imaging lenses of the present invention are formed, it is preferable that the curable resin material is a transparent curable silicone resin. "Transparent" indicates that the light absorption of visible light is small (transparent) enough to have no influence on practical use.

EFFECT OF THE INVENTION

The imaging lens of the present invention has two aspects: an imaging lens of the first aspect and an imaging lens of the second aspect. The imaging lens of the first aspect is comprised of one single lens and two junction type compound lenses. The imaging lens of the second aspect is comprised of two single lenses and one junction type compound lens.

Now the configuration and the function of one junction type compound lens which is for the imaging lens of the present invention will be described.

In the junction type compound lens constituting the imaging lens of the first or second aspect of the present invention, the first and third sub-lenses, which are formed of a curable resin material, sandwich and are bonded to the second sub-lens, which is formed of a high softening temperature glass material.

The high softening temperature glass material refers to a glass material of which softening temperature is higher than the temperature in the reflow processing and the maximum environment temperature in the design specifications of the junction type compound lens. In the following description, the phrase "high softening temperature glass material" is used when the thermal characteristic of the glass material is discussed, and the simple phrase "optical glass material" may be used when an optical characteristic is discussed.

Once curing processing is performed, the curable resin material is not softened even if the temperature becomes high. This nature of the curable resin material is different from a plasticizing resin material, such as a plastic material, which is softened and plasticized when the material is exposed to a predetermined or higher temperature, which is called a "softening temperature" (also called glass transition temperature). In other words, once the curing processing is performed and material solidifies, the geometric shape of the curable resin material does not change.

Therefore even if the first sub-lens and the third sub-lens are placed in a high temperature environment, the geometric shape of the lens does not change, and the optical performance thereof does not deteriorate. The single lens constituting the imaging lens of the first or second aspect of the present invention as well is formed of a curable resin material or a high softening temperature glass material, so the optical performance thereof does not deteriorate even under a high temperature environment. "High temperature environment" refers to a temperature environment of which temperature is higher than the temperature in the reflow processing and the maximum temperature in the design specifications of the junction type compound lens.

Therefore the optical performance of the junction type compound lens and single lens used for the imaging lens of this invention is guaranteed even in the reflow step and in a high temperature environment, which is a maximum temperature expected when the imaging lens is used.

According to the imaging lens of the first aspect of this invention, imaging lens comprises the first lens, the second lens and the third lens, and one of the first lens, the second lens and the third lens is a single lens formed of a curable resin material or a high softening temperature optical lens formation material. According to the imaging lens of the second aspect of this invention, the imaging lens comprises the first lens, the second lens and the third lens, and two of the first lens, the second lens and the third lens are single lenses formed of a curable resin material or a high softening temperature optical lens formation material.

The thickness of a single lens can be thinner than that of the junction type compound lens, so by subjecting any one or two of composing lenses from among the three composing lenses, which are the first to the third lenses that constitute the imaging lens of this invention, to a single lens, any one of the first to the third lenses, which are the composing lenses, can be a lens with a reduced thickness. As a result, the optical length of the imaging lens can be more easily designed to be short. In the case of using a meniscus lens of which curvature is large, that is of which radius of curvature is short, forming a junction type compound lens may become difficult, but in the case of a single lens, the junction type compound lens can be easily formed. As a result, the choices of a radius of curvature, one of the design parameters, of the composing lens, of the imaging lens increases, and design flexibility increases accordingly, and a higher performance imaging lens can be more easily designed.

In the imaging lens of the first or second aspect of this invention, out of the first to the third sub-lenses constituting the junction type compound lens, the second sub-lens, which is sandwiched by the first sub-lens and the third sub-lens and formed between these two sub-lenses, can be a plane parallel glass plate, a meniscus lens, or a biconvex lens, but is not limited to these, but may be a concave lens, for example. The shape of the second sub-lens is determined based on convenience in forming the first sub-lens and the third sub-lens, which are resin lenses formed on both sides of the second sub-lens, or based on convenience in designing the imaging lens of this invention.

In other words, if the second sub-lens is implemented by a lens having a curved surface, such as a meniscus lens, convex lens or concave lens, the joined faces with the resin lenses formed on both sides of the second sub-lens become wider than the case of implementing the second sub-lens by a plane parallel glass plate, so the adhesive force becomes stronger. Also the choices of the radius of curvature of the second sub-lens surface, which is a design parameter to improve performance of the lens, such as aberrations, increases, so designing the imaging lens of this invention becomes easier.

On the other hand, decreasing the radius of curvature (increasing the curvature) of the second sub-lens makes it difficult to prevent the entry of bubbles into the bonding interface when the lenses are contacted. Also using a meniscus lens for the second sub-lens, instead of the plane parallel glass plate, increases the manufacturing cost, compared with the case of using the plane parallel glass plate.

Now the optical characteristics of the imaging lens of this invention will be described.

The optical structural principle of the imaging lens of the present invention is for implementing two roles: aberration correction and image formation, by a junction type compound lens formed as a set of three sub-lenses formed by lens materials of which optical characteristics, such as the refractive index, are as close as possible. In other words, it is preferable that the respective refractive index and the Abbe number of the three sub-lenses constituting the one junction type compound lens of the imaging lens of this invention does not differ very much from each other.

This means that ideally the respective refractive index and Abbe number of the material of the first to the third sub-lenses are the same as each other, and the respective refractive index and Abbe number of the material of the fourth to the sixth sub-lenses are the same as each other. In practical terms, however, it is extremely difficult to find combinations of the optical glass material and the curable resin material, of which refractive indexes and Abbe numbers are precisely the same.

Therefore the inventor of the present invention investigated, through various simulations and prototyping, the difference of the refractive indexes and Abbe numbers between the optical glass material and the curable resin material of the two junction type compound lenses constituting the imaging lens, which could generate good images.

As a result, in the imaging lens of the first aspect, it was confirmed that good images can be acquired by constructing an imaging lens which satisfies the above Conditions (1-1) to (1-8) for the first imaging lens, (2-1) to (2-8) for the second imaging lens, and (3-1) to (3-8) for the third imaging lens.

In the imaging lens of the second aspect, it was confirmed that good images can be acquired by constructing an imaging lens which satisfies the above Conditions (4-1) to (4-4) for the fourth imaging lens, (5-1) to (5-4) for the fifth imaging lens, and (6-1) to (6-4) for the sixth imaging lens.

In other words, in the imaging lens of the first aspect, if the difference between the refractive index of the first sub-lens and the refractive index of the second sub-lens, the difference between the refractive index of the second sub-lens and the refractive index of the third sub-lens, the difference between the refractive index of the fourth sub-lens and the refractive index of the fifth sub-lens, and the difference between the refractive index of the fifth sub-lens and the refractive index of the sixth sub-lens are within 0.1 respectively, then the distortion aberration, astigmatism aberration and chromatic/spherical aberration become small enough to generate good images. In the imaging lens of the second aspect, if the difference between the refractive index of the first sub-lens and the refractive index of the second sub-lens, and the difference between the refractive index of the second sub-lens and the refractive index of the third sub-lens are within 0.1 respectively, then the distortion aberration, astigmatism aberration and chromatic/spherical aberration becomes small enough to generate good images.

In the imaging lens of the first aspect, if the difference between the Abbe number of the first sub-lens and the Abbe number of the second sub-lens, the difference between the Abbe number of the second sub-lens and the Abbe number of the third sub-lens, the difference between the Abbe number of the fourth sub-lens and the Abbe number of the fifth sub-lens, and the difference between the Abbe number of the fifth sub-lens and the Abbe number of the sixth sub-lens are within 30.0 respectively, then the value of the chromatic aberration can be small enough to generate good images, and the images can be sufficient contrast. In the imaging lens of the second aspect, if the difference between the Abbe number of the first sub-lens and the Abbe number of the second sub-lens, and the Abbe number of the second sub-lens and the Abbe number of the third sub-lens are within 30.0 respectively, then the value of the chromatic aberration can be small enough to generate good images, and the images can have sufficient contrast.

In the first and fourth imaging lenses of the present invention, the aperture stop for defining the entrance pupil is placed between the first lens and the second lens. Because of this, the aperture stop has functions to define the entrance pupil and to remove flares generated in the first lens.

In the second, third, fifth and sixth imaging lenses of the present invention, the aperture stop (first diaphragm) for defining the entrance pupil is placed on the front face of the first lens, that is, at the object side of the first lens. Because of this, the entrance pupil can be placed closer to the object side, and the principal ray can be entered at an angle vertical to the image surface, and the generation of shading can be prevented. Hence in the second, third, fifth and sixth imaging lens, the entrance pupil diameter can be set to a large value, and a lens with a small F number, that is, a "bright" lens, can be implemented.

The first and fourth imaging lenses have a feature that the F number can be easily changed in the manufacturing steps. In other words, the size of the aperture stop is changed to change the F number of the imaging lens, and in the case of the first and fourth imaging lenses, where the aperture stop is placed between the first lens and the second lens, the F number can be changed merely by changing the aperture stop.

If, however, the aperture stop is placed on the front face of the first lens, like the cases of the second, third, fifth and sixth imaging lenses, the size of the aperture must be set in the stage of fabricating the barrel for securing the first to the third lenses constituting the imaging lens, so that the tip of the barrel plays the part of the aperture stop. This means that every time the F number is changed, the barrel of the imaging lens must be redesigned, and a die for fabricating the barrel of the imaging lens must be recreated.

As described above, the first and fourth imaging lenses and the second, third, fifth and sixth imaging lenses have different features. The choice of the imaging lens to be used depends on the object for which the imaging lens is used (e.g. portable telephone, digital camera).

In this description, the first and fourth imaging lenses of the present invention are a type of imaging lens where only the aperture stop is placed between the first lens and the second lens, and the second, third, fifth and sixth imaging lenses of the present invention are a type of imaging lens where the aperture stop (first diaphragm) for defining the entrance pupil is placed at the object side of the first lens, and the second diaphragm is placed between the first lens and the second lens.

However, the opposite is also possible, that is, the second, third, fifth and sixth imaging lenses of the present invention are a type of imaging lens where only the aperture stop is placed between the first lens and the second lens, and the first and fourth imaging lenses of the present invention are a type of imaging lens where the aperture stop (first diaphragm) for defining the entrance pupil is placed at the object side of the first lens, and the second diaphragm is placed between the first lens and the second lens.

In any case, it is a matter of selection in designing the imaging lens whether the aperture stop is placed between the first lens and the second lens, or is placed at the object side of the first lens.

Figure 1:
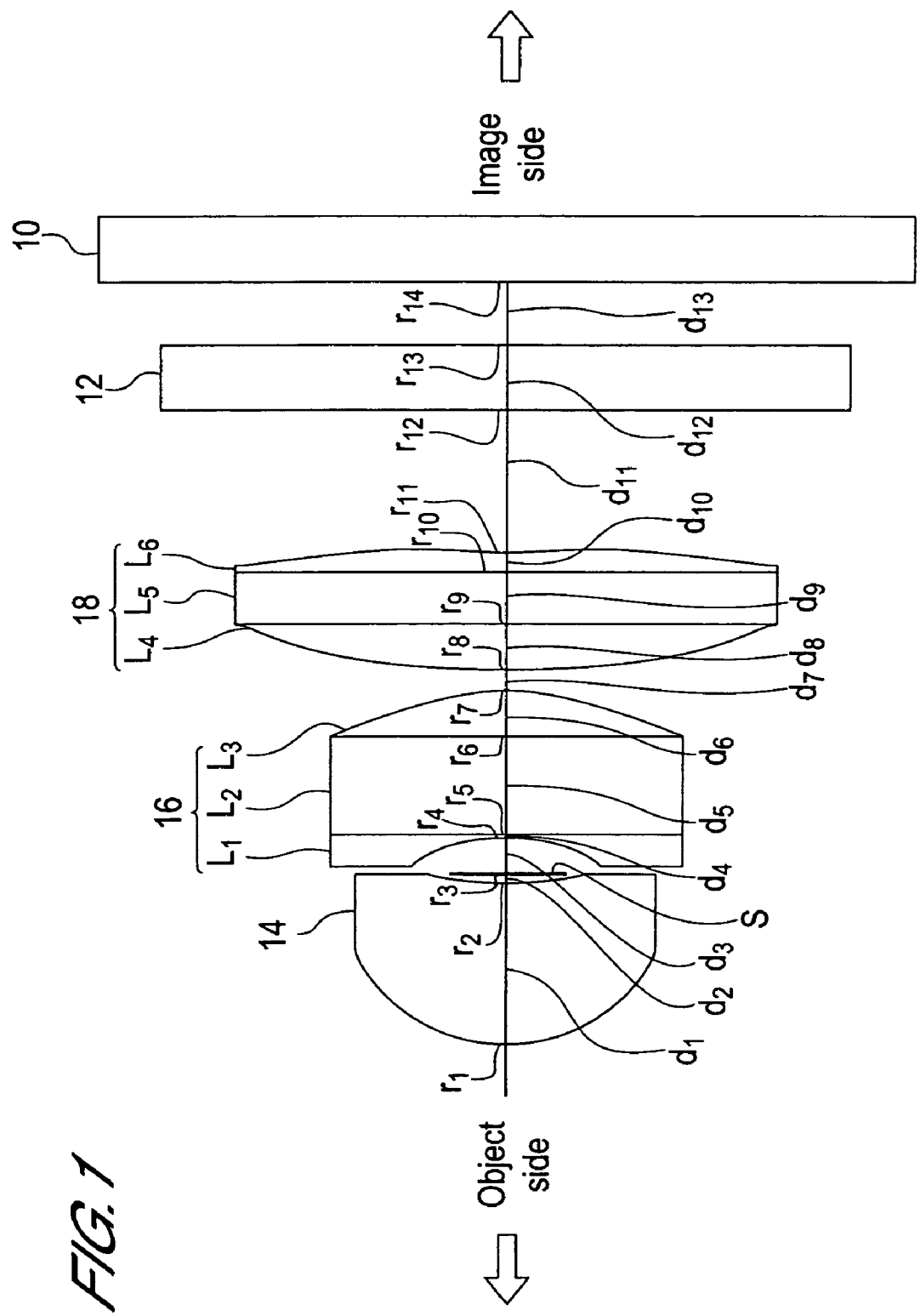
FIG. 1 is a diagram depicting a configuration of an imaging lens of Embodiment 1.

EXPLANATION OF REFERENCE SYMBOLS 10 solid-state image sensor
12 cover glass
14 first lens
16 second lens
18 third lens
20, 30 die
24, 34 transparent curable silicone resin
26 optical glass
36 object side face of first sub-lens
38 object side face of third sub-lens
S aperture stop
$S_1$ first diaphragm (aperture stop)
$S_2$ second diaphragm
$L_1$ first sub-lens
$L_2$ second sub-lens
$L_3$ third sub-lens
$L_4$ fourth sub-lens L₅ fifth sub-lens
L₆ sixth sub-lens

BEST MODE FOR CARRYING OUT THE INVENTION

Embodiments of the present invention will now be described with reference to the drawings. Each drawing, however, simply illustrates one configuration example of the present invention, and roughly shows a cross-section of each composing element and positional relationship in order to assist in understanding the present invention, and to not limit the present invention to the illustrated example. In the following description, specific materials and conditions may be used, but these materials and conditions are merely examples of preferred embodiments, and therefore the present invention is not limited in any way by these materials and conditions.

FIG. 1, FIG. 6, FIG. 11, FIG. 16, FIG. 21, FIG. 26, FIG. 31, FIG. 36 and FIG. 41 are diagrams depicting a configuration of an imaging lens of Embodiment 1 to Embodiment 9 respectively. FIG. 2, FIG. 7, FIG. 12, FIG. 17, FIG. 22, FIG. 27, FIG. 32, FIG. 37 and FIG. 42 are diagrams depicting optical paths of the imaging lens of Embodiment 1 to Embodiment 9 respectively. In an imaging lens of the first aspect, sub-lenses constituting the first junction type compound lens are the first sub-lens $L_1$, the second sub-lens $L_2$ and the third sub-lens $L_3$ from the object side, and the sub-lenses constituting the second junction type compound lens are the fourth sub-lens $L_4$, the fifth sub-lens $L_5$ and the sixth sub-lens $L_6$. In the imaging lens of the second aspect, sub-lenses constituting the junction type compound lens are the first sub-lens $L_1$, the second sub-lens $L_2$ and the third sub-lens $L_3$.

In the imaging lens of Embodiment 1, 4 or 7, the diaphragm S placed between the first lens 14 and the second lens 16 plays a role of an aperture stop, and defines the position of the entrance pupil.

In the imaging lens of Embodiment 2, 3, 5, 6, 8 or 9, the first diaphragm $S_1$ placed on the front face of the first lens 14 plays a role of an aperture stop, and defines the position of the entrance pupil. The second diaphragm $S_2$ placed between the first lens 14 and the second lens 16 plays a role of preventing a flare, which is a phenomena of the contrast of an image decreasing, or preventing a smear, which is a phenomena of an image smearing.

In other words, in the imaging lens of Embodiment 2, 3, 5, 6, 8 or 9, the first diaphragm $S_1$, which plays a role of determining the basic characteristics of the imaging lens, such as defining the position of the entrance pupil, specifying the F number and determining the characteristics of various aberrations, including the distortion aberration and the astigmatism aberration, is an essential composing element of the present invention. The second diaphragm $S_2$, on the other hand, is a composing element to improve additional characteristics, that is, improving the contrast of an image, so it is preferable to install the second diaphragm $S_2$, but the imaging lens of the present invention can be established without it.

Within a range where no misunderstanding occurs, $r_i$ may be used as a variable that indicates a value of a radius of curvature on an optical axis, or as a symbol that identifies a lens, cover glass surface or image sensing plane (e.g. $r_i$ is used to indicate the object side face of the first lens 14 in FIG. 1). Such parameters as $r_i$, $d_i$, $N_j$ and $v_j$ shown in FIG. 1, FIG. 6, FIG. 11, FIG. 16, FIG. 21, FIG. 26, FIG. 31, FIG. 36 and FIG. 41 are shown as concrete values in Table 1 to Table 9. i and j are 1 or higher positive integers starting with 1, and are subsequently assigned from the object side to the image side corresponding to a surface number of a diaphragm and each lens, or the thickness of the lens, or the surface spacing of the lens. In other words, $r_i$ is a radius of curvature on the optical axis on the i-th surface, $d_i$ is a distance from the i-th surface to the (i+1)th surface, $N_j$ is a refractive index of the j-th lens (or sub-lens), including the diaphragm, and $v_j$ is an Abbe number of the material of the j-th lens (or sub-lens), including the diaphragm.

The symbols of the surface $r_i$ and the surface spacing $d_i$ defined in FIG. 1, FIG. 6, FIG. 11, FIG. 16, FIG. 21, FIG. 26, FIG. 31, FIG. 36 and FIG. 41 are omitted in FIG. 2, FIG. 7, FIG. 12, FIG. 17, FIG. 22, FIG. 27, FIG. 32, FIG. 37 and FIG. 42, so that the drawing does not become complicated.

In FIG. 1, FIG. 6, FIG. 11, FIG. 16, FIG. 21, FIG. 26, FIG. 31, FIG. 36 and FIG. 41, the aperture of the diaphragm is shown by a segment. This is because the intersection of the diaphragm surface and the optical axis must be clearly shown to define the distance from the lens surface to the diaphragm surface. In FIG. 2, FIG. 7, FIG. 12, FIG. 17, FIG. 22, FIG. 27, FIG. 32, FIG. 37 and FIG. 42, which are cross-sectional views of the imaging lenses of Embodiment 1 to Embodiment 9 respectively, a main body of the diaphragm for shielding light is shown by a half line of which start point is the edge of the aperture, by opening the aperture of the diaphragm, which is unlike FIG. 1, FIG. 6, FIG. 11, FIG. 16, FIG. 21, FIG. 26, FIG. 31, FIG. 36 and FIG. 41. This is because the status of the diaphragm must be shown by opening the aperture of the diaphragm in order to enter such a beam as a principal ray.

The optical length L is a distance from the object side face $r_i$ of the first lens $L_1$ to the image sensing plane in the case of the imaging lens of Embodiments 1, 4 and 7, and is a distance from the first diaphragm $S_1$ to the image sensing plane in the case of the imaging lens in Embodiment 2, 3, 5, 6, 8 and 9. The back focus bf is a distance from the image side face of the third lens 18 to the image sensing plane. Here the length from the image side face of the third lens 18 to the image sensing plane, which is measured without a cover glass, is regarded as the back focus bf. If the third lens 18 is a junction type compound lens, the image side face of the third lens 18 refers to the image side face of the sixth sub-lens $L_6$ (the image side face of the third sub-lens $L_3$ in the case of Embodiment 7).

Table 1 to Table 9 show data on the thickness of the first to the third lenses constituting the imaging lenses of Embodiment 1 to Embodiment 9 respectively, or the first to the sixth sub-lenses (the first to the third sub-lenses in the case of the imaging lenses of Embodiments 7 to 9), the radius of curvature of the curved faces constituting these lenses, the positional spacing of these lenses, and the positional relationship among these lenses and diaphragms. The aspherical data is shown in each column of Table 1 to Table 9 respectively with surface numbers. The value $r_i$ of the radius of curvature on the optical axis is a positive value if it is convex to the object side, and is a negative value if it is convex to the image side.

Both surfaces when the second sub-lens or the fifth sub-lens is a plane parallel glass plate, and both surfaces of the diaphragm S, first diaphragm $S_1$, second diaphragm $S_2$ and cover glass (or filter or the like) are planes, so the radius of curvature is indicated as ∞. The image sensing plane is a plane, so the radius of curvature to indicate the image sensing plane of the solid-state image sensor 10 is supposed to be ∞, but this is omitted.

The aspherical surface used for this invention is given by the following expression.

$$Z=ch^2/[1+[1-(1+k)c^2h^2]^{1/2}]+A_0h^4+B_0h^6+C_0h^8+D_0h^{10}$$

where

Z: depth from the vertex of the surface to the contact surface

C: curvature of the surface of the optical axis h: height from the optical axis k: cone constant $A_0$: aspherical surface coefficient of degree 4

$B_0$: aspherical surface coefficient of degree 6

$C_0$: aspherical surface coefficient of degree 8

$D_0$: aspherical surface coefficient of degree 10

In Table 1 to Table 9 of this description, the numeric values to indicate the cone constant (k) and the aspherical surface coefficients ($A_0$, $B_0$, $C_0$ and $D_0$) are denoted by an exponent, and "e−1", for example, means "10 to the −1 power".

Now the imaging lens according to Embodiment 1 to Embodiment 9 will be described with reference to FIG. 1 to FIG. 45.

The distortion aberration curves shown in FIG. 3, FIG. 8, FIG. 13, FIG. 18, FIG. 23, FIG. 28, FIG. 33, FIG. 38 and FIG. 43 show the aberration (unsatisfactory quantity of tangent condition is shown in the abscissa by percentage) with respect to the distance from the optical axis (shown in the ordinate by percentage with the maximum distance from the optical axis within the image surface as 100).

The astigmatism aberration curves shown in FIG. 4, FIG. 9, FIG. 14, FIG. 19, FIG. 24, FIG. 29, FIG. 34, FIG. 39 and FIG. 44 show the aberration quantity (mm units) in the abscissa with respect to the distance (%) from the optical axis shown in the ordinate, just like the distortion aberration curves, and show the aberration quantities on the meridional surface and the sagittal surface respectively.

The chromatic/spherical aberration curves in FIG. 5, FIG. 10, FIG. 15, FIG. 20, FIG. 25, FIG. 30, FIG. 35, FIG. 40 and FIG. 45 show the aberration quantity (mm units) in the abscissa with respect to the entrance height h in the ordinate. The entrance height h in the ordinate is shown as a value converted into an F number. For example, in the case of a lens of which open F number is 3.40, the entrance height h=100% of the ordinate corresponds to F=3.40. The open F number refers to an F number when the diameter of the aperture stop is the maximum size in design specifications.

For the chromatic/spherical aberration curves, the aberration values with respect to the C-line (light of which wavelength is 656.3 nm), d-line (light of which wavelength is 0.587.6 nm), e-line (light of which wavelength is 546.1 nm), F-line (light of which wavelength is 486.1 nm) and g-line (light of which wavelength is 435.8 nm) are shown.

In Embodiment 1 to Embodiment 9, a transparent curable silicone resin, which is a curable resin material, is used for the material of the first sub-lens, the third sub-lens, the fourth sub-lens and the sixth sub-lens (material of the first sub-lens and the third sub-lens in the case of Embodiment 7 to Embodiment 9). An optical glass (e.g. BK7), which is a glass material, is used for the material of the second sub-lens and the fifth sub-lens (material of the second sub-lens in the case of Embodiment 7 to Embodiment 9). Here BK7 is a name assigned by Schott Glass Co. to a group of borosilicate glass. The optical glass BK7 is now manufactured by a plurality of glass manufacturers. The refractive index and the Abbe number of the commercially available optical glass BK7 are somewhat different depending on the manufacturer and the manufacturing lot.

The transparent curable silicone resin refers to a silicone resin which is transparent to a visible light, and with which the geometric shape of the lens does not change, and optical performance thereof does not deteriorate even if the environment temporarily becomes about 150° C. of high temperature. For the transparent curable silicone resin mentioned here, an appropriate one can be selected out of silicone resins commercially available under the name "transparent high hardness silicone resin" provided by silicone resin supply companies.

A cover glass 12 is inserted between the third lens 18 and the solid-state image sensor 10. A material of the cover glass 12 is optical glass BK7, of which refractive index (value with respect to d-line (light of which wavelength is 587.6 nm)) is 1.51633, and the Abbe number is 64.0. In the later described Table 1 to Table 6, the refractive index and the Abbe number of the cover glass 12 are shown as N=1.51633 and v=64.0 respectively.

Table 1 to Table 9 show the list of the radius of curvature $r_i$ (mm units), lens surface spacing $d_i$ (mm units), refractive index of lens material, Abbe number of lens material, cone constant k and aspherical coefficients ($A_0$, $B_0$, $C_0$ and $D_0$) of the composing lenses of Embodiment 1 to Embodiment 9. The values of the radius of curvature on the optical axis and the lens surface spacing of the composing lens in Table 1 to Table 9 are shown as values when the value of the composite focal distance f of the respective imaging lens of Embodiment 1 to Embodiment 9 is normalized to 1.00 mm.

Both side faces of the first lens 14, the second lens 16 and the third lens 18 are aspherical lenses. If the first lens 14, the second lens 16 and the third lens 18 are junction type, compound lenses, the object side face of the first sub-lens, and the image side face of the third sub-lens constituting the junction type compound lens are aspherical, and the object side face of the fourth sub-lens and the image side face of the sixth sub-lens are aspherical.

TABLE 1

Embodiment 1

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1$ = 0.290 | | | | 2.679e−1 | −3.062e−1 | 3.708 | −9.974e+1 | 2.512e+3 |
| | $d_1$ = 0.2603 | $N_1$ = 1.51000 | $v_1$ = 56.0 | | | | | |
| $r_2$ = 0.661 | | | | 1.087e+1 | 3.263 | −6.012e+1 | −1.969e+3 | 2.877e+5 |
| | $d_2$ = 0.0144 | | | | | | | |
| $r_3$ = ∞ | | | | | | | | |
| | $d_3$ = 0.0589 | | | | | | | |
| $r_4$ = −0.307 | | | | 4.656e−1 | 5.992 | −1.188e+3 | 1.130e+5 | −4.010e+6 |
| | $d_4$ = 0.0057 | $N_4$ = 1.51000 | $v_4$ = 56.0 | | | | | |

TABLE 1-continued

Embodiment 1

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_5 = \infty$ | | | | | | | | |
| | $d_5 = 0.1574$ | $N_5 = 1.51633$ | $v_5 = 64.0$ | | | | | |
| $r_6 = \infty$ | | | | | | | | |
| | $d_6 = 0.0735$ | $N_6 = 1.51000$ | $v_6 = 56.0$ | | | | | |
| $r_7 = -0.372$ | | | | $-2.627e-1$ | $9.387$ | $-1.849$ | $-1.329e+1$ | $-2.264e+3$ |
| | $d_7 = 0.0355$ | | | | | | | |
| $r_8 = 2.495$ | | | | $3.033e+1$ | $8.360e-1$ | $1.675$ | $-7.945$ | $-3.142e+1$ |
| | $d_8 = 0.0738$ | $N_8 = 1.51000$ | $v_8 = 56.0$ | | | | | |
| $r_9 = \infty$ | | | | | | | | |
| | $d_9 = 0.0839$ | $N_9 = 1.51633$ | $v_9 = 64.0$ | | | | | |
| $r_{10} = \infty$ | | | | | | | | |
| | $d_{10} = 0.0315$ | $N_{10} = 1.51000$ | $v_{10} = 56.0$ | | | | | |
| $r_{11} = 1.840$ | | | | $-2.401e+1$ | $-5.705$ | $3.180e+1$ | $-9.030e+1$ | $1.766e+2$ |
| | $d_{11} = 0.2295$ | | | | | | | |
| $r_{12} = \infty$ | | | | | | | | |
| | $d_{12} = 0.1049$ | $N = 1.51633$ | $v = 64.0$ | | | | | |
| $r_{13} = \infty$ | | | | | | | | |
| | $d_{13} = 0.1002$ | | | | | | | |

TABLE 2

Embodiment 2

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.324$ | | | | $1.102$ | $-5.858$ | $-1.033e+2$ | $3.814e+3$ | $-2.282e+5$ |
| | $d_2 = 0.0694$ | $N_2 = 1.51000$ | $v_2 = 56.0$ | | | | | |
| $r_3 = \infty$ | | | | | | | | |
| | $d_3 = 0.0785$ | $N_3 = 1.51633$ | $v_3 = 64.0$ | | | | | |
| $r_4 = \infty$ | | | | | | | | |
| | $d_4 = 0.0262$ | $N_4 = 1.51000$ | $v_4 = 56.0$ | | | | | |
| $r_5 = -51.004$ | | | | $1.791e+4$ | $-8.623$ | $-1.712e+1$ | $-4.432e+3$ | $-1.243e+5$ |
| | $d_5 = 0.0219$ | | | | | | | |
| $r_6 = \infty$ | | | | | | | | |
| | $d_6 = 0.0890$ | | | | | | | |
| $r_7 = -0.217$ | | | | $1.743e-1$ | $1.714e+1$ | $2.890e+2$ | $1.357e+3$ | $-3.232e+5$ |
| | $d_7 = 0.1204$ | $N_7 = 1.51633$ | $v_7 = 64.0$ | | | | | |
| $r_8 = -0.318$ | | | | $-1.587$ | $5.267$ | $5.294e+2$ | $-5.318e+3$ | $1.001e+4$ |
| | $d_8 = 0.0953$ | | | | | | | |
| $r_9 = 0.917$ | | | | $-2.434e+2$ | $-4.287$ | $3.777e+1$ | $-1.443e+2$ | $2.430e+2$ |
| | $d_9 = 0.0091$ | $N_9 = 1.51000$ | $v_9 = 56.0$ | | | | | |
| $r_{10} = \infty$ | | | | | | | | |
| | $d_{10} = 0.1047$ | $N_{10} = 1.51633$ | $v_{10} = 64.0$ | | | | | |
| $r_{11} = \infty$ | | | | | | | | |
| | $d_{11} = 0.0837$ | $N_{11} = 1.51000$ | $v_{11} = 56.0$ | | | | | |
| $r_{12} = 0.465$ | | | | $-2.873e+1$ | $-3.141$ | $9.020e-2$ | $2.310e+1$ | $-1.201e+2$ |
| | $d_{12} = 0.2022$ | | | | | | | |
| $r_{13} = \infty$ | | | | | | | | |
| | $d_{13} = 0.0785$ | $N = 1.51633$ | $v = 64.0$ | | | | | |
| $r_{14} = \infty$ | | | | | | | | |
| | $d_{14} = 0.1013$ | | | | | | | |

TABLE 3

Embodiment 3

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.351$ | | | | $1.340$ | $-5.036$ | $-1.009e+2$ | $2.086e+3$ | $-1.402e+5$ |
| | $d_2 = 0.0597$ | $N_2 = 1.53000$ | $v_2 = 35.0$ | | | | | |

TABLE 3-continued

Embodiment 3

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_3 = \infty$ | | | | | | | | |
| | $d_3 = 0.0878$ | $N_3 = 1.51633$ | $v_3 = 64.0$ | | | | | |
| $r_4 = \infty$ | | | | | | | | |
| | $d_4 = 0.0329$ | $N_4 = 1.53000$ | $v_4 = 35.0$ | | | | | |
| $r_5 = -17.554$ | | | | 1.062e+4 | −7.948 | −6.007e+1 | −2.578e+3 | −6.919e+4 |
| | $d_5 = 0.0211$ | | | | | | | |
| $r_6 = \infty$ | | | | | | | | |
| | $d_6 = 0.0940$ | | | | | | | |
| $r_7 = -0.214$ | | | | 2.700e−2 | 1.110e+1 | 3.585e+2 | 2.293e+2 | −1.379e+5 |
| | $d_7 = 0.0147$ | $N_7 = 1.60000$ | $v_7 = 30.0$ | | | | | |
| $r_8 = \infty$ | | | | | | | | |
| | $d_8 = 0.0658$ | $N_8 = 1.60342$ | $v_8 = 38.0$ | | | | | |
| $r_9 = \infty$ | | | | | | | | |
| | $d_9 = 0.0439$ | $N_9 = 1.60000$ | $v_9 = 30.0$ | | | | | |
| $r_{10} = -0.343$ | | | | −5.390e−1 | 5.032e−1 | 4.563e+2 | −3.511e+3 | 8.214e+3 |
| | $d_{10} = 0.0987$ | | | | | | | |
| $r_{11} = 0.610$ | | | | −4.296e+1 | −3.386 | 2.668e+1 | −1.135e+2 | 2.311e+2 |
| | $d_{11} = 0.2047$ | $N_{11} = 1.51633$ | $v_{11} = 64.0$ | | | | | |
| $r_{12} = 0.530$ | | | | −2.100e+1 | −3.682 | 1.083e+1 | −3.730e+1 | 3.258e+1 |
| | $d_{12} = 0.2477$ | | | | | | | |
| $r_{13} = \infty$ | | | | | | | | |
| | $d_{13} = 0.0658$ | $N = 1.51633$ | $v = 64.0$ | | | | | |
| $r_{14} = \infty$ | | | | | | | | |
| | $d_{14} = 0.1005$ | | | | | | | |

TABLE 4

Embodiment 4

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = 0.295$ | | | | 2.680e−1 | −2.911e−1 | 3.410 | −8.867e+1 | 3.019e+3 |
| | $d_1 = 0.2649$ | $N_1 = 1.51633$ | $v_1 = 64.0$ | | | | | |
| $r_2 = 0.672$ | | | | 1.088e+1 | 3.103 | −5.527e+1 | −1.750e+3 | 2.473e+5 |
| | $d_2 = 0.0147$ | | | | | | | |
| $r_3 = \infty$ | | | | | | | | |
| | $d_3 = 0.0599$ | | | | | | | |
| $r_4 = -0.312$ | | | | 4.656e−1 | 5.697 | −1.092e+3 | 1.005e+5 | −3.447e+6 |
| | $d_4 = 0.0058$ | $N_4 = 1.51000$ | $v_4 = 56.0$ | | | | | |
| $r_5 = -0.984$ | | | | | | | | |
| | $d_5 = 0.1994$ | $N_5 = 1.51630$ | $v_5 = 64.0$ | | | | | |
| $r_6 = -0.787$ | | | | | | | | |
| | $d_6 = 0.0354$ | $N_6 = 1.51000$ | $v_6 = 56.0$ | | | | | |
| $r_7 = -0.378$ | | | | −2.630e−1 | 8.926 | −1.700 | −1.181e+1 | −1.946e+3 |
| | $d_7 = 0.0361$ | | | | | | | |
| $r_8 = 2.538$ | | | | 3.033e+1 | 7.948e−1 | 1.540 | −7.063 | −2.701e+1 |
| | $d_8 = 0.0357$ | $N_8 = 1.51000$ | $v_8 = 56.0$ | | | | | |
| $r_9 = 2.360$ | | | | | | | | |
| | $d_9 = 0.1444$ | $N_9 = 1.51630$ | $v_9 = 64.0$ | | | | | |
| $r_{10} = -2.262$ | | | | | | | | |
| | $d_{10} = 0.0124$ | $N_{10} = 1.51000$ | $v_{11} = 56.0$ | | | | | |
| $r_{11} = 1.871$ | | | | −2.401e+1 | −5.424 | 2.924e+1 | −8.027e+1 | 1.518e+2 |
| | $d_{11} = 0.2200$ | | | | | | | |
| $r_{12} = \infty$ | | | | | | | | |
| | $d_{12} = 0.1067$ | $N = 1.51633$ | $v = 64.0$ | | | | | |
| $r_{13} = \infty$ | | | | | | | | |
| | $d_{13} = 0.0997$ | | | | | | | |

TABLE 5

Embodiment 5

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.325$ | | | | 1.102 | −5.758 | −1.004e+2 | 3.664e+3 | −2.166e+5 |
| | $d_2 = 0.0509$ | $N_2 = 1.51000$ | $v_2 = 56.0$ | | | | | |
| $r_3 = 1.421$ | | | | | | | | |
| | $d_3 = 0.1074$ | $N_3 = 1.51633$ | $v_3 = 64.0$ | | | | | |
| $r_4 = −0.947$ | | | | | | | | |
| | $d_4 = 0.0168$ | $N_4 = 1.51000$ | $v_4 = 56.0$ | | | | | |
| $r_5 = −51.298$ | | | | 1.791e+4 | −8.476 | −1.663e+1 | −4.257e+3 | −1.180e+5 |
| | $d_5 = 0.0221$ | | | | | | | |
| $r_6 = \infty$ | | | | | | | | |
| | $d_6 = 0.0895$ | | | | | | | |
| $r_7 = −0.217$ | | | | 1.473e−1 | 1.684e+1 | 2.808e+2 | 1.304e+3 | −3.068e+5 |
| | $d_7 = 0.1212$ | $N_7 = 1.51000$ | $v_7 = 56.0$ | | | | | |
| $r_8 = −0.320$ | | | | −1.587 | 5.177 | 5.144e+2 | −5.108e+3 | 9.503e+3 |
| | $d_8 = 0.0958$ | | | | | | | |
| $r_9 = 0.922$ | | | | −2.434e+2 | −4.214 | 3.670e+1 | −1.386e+2 | 2.307e+2 |
| | $d_9 = 0.0284$ | $N_9 = 1.51000$ | $v_9 = 56.0$ | | | | | |
| $r_{10} = −4.735$ | | | | | | | | |
| | $d_{10} = 0.1524$ | $N_{10} = 1.51633$ | $v_{10} = 64.0$ | | | | | |
| $r_{11} = −1.894$ | | | | | | | | |
| | $d_{11} = 0.0179$ | $N_{11} = 1.51000$ | $v_{11} = 56.0$ | | | | | |
| $r_{12} = 0.467$ | | | | −2.873e+1 | −3.087 | 8.764e−2 | 2.219e+1 | −1.141e+2 |
| | $d_{12} = 0.1980$ | | | | | | | |
| $r_{13} = \infty$ | | | | | | | | |
| | $d_{13} = 0.0788$ | $N = 1.51633$ | $v = 64.0$ | | | | | |
| $r_{14} = \infty$ | | | | | | | | |
| | $d_{14} = 0.1001$ | | | | | | | |

TABLE 6

Embodiment 6

| Radius of Curvature($r_i$) | Distance($d_i$) | Refractivity ($N_i$) | Abbe Number($v_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.325$ | | | | 1.102 | −5.758 | −1.004e+2 | 3.664e+3 | −2.166e+5 |
| | $d_2 = 0.0509$ | $N_2 = 1.51000$ | $v_2 = 56.0$ | | | | | |
| $r_3 = 1.421$ | | | | | | | | |
| | $d_3 = 0.1074$ | $N_3 = 1.51633$ | $v_3 = 64.0$ | | | | | |
| $r_4 = −0.947$ | | | | | | | | |
| | $d_4 = 0.0168$ | $N_4 = 1.51000$ | $v_4 = 56.0$ | | | | | |
| $r_5 = −51.298$ | | | | 1.791e+4 | −8.476 | −1.663e+1 | −4.257e+3 | −1.180e+5 |
| | $d_5 = 0.0221$ | | | | | | | |
| $r_6 = \infty$ | | | | | | | | |
| | $d_6 = 0.0895$ | | | | | | | |
| $r_7 = −0.218$ | | | | 1.473e−1 | 1.684e+1 | 2.208e+2 | 1.304e+3 | −3.068e+5 |
| | $d_7 = 0.0158$ | $N_7 = 1.51000$ | $v_7 = 56.0$ | | | | | |
| $r_8 = −0.379$ | | | | | | | | |
| | $d_8 = 0.0848$ | $N_8 = 1.51633$ | $v_8 = 64.0$ | | | | | |
| $r_9 = −0.947$ | | | | | | | | |
| | $d_9 = 0.0206$ | $N_9 = 1.51000$ | $v_9 = 56.0$ | | | | | |
| $r_{10} = −0.320$ | | | | −1.587 | 5.177 | 5.144e+2 | −5.108e+3 | 9.503e+3 |
| | $d_{10} = 0.0958$ | | | | | | | |
| $r_{11} = 0.922$ | | | | −2.434e+2 | −4.214 | 3.670e+1 | −1.386e+2 | 2.307e+2 |
| | $d_{11} = 0.1987$ | $N_{11} = 1.51000$ | $v_{11} = 56.0$ | | | | | |
| $r_{12} = 0.467$ | | | | −2.873e+1 | −3.087 | 8.764e−2 | 2.219e+1 | −1.141e+2 |
| | $d_{12} = 0.1980$ | | | | | | | |
| $r_{13} = \infty$ | | | | | | | | |
| | $d_{13} = 0.0788$ | $N = 1.51633$ | $v = 64.0$ | | | | | |
| $r_{14} = \infty$ | | | | | | | | |
| | $d_{14} = 0.0991$ | | | | | | | |

TABLE 7

Embodiment 7

| Radius of Curvature($r_i$) | Distance($d_i$) | Refractivity ($N_i$) | Abbe Number($\nu_i$) | Aspheric Coefficients | | | | |
|---|---|---|---|---|---|---|---|---|
| | | | | K | $A_4$ | $A_6$ | $A_8$ | $A_{10}$ |
| $r_1 = 0.290$ | | | | 2.679e−1 | −3.062e−1 | 3.708 | −9.974e+1 | 2.512e+3 |
| | $d_1 = 0.2603$ | $N_1 = 1.51000$ | $\nu_1 = 56.0$ | | | | | |
| $r_2 = 0.661$ | | | | 1.087e+1 | 3.263 | −6.012e+1 | −1.969e+3 | 2.877e+5 |
| | $d_2 = 0.0144$ | | | | | | | |
| $r_3 = \infty$ | | | | | | | | |
| | $d_3 = 0.0589$ | | | | | | | |
| $r_4 = −0.308$ | | | | 4.656e−1 | 5.992 | −1.188e+3 | 1.130e+5 | 4.010e+6 |
| | $d_4 = 0.2366$ | $N_4 = 1.51000$ | $\nu_4 = 56.0$ | | | | | |
| $r_5 = −0.372$ | | | | −2.627e−1 | 9.387 | −1.849 | −1.329e+1 | −2.264e+3 |
| | $d_5 = 0.0355$ | | | | | | | |
| $r_6 = 2.495$ | | | | 3.033e+1 | 8.360e−1 | 1.675 | −7.945 | −3.142e+1 |
| | $d_6 = 0.0738$ | $N_6 = 1.51000$ | $\nu_6 = 56.0$ | | | | | |
| $r_7 = \infty$ | | | | | | | | |
| | $d_7 = 0.0839$ | $N_7 = 1.51633$ | $\nu_7 = 64.0$ | | | | | |
| $r_8 = \infty$ | | | | | | | | |
| | $d_8 = 0.0315$ | $N_8 = 1.51000$ | $\nu_8 = 56.0$ | | | | | |
| $r_9 = 1.840$ | | | | −2.401e+1 | −5.705 | 3.180e+1 | −9.030e+1 | 1.766e+2 |
| | $d_9 = 0.2295$ | | | | | | | |
| $r_{10} = \infty$ | | | | | | | | |
| | $d_{10} = 0.1049$ | $N = 1.51633$ | $\nu = 64.0$ | | | | | |
| $r_{11} = \infty$ | | | | | | | | |
| | $d_{11} = 0.0996$ | | | | | | | |

TABLE 8

Embodiment 8

| Radius of Curvature($r_i$) | Distance($d_i$) | Refractivity ($N_i$) | Abbe Number($\nu_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.351$ | | | | 1.340 | −5.036 | −1.009e+2 | 2.086e+3 | −1.402e+5 |
| | $d_2 = 0.1804$ | $N_2 = 1.53000$ | $\nu_2 = 35.0$ | | | | | |
| $r_3 = −17.554$ | | | | 1.062e+4 | −7.948 | −6.007e+1 | −2.578e+3 | −6.919e+4 |
| | $d_3 = 0.0211$ | | | | | | | |
| $r_4 = \infty$ | | | | | | | | |
| | $d_4 = 0.0940$ | | | | | | | |
| $r_5 = −0.214$ | | | | 2.700e−2 | 1.110e+1 | 3.585e+2 | 2.293e+2 | −1.379e+5 |
| | $d_5 = 0.0147$ | $N_5 = 1.60000$ | $\nu_5 = 30.0$ | | | | | |
| $r_6 = \infty$ | | | | | | | | |
| | $d_6 = 0.0658$ | $N_6 = 1.60342$ | $\nu_6 = 38.0$ | | | | | |
| $r_7 = \infty$ | | | | | | | | |
| | $d_7 = 0.0439$ | $N_7 = 1.60000$ | $\nu_7 = 30.0$ | | | | | |
| $r_8 = −0.343$ | | | | −5.390e−1 | 5.032e−1 | 4.563e+2 | −3.511e+3 | 8.214e+3 |
| | $d_8 = 0.0987$ | | | | | | | |
| $r_9 = 0.610$ | | | | −4.296e+1 | −3.386 | 2.668e+1 | −1.135e+2 | 2.311e+2 |
| | $d_9 = 0.2047$ | $N_9 = 1.51633$ | $\nu_9 = 64.0$ | | | | | |
| $r_{10} = 0.530$ | | | | −2.100e+1 | −3.682 | 1.083e+1 | −3.730e+1 | 3.258e+1 |
| | $d_{10} = 0.2477$ | | | | | | | |
| $r_{11} = \infty$ | | | | | | | | |
| | $d_{11} = 0.0658$ | $N = 1.51633$ | $\nu = 64.0$ | | | | | |
| $r_{12} = \infty$ | | | | | | | | |
| | $d_{12} = 0.1012$ | | | | | | | |

TABLE 9

Embodiment 9

| Radius of Curvature($r_i$) | Distance($d_i$) | Refractivity ($N_i$) | Abbe Number($\nu_i$) | Aspheric Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | | 
| $r_2 = 0.351$ | | | | 1.340 | −5.036 | −1.009e+2 | 2.086e+3 | −1.402e+5 |
| | $d_2 = 0.0597$ | $N_2 = 1.53000$ | $\nu_2 = 35.0$ | | | | | |

TABLE 9-continued

Embodiment 9

| Radius of Curvature($r_i$) | Distance($d_i$) | Refractivity ($N_i$) | Abbe Number($\nu_i$) | Aspheric Coefficients | | | | |
|---|---|---|---|---|---|---|---|---|
| | | | | K | $A_4$ | $A_6$ | $A_8$ | $A_{10}$ |
| $r_3 = \infty$ | | | | | | | | |
| | $d_3 = 0.0878$ | $N_3 = 1.51633$ | $\nu_3 = 64.0$ | | | | | |
| $r_4 = \infty$ | | | | | | | | |
| | $d_4 = 0.0329$ | $N_4 = 1.53000$ | $\nu_4 = 35.0$ | | | | | |
| $r_5 = -17.554$ | | | | 1.062e+4 | −7.948 | −6.007e+1 | −2.578e+3 | −6.919e+4 |
| | $d_5 = 0.0211$ | | | | | | | |
| $r_6 = \infty$ | | | | | | | | |
| | $d_6 = 0.0940$ | | | | | | | |
| $r_7 = -0.214$ | | | | 2.700e−2 | 1.110e+1 | 3.585e+2 | 2.293e+2 | −1.379e+5 |
| | $d_7 = 0.1244$ | $N_7 = 1.60000$ | $\nu_7 = 30.0$ | | | | | |
| $r_8 = -0.343$ | | | | −5.390e−1 | 5.032e−1 | 4.563e+2 | −3.511e+3 | 8.214e+3 |
| | $d_8 = 0.0987$ | | | | | | | |
| $r_9 = 0.610$ | | | | −4.296e+1 | −3.386 | 2.668e+1 | −1.135e+2 | 2.311e+2 |
| | $d_9 = 0.2047$ | $N_9 = 1.51633$ | $\nu_9 = 64.0$ | | | | | |
| $r_{10} = 0.530$ | | | | −2.100e+1 | −3.682 | 1.083e+1 | −3.730e+1 | 3.258e+1 |
| | $d_{10} = 0.2477$ | | | | | | | |
| $r_{11} = \infty$ | | | | | | | | |
| | $d_{11} = 0.0658$ | $N = 1.51633$ | $\nu = 64.0$ | | | | | |
| $r_{12} = \infty$ | | | | | | | | |
| | $d_{12} = 0.1005$ | | | | | | | |

The refractive index and the Abbe number of the thermo-curable silicone resin, that is a curable resin material constituting a single lens, or the refractive index and the Abbe number of the optical glass which is a high softening temperature optical lens formation material used for the first to the sixth sub-lenses (the first to the third sub-lenses in the case of Embodiments 7 to 9) and the first to the third lenses according to Embodiments 1 to 9, differ depending on the manufacturer and also differ somewhat even if the product name is the same. In the following Embodiments 1 to 9, a thermo-setting silicone resin material and optical glass material, which are used for each embodiment, are shown, along with the refractive index (value with respect to the d-line (light of which wavelength is 587.6 nm)), and the Abbe number thereof.

Embodiment 1

Figure 2:
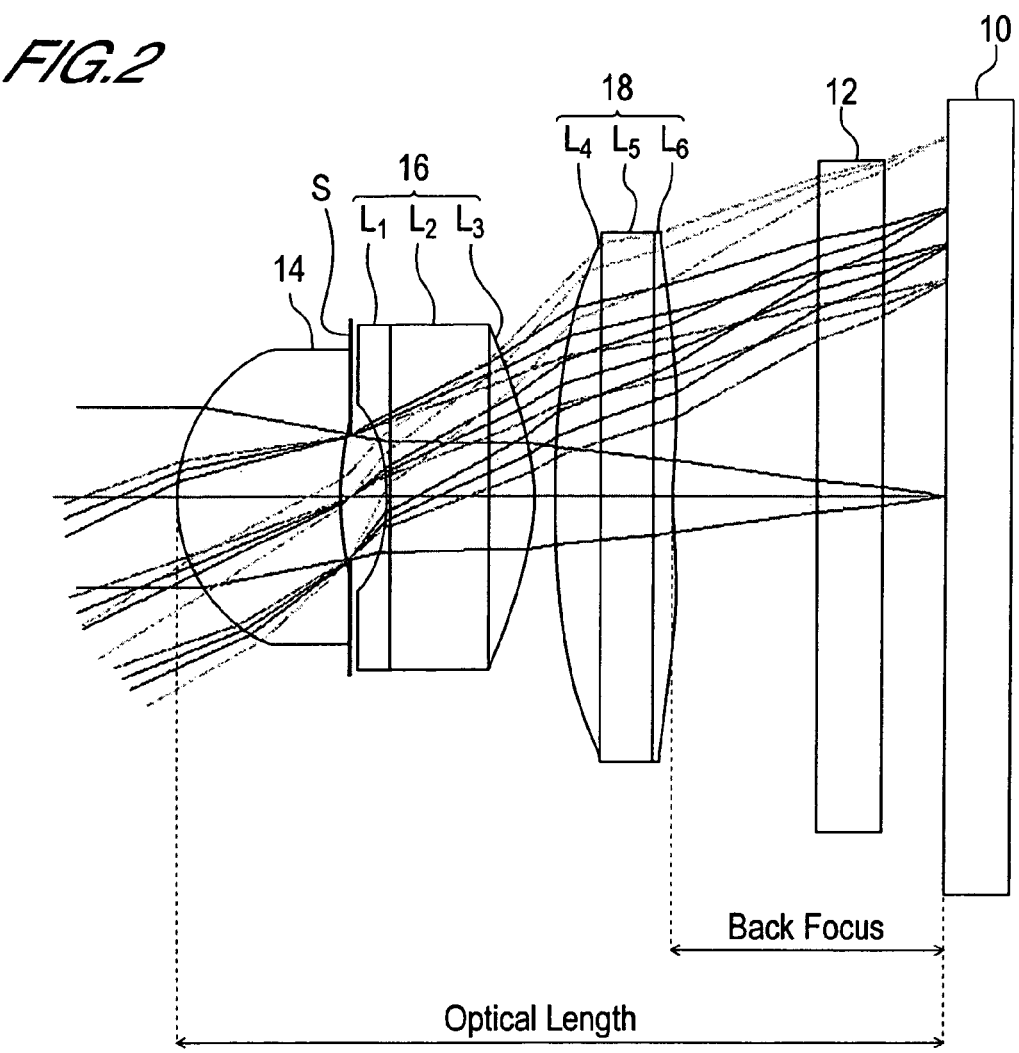
FIG. 2 is a diagram depicting optical paths of the imaging lens of Embodiment 1.

The imaging lens of Embodiment 1 is the imaging lens of the first aspect of the present invention and the embodiment of the first imaging lens, comprising a first lens 14, an aperture stop S, a second lens 16 and a third lens 18, where the first lens 14, the aperture stop S, the second lens 16 and the third lens 18 are arranged in this sequence from the object side to the image side, as shown in FIG. 1 and FIG. 2.

A single lens is used for the first lens 14. The second lens 16 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded. The third lens 18 is a junction type compound lens where a fourth sub-lens $L_4$ and a fifth sub-lens $L_5$ and a sixth sub-lens $L_6$ are arranged in this sequence from the object side to the image side, the fourth sub-lens $L_4$ and the fifth sub-lens $L_5$ are bonded, and the fifth sub-lens $L_5$ and the sixth sub-lens $L_6$ are bonded.

In the imaging lens of Embodiment 1, the first lens 14 is formed of the transparent curable silicone resin SMX-7852, made by Fuji Polymer Industries Co., Ltd. This transparent curable silicone resin SMX-7852, which is a curable resin material, is a thermo-setting silicone resin material, and the lens can be, formed by injection molding using a die. The first, third, fourth and sixth sub-lenses are also formed of the transparent curable silicone resin SMX-7852 (made by Fuji Polymer Industries Co., Ltd.), and the second sub-lens $L_2$ and the fifth sub-lens $L_5$ are formed of an optical glass BK7 made by Hoya Corporation.

(A) The refractive index $N_4$ of the first sub-lens $L_1$ is $N_4=1.51000$.

(B) The refractive index $N_5$ of the second sub-lens $L_2$ is $N_5=1.51633$.

(C) The refractive index $N_6$ of the third sub-lens $L_3$ is $N_6=1.51000$.

(D) The Abbe number $\nu_4$ of the first sub-lens $L_1$ is $\nu_4=56.0$.

(E) The Abbe number $\nu_5$ of the second sub-lens $L_2$ is $\nu_5=64.0$.

(F) The Abbe number $\nu_6$ of the third sub-lens $L_3$ is $\nu_6=56.0$.

(G) The refractive index $N_a$ of the fourth sub-lens $L_4$ is $N_8=1.51000$.

(H) The refractive index $N_9$ of the fifth sub-lens $L_5$ is $N_9=1.51633$.

(I) The refractive index $N_{10}$ of the sixth sub-lens $L_6$ is $N_{10}=1.51000$.

(J) The Abbe number $\nu_8$ of the fourth sub-lens $L_4$ is $\nu_9=56.0$.

(K) The Abbe number $\nu_9$ of the fifth sub-lens $L_5$ is $\nu_9=64.0$.

(L) The Abbe number $\nu_{10}$ of the sixth sub-lens $L_6$ is $\nu_{10}=56.0$.

Therefore, $|N_5-N_4|=|N_5-N_6|=|N_9-N_8|=|N_9-N_{10}|=0.00633$, which satisfies the following Conditions (1-1), (1-2), (1-5) and (1-6). Also $|\nu_5-\nu_4|=|\nu_5-\nu_6|=|\nu_9-\nu_8|=|\nu_9-\nu_{10}|=8.0$, which satisfies the following Conditions (1-3), (1-4), (1-7) and (1-8).

The Conditions (1-1), (1-2), (1-5) and (1-6) refer to the conditions given by the following Expressions (1-1), (1-2), (1-5) and (1-6). The Conditions (1-3), (1-4), (1-7) and (1-8) refer to the conditions given by the following Expression (1-3), (1-4), (1-7) and (1-8).

$$0 \leq |N_5 - N_4| \leq 0.1 \quad (1\text{-}1)$$

$$0 \leq |N_5 - N_6| \leq 0.1 \quad (1\text{-}2)$$

$$0 \leq |\nu_5 - \nu_4| \leq 30.0 \quad (1\text{-}3)$$

$$0 \leq |\nu_5 - \nu_6| \leq 30.0 \quad (1\text{-}4)$$

$$0 \leq |N_9 - N_8| \leq 0.1 \quad (1\text{-}5)$$

$$0 \leq |N_9 - N_{10}| \leq 0.1 \quad (1\text{-}6)$$

$$0 \leq |\nu_9 - \nu_8| \leq 30.0 \quad (1\text{-}7)$$

$$0 \leq |\nu_9 - \nu_{10}| \leq 30.0 \quad (1\text{-}8)$$

where $N_4$: refractive index of the first sub-lens $N_5$: refractive index of the second sub-lens $N_6$: refractive index of the third sub-lens $\nu_4$: Abbe number of the first sub-lens $\nu_5$: Abbe number of the second sub-lens $\nu_6$: Abbe number of the third sub-lens $N_8$: refractive index of the fourth sub-lens $N_9$: refractive index of the fifth sub-lens $N_{10}$: refractive index of the sixth sub-lens $\nu_8$: Abbe number of the fourth sub-lens $\nu_9$: Abbe number of the fifth sub-lens $\nu_{10}$: Abbe number of the sixth sub-lens The Conditions (1-1) to (1-8) refer to the conditions given by Expression (1-1) to (1-8) respectively, which is the same for the description herein below (description on Embodiment 4).

FIG. 2 is a diagram depicting optical paths of the imaging lens of Embodiment 1. As FIG. 2 shows, the aperture stop S is disposed between the first lens 14 and the second lens 16. The diaphragm surface of the aperture stop S is a plane, so $r_3 = \infty$ is shown in Table 1. The open F number Fno is 3.40.

As Table 1 shows, $r_5 = \infty$ and $r_6 = \infty$, so the second sub-lens $L_2$ constituting the second lens 16 is a plane parallel glass plate, and $r_9 = \infty$ and $r_{10} = \infty$, so the fifth sub-lens $L_5$ constituting the third lens 18 is a plane parallel glass plate.

$r_1$ is a positive value and $r_2$ is also a positive value, so the first lens 14 is a meniscus lens of which convex surface faces the object side on a paraxial line.

$r_4$ is a negative value, so the first sub-lens $L_1$, out of the sub-lenses constituting the second lens 16, is a plano-concave lens where the object side face of this first sub-lens $L_1$ is a concave surface facing the object side on a paraxial line, and $r_7$ is also a negative value, so the third sub-lens $L_3$ is a plano-convex lens where the image side face of this third sub-lens $L_3$ is a convex surface facing the image side on a paraxial line.

$r_8$ is a positive value, so the fourth sub-lens $L_4$, out of the sub-lenses constituting the third lens 18, is a plano-convex lens where the object side face of this fourth sub-lens $L_4$ is a convex surface facing the object side on a paraxial line, and $r_{11}$ is also a positive value, so the sixth sub-lens $L_6$ is a plano-concave lens where the image side face of this sixth sub-lens $L_6$ is a concave surface facing the image side on a paraxial line.

As FIG. 2 shows, the optical length L with respect to the focal distance f=1.00 mm is 1.229 mm, and the back focus bf is 0.400 mm.

Figure 3:
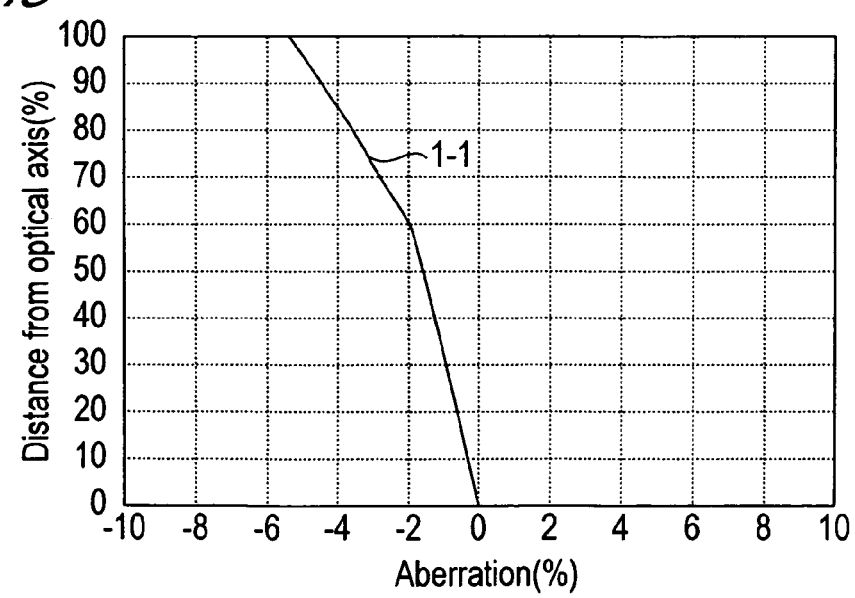
FIG. 3 is a graph depicting the distortion aberration of the imaging lens of Embodiment 1.
Figure 4:
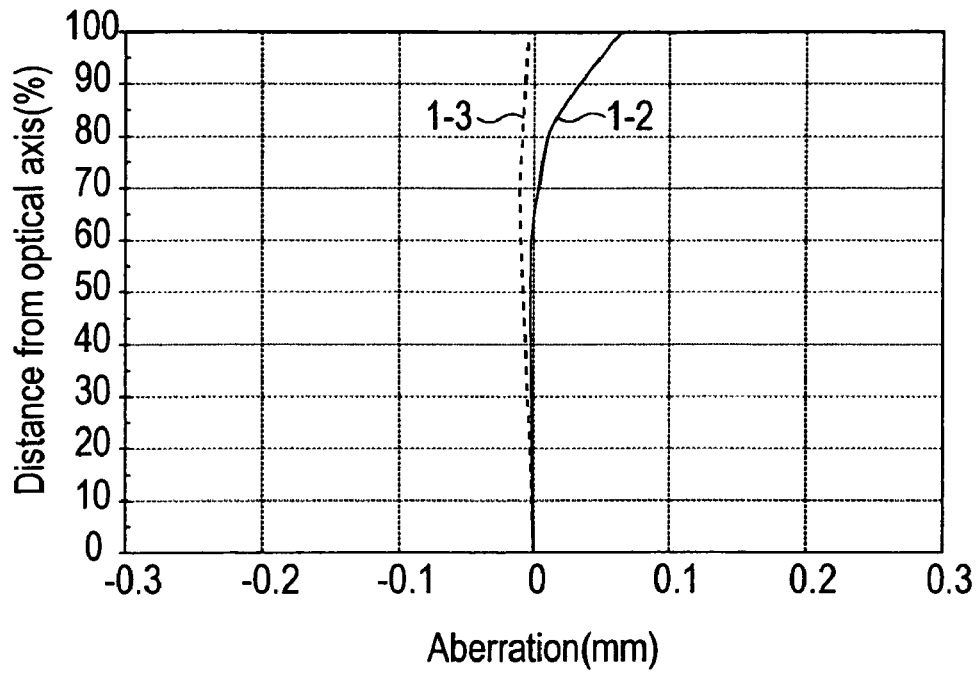
FIG. 4 is a graph depicting the astigmatism aberration of the imaging lens of Embodiment 1.
Figure 5:
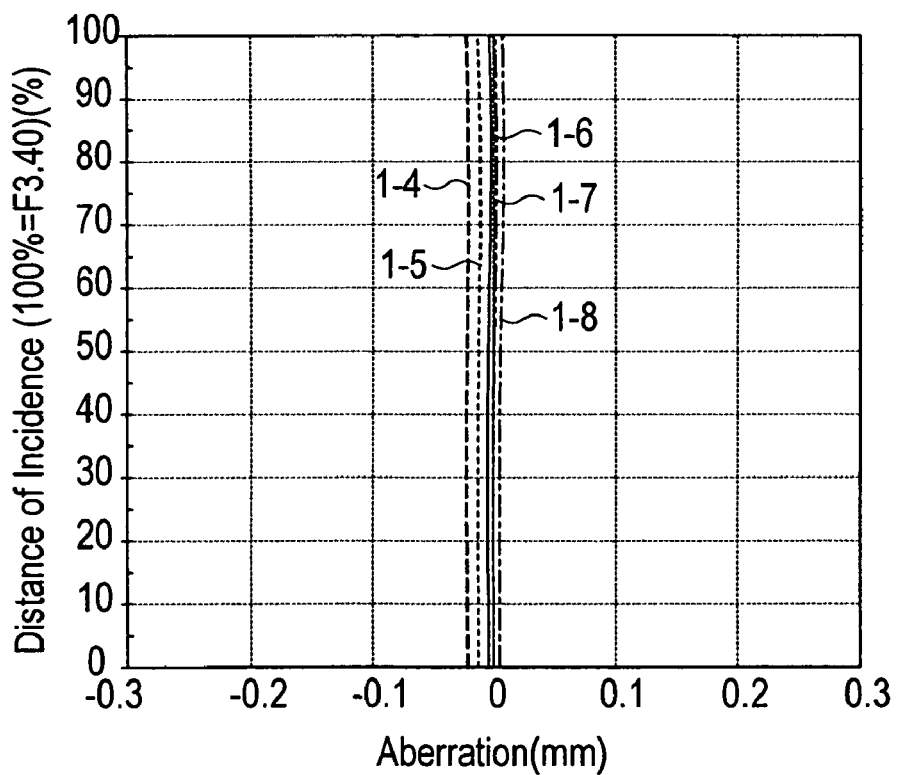
FIG. 5 is a graph depicting the chromatic/spherical aberration of the imaging lens of Embodiment 1.

FIG. 3 shows a graph of the distortion aberration curve 1-1, FIG. 4 shows a graph of the astigmatism aberration curve (aberration curve 1-2 on the meridional surface and the aberration curve 1-3 on the sagittal surface), and FIG. 5 shows a graph of a chromatic/spherical aberration curve (aberration curve 1-4 on g-line, aberration curve 1-5 on F-line, aberration curve 1-6 on e-line, aberration curve 1-7 on d-line and aberration curve 1-8 on C line).

The ordinates of the aberration curve in FIG. 3 and FIG. 4 show the image height by a % of the distance from the optical axis. In FIG. 3 and FIG. 4, 100% corresponds to 0.586 mm. The ordinate of the aberration curve in FIG. 5 shows the entrance height h (F number), and the maximum thereof corresponds to 3.40. The abscissa of FIG. 3 shows the aberration (%), and the abscissas of FIG. 4 and FIG. 5 show the value of the aberration (mm).

For the distortion aberration, the absolute value of the aberration is 5.38, which is the maximum, at the position of 100% image height (image height: 0.586 mm), and the absolute value of the aberration is within 5.38% in a range where the image height is 0.586 mm or less.

For the astigmatism aberration, the absolute value of the aberration on the meridional surface is 0.0643 mm, which is the maximum, at the position of 100% image height (image height: 0.586 mm), and the absolute value of the aberration is within 0.0643 mm in a range where the image height is 0.586 mm or less.

For the chromatic/spherical aberration, the absolute value of the aberration curve 1-4 on the g-line is 0.0231 mm, which is the maximum, at 100% entrance height h, and the absolute value of the aberration is within 0.0231 mm.

Therefore according to the imaging lens of Embodiment 1, the optical length can be short enough to be installed in a portable telephone, the back focus can be long enough to insert such components as a filter and a cover glass between the imaging lens and the image sensing plane, and good images can be acquired.

Embodiment 2

Figure 6:
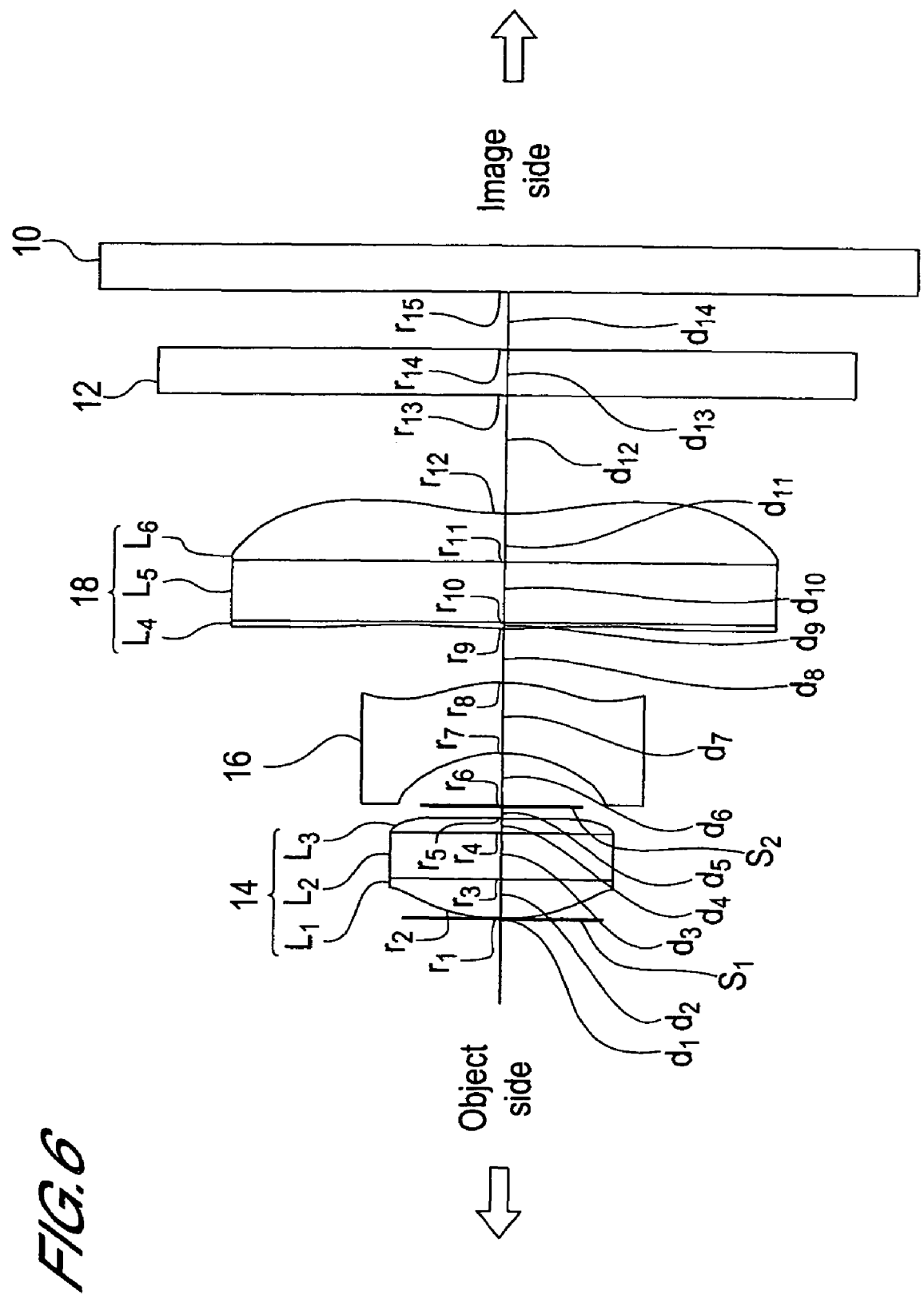
FIG. 6 is a diagram depicting a configuration of an imaging lens of Embodiment 2.
Figure 7:
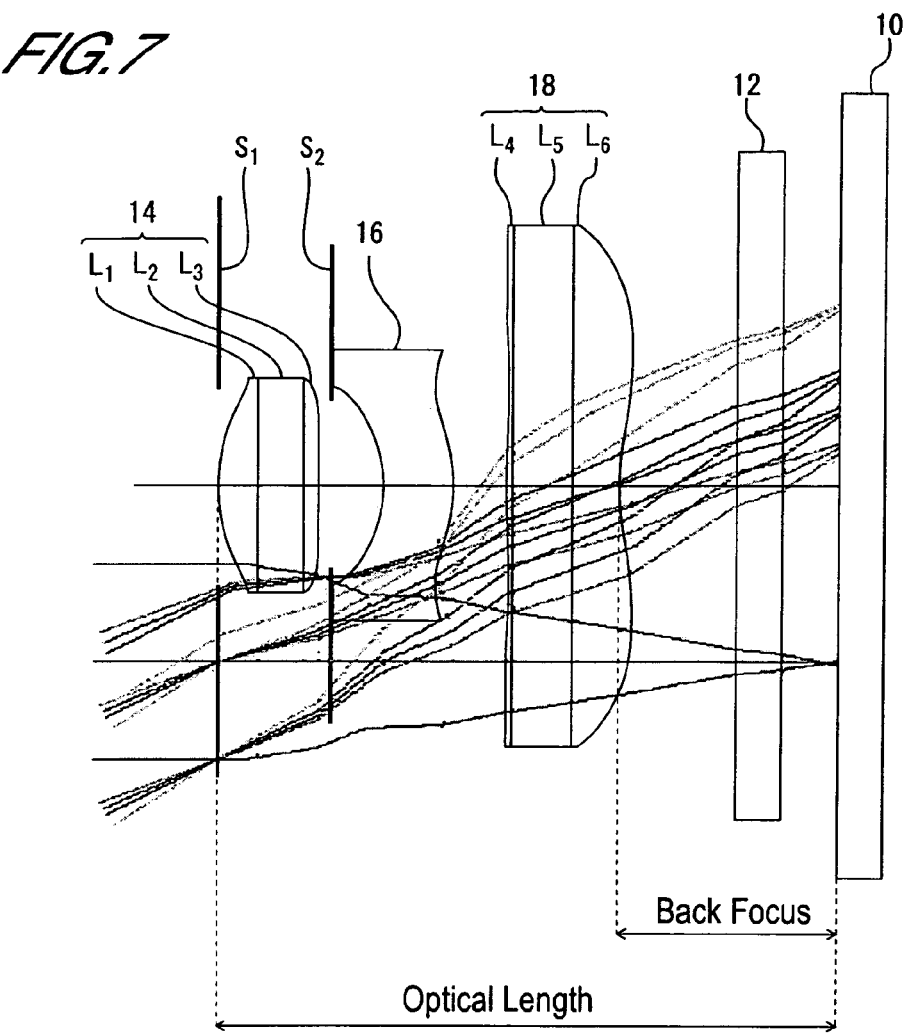
FIG. 7 is a diagram depicting optical paths of the imaging lens of Embodiment 2.

The imaging lens of Embodiment 2 is the imaging lens of the first aspect of the present invention and the embodiment of the second imaging lens, comprising an aperture stop (first diaphragm) $S_1$, a first lens 14, a second, diaphragm $S_2$, a second lens 16 and a third lens 18, where the aperture stop $S_1$, the first lens 14, the second diaphragm $S_2$, the second lens 16 and the third lens 18 are arranged in this sequence from the object side to the image side, as shown in FIG. 6 and FIG. 7.

A single lens is used for the second lens 16. The first lens 14 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded. The third lens 18 is a junction type compound lens where a fourth sub-lens $L_4$, a fifth sub-lens $L_5$ and a sixth sub-lens $L_6$ are arranged in this sequence from the object side to the image side, the fourth sub-lens $L_4$ and the fifth sub-lens $L_5$ are bonded, and the fifth sub-lens $L_5$ and the sixth sub-lens $L_6$ are bonded.

In the imaging lens of Embodiment 2, the second lens 16 is formed of the optical glass BK7. The first, third, fourth and sixth sub-lenses are formed of the transparent curable silicone resin SMX-7852, which is a curable resin material (made by Fuji Polymer Industries Co., Ltd.), and the second and fifth sub-lenses are formed of the optical glass BK7 made by Hoya Corporation.

(A) The refractive index $N_2$ of the first sub-lens $L_1$ is $N_2=1.51000$.

(B) The refractive index $N_3$ of the second sub-lens $L_2$ is $N_3=1.51633$.

(C) The refractive index $N_4$ of the third sub-lens $L_3$ is $N_4=1.51000$.

(D) The Abbe number $\nu_2$ of the first Sub-lens $L_1$ is $\nu_2=56.0$.

(E) The Abbe number $\nu_3$ of the second sub-lens $L_2$ is $\nu_3=64.0$.

(F) The Abbe number $\nu_4$ of the third sub-lens $L_3$ is $\nu_4=56.0$.

(G) The refractive index $N_9$ of the fourth sub-lens $L_4$ is $N_9=1.51000$.

(H) The refractive index $N_{10}$ of the fifth sub-lens $L_5$ is $N_{10}=1.51633$.

(I) The refractive index $N_{11}$ of the sixth sub-lens $L_6$ is $N_{11}=1.51000$.

(J) The Abbe number $\nu_9$ of the fourth sub-lens $L_4$ is $\nu_9=56.0$.

(K) The Abbe number $\nu_{10}$ of the fifth sub-lens $L_5$ is $\nu_{10}=64.0$.

(L) The Abbe number $\nu_{11}$ of the sixth sub-lens $L_6$ is $\nu_{11}=56.0$.

Therefore, $|N_3-N_2|=|N_3-N_4|=|N_{10}-N_9|=|N_{10}-N_{11}|=0.00633$, which satisfies the following Conditions (2-1), (2-2), (2-5) and (2-6). Also $|\nu_3-\nu_2|=|\nu_3-\nu_4|=|\nu_{10}-\nu_9|=|\nu_{10}-\nu_{11}|=8.0$, which satisfies the following Conditions (2-3), (2-4), (2-7) and (2-8).

The Conditions (2-1), (2-2), (2-5) and (2-6) refer to the conditions given by the following Expression (2-1), (2-2), (2-5) and (2-6). The Conditions (2-3), (2-4), (2-7) and (2-8) refer to the conditions given by the following Expression (2-3), (2-4), (2-7) and (2-8).

$$0 \leq |N_3-N_2| \leq 0.1 \quad (2\text{-}1)$$

$$0 \leq |N_3-N_4| \leq 0.1 \quad (2\text{-}2)$$

$$0 \leq |\nu_3-\nu_2| \leq 30.0 \quad (2\text{-}3)$$

$$0 \leq |\nu_3-\nu_4| \leq 30.0 \quad (2\text{-}4)$$

$$0 \leq |N_{10}-N_9| \leq 0.1 \quad (2\text{-}5)$$

$$0 \leq |N_{10}-N_{11}| \leq 0.1 \quad (2\text{-}6)$$

$$0 \leq |\nu_{10}-\nu_9| \leq 30.0 \quad (2\text{-}7)$$

$$0 \leq |\nu_{10}-\nu_{11}| \leq 30.0 \quad (2\text{-}8)$$

where $N_2$: refractive index of the first sub-lens $N_3$: refractive index of the second sub-lens $N_4$: refractive index of the third sub-lens $\nu_2$: Abbe number of the first sub-lens $\nu_3$: Abbe number of the second sub-lens $\nu_4$: Abbe number of the third sub-leas $N_9$: refractive index of the fourth sub-lens $N_{10}$: refractive index of the fifth sub-lens $N_{11}$: refractive index of the sixth sub-lens $\nu_9$: Abbe number of the fourth sub-lens $\nu_{10}$: Abbe number of the fifth sub-lens $\nu_{11}$: Abbe number of the sixth sub-lens The Conditions (2-1) to (2-8) refer to the conditions given by Expressions (2-1) to (2-8) respectively, which is the same for the description herein below (description on Embodiment 5).

FIG. 6 is a cross-sectional view of the imaging lens of Embodiment 2. As FIG. 6 shows, the first diaphragm $S_1$, which plays a role of an aperture stop, is formed at a position of an intersection of the first surface (surface at the object side) of the first sub-lens $L_1$ constituting the first lens 14 and the optical axis. The second diaphragm $S_2$, which plays a role of preventing a flare or smear is formed between the first lens 14 and the second lens 16.

The diaphragm surface of the first diaphragm $S_1$ is a plane $r_1$, so $r_1=\infty$ is shown in Table 2. The second diaphragm $S_2$ is a plane $r_6$, so $r_6=\infty$ is shown in Table 2. The open F number Fno is 2.90.

As Table 2 shows, $r_3=\infty$ and $r_4=\infty$, so the second sub-lens $L_2$ constituting the first lens 14 is a plane parallel glass plate, and $r_{10}=\infty$ and $r_{11}=\infty$, so the fifth sub-lens $L_5$ constituting the third lens 18 is a plane parallel glass plate.

$r_7$ is a negative value and $r_8$ is also a negative value, so the second lens 16 is a meniscus lens of which convex surface faces the image side on a paraxial line.

$r_2$ is a positive value, so the first sub-lens $L_1$ constituting the first lens 14 is a plano-convex lens where the object side face of this first sub-lens $L_1$ is a convex surface facing the object side on a paraxial line, and $r_5$ is a negative value, so the third sub-lens $L_3$ is a plano-convex lens where the image side face of this third sub-lens $L_3$ is a convex surface facing the image side on a paraxial line.

$r_9$ is a positive value, so the fourth sub-lens $L_4$ constituting the third lens 18 is a plano-convex lens where the object side face of this fourth sub-lens $L_4$ is a convex surface facing the object side on a paraxial line, and $r_{12}$ is also a positive value, so the sixth sub-lens $L_6$ is a plano-concave lens where the image side face of this sixth sub-lens $L_6$ is a concave surface facing the image side on a paraxial line.

As FIG. 7 shows, the optical length L with respect to the focal distance f=1.00 mm is 1.080 mm, and the back focus bf is 0.354 mm.

Figure 8:
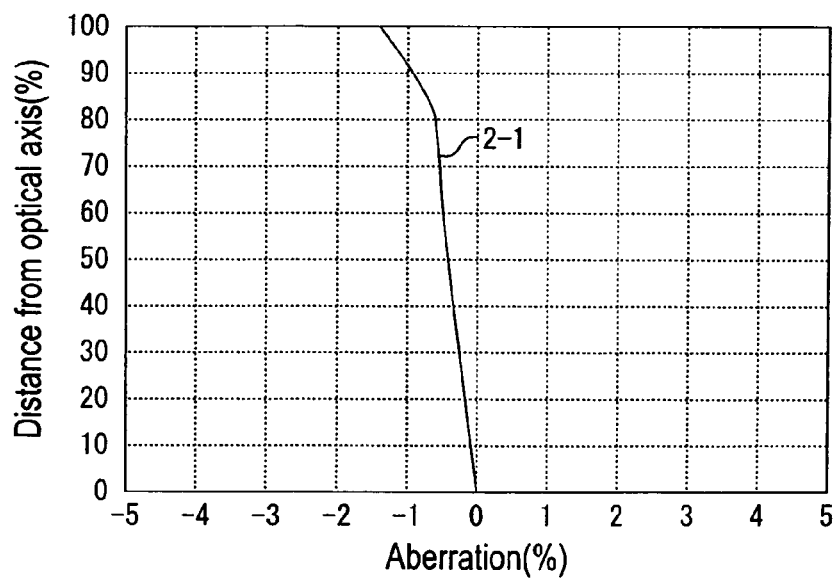
FIG. 8 is a graph depicting the distortion aberration of the imaging lens of Embodiment 2.
Figure 9:
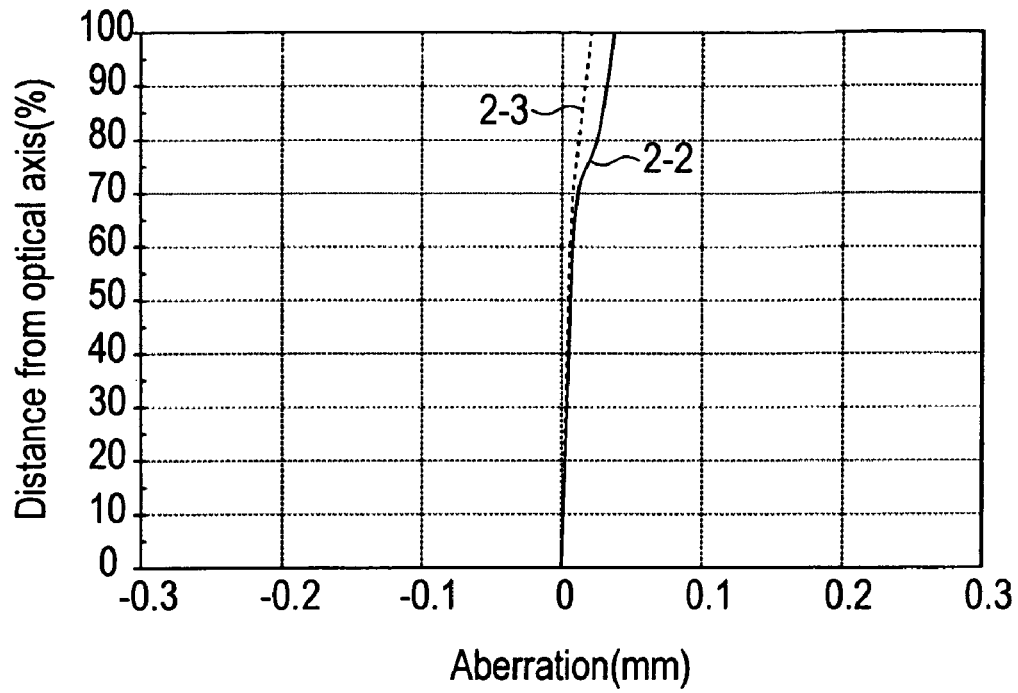
FIG. 9 is a graph depicting the astigmatism aberration of the imaging lens of Embodiment 2.
Figure 10:
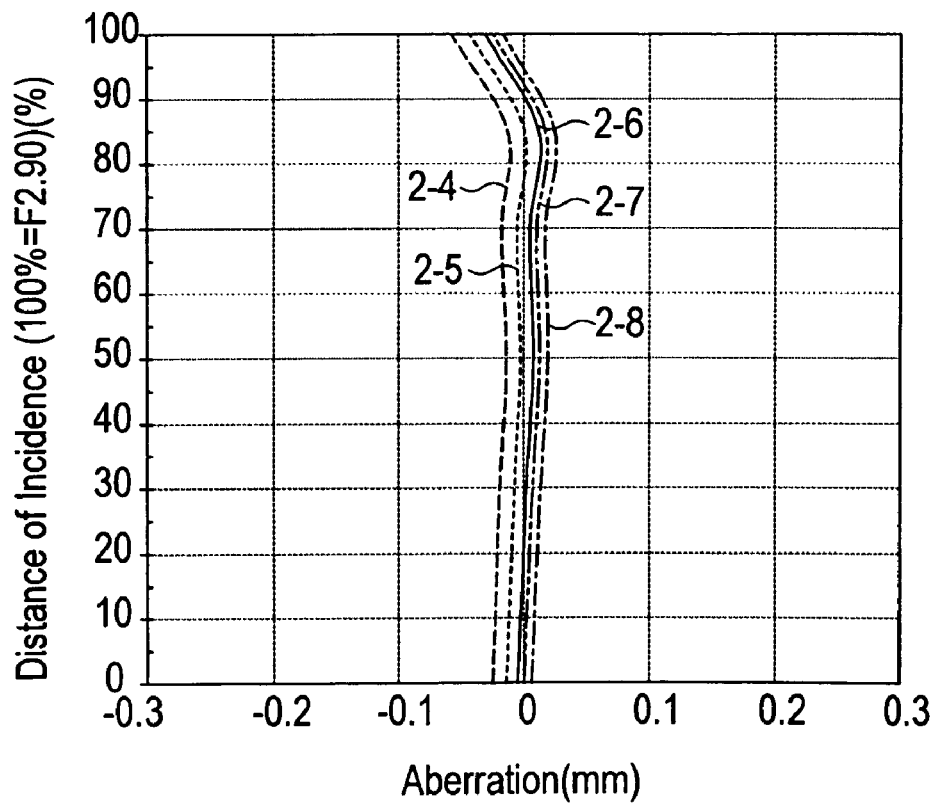
FIG. 10 is a graph depicting the chromatic/spherical aberration of the imaging lens of Embodiment 2.

FIG. 8 shows a graph of the distortion aberration curve 2-1, FIG. 9 shows a graph of the astigmatism aberration curve (aberration curve 2-2 on the meridional surface and the aberration curve 2-3 on the sagittal surface), and FIG. 10 shows a graph of a chromatic/spherical aberration curve (aberration curve 2-4 on g-line, aberration curve 2-5 on F-line, aberration curve 2-6 on e-line, aberration curve 2-7 on d-line and aberration curve 2-8 on C-line).

The ordinates of the aberration curve in FIG. 8 and FIG. 9 show the image height by a % of the distance from the optical axis. In FIG. 8 and FIG. 9, 100% corresponds to 0.630 mm. The ordinate of the aberration curve in FIG. 10 shows the entrance height h (F number), and the maximum thereof corresponds to 2.90. The abscissa of FIG. 8 shows the aberration (%), and the abscissas of FIG. 9 and FIG. 10 show the value of the aberration (mm).

For the distortion aberration, the absolute value of the aberration is 1.40%, which is the maximum, at the position of 100% image height (image height: 0.630 mm), and the absolute value of the aberration is within 1.40% in a range where the image height is 0.630 mm or less.

For the astigmatism aberration, the absolute value of the aberration on the meridional surface is 0.0369 mm, which is the maximum, at the position of 100% image height (image height: 0.630 mm), and the absolute value of the aberration is within 0.0369 mm in a range where the image height is 0.630 mm or less.

For the chromatic/spherical aberration, the absolute value of the aberration curve 2-4 on the g-line is 0.0575 mm, which is the maximum, at 100% entrance height h, and the absolute value of the aberration is within 0.0575 mm.

Therefore according to the imaging lens of Embodiment 2, the optical length can be short enough to be installed in a portable telephone, the back focus can be long enough to insert such components as a filter and a cover glass between the imaging lens and the image sensing plane, and good images can be acquired.

Embodiment 3

Figure 11:
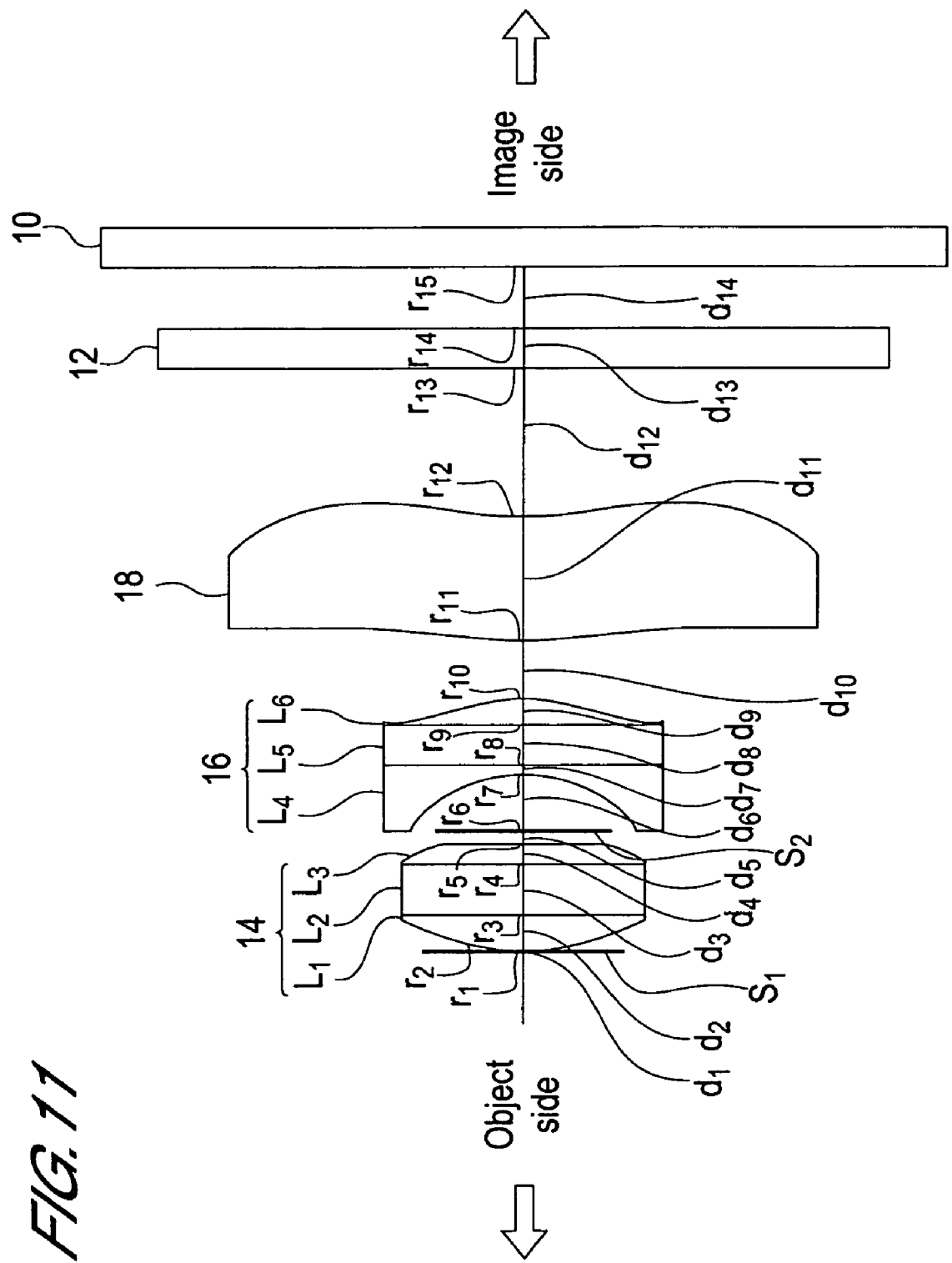
FIG. 11 is a diagram depicting a configuration of an imaging lens of Embodiment 3.
Figure 12:
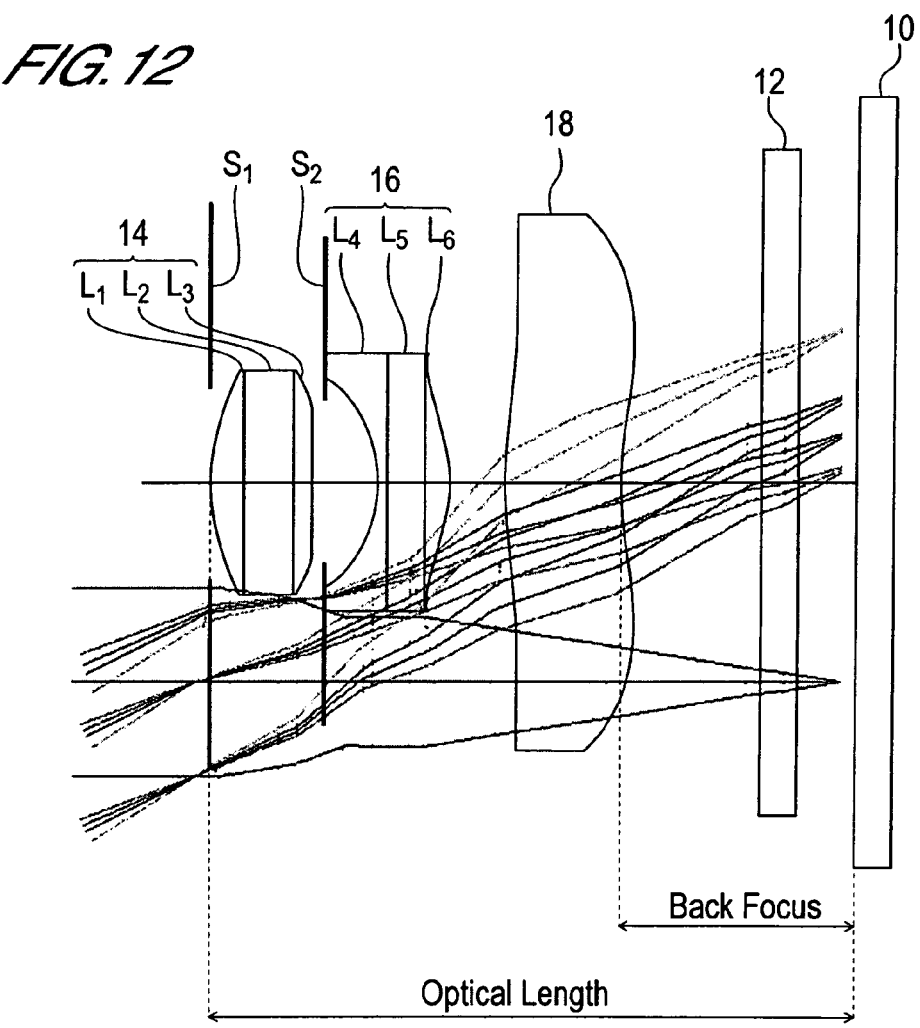
FIG. 12 is a diagram depicting optical paths of the imaging lens of Embodiment 3.

The imaging lens of Embodiment 3 is an imaging lens of the first aspect of the present invention, and the embodiment of the third imaging lens of the present invention, comprising, an aperture stop (first diaphragm) $S_1$, a first lens 14, a second diaphragm $S_2$, a second lens 16 and a third lens 18, where the first diaphragm $S_1$, the first lens 14, the second diaphragm $S_2$, the second lens 16 and the third lens 18 are arranged in this sequence from the object side to the image side, as shown in FIG. 11 and FIG. 12.

A single lens is used for the third lens 18. The first lens 14 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded. The second lens 16 is a junction type compound lens where a fourth sub-lens $L_4$, a fifth sub-lens $L_5$ and a sixth sub-lens $L_6$ are arranged in this sequence from the object side to the image side, the fourth sub-lens $L_4$ and the fifth sub-lens $L_5$ are bonded, and the fifth sub-lens $L_5$ and the sixth sub-lens $L_6$ are bonded.

In the imaging lens of Embodiment 3, the third lens 18 and the second sub-lens $L_2$ are formed of the optical glass BK7. The first sub-lens $L_1$ and the third sub-lens $L_3$ are formed of the curable resin material SR-7010 (made by Dow Corning Toray Co., Ltd.). The fourth sub-lens $L_4$ and the sixth sub-lens $L_6$ are formed of a curable resin material SMX-7877 (made by Fuji Polymer Industries Co., Ltd.). The fifth sub-lens $L_5$ is formed of the optical glass E-F5 (made by Hoya Corporation).

(A) The refractive index $N_2$ of the first sub-lens $L_1$ is $N_2$=1.53000.

(B) The refractive index $N_3$ of the second sub-lens $L_2$ is $N_3$=1.51633.

(C) The refractive index $N_4$ of the third sub-lens $L_3$ is $N_4$=1.53000.

(D) The Abbe number $v_2$ of the first sub-lens $L_1$ is $v_2$=35.0.

(E) The Abbe number $v_3$ of the second sub-lens $L_2$ is $v_3$=64.0.

(F) The Abbe number $v_4$ of the third sub-lens $L_3$ is $v_4$=35.0.

(G) The refractive index $N_7$ of the fourth sub-lens $L_4$ is $N_7$=1.60000.

(H) The refractive index $N_8$ of the fifth sub-lens $L_5$ is $N_8$=1.60342.

(I) The refractive index $N_9$ of the sixth sub-lens $L_6$ is $N_9$=1.60000.

(J) The Abbe number $v_7$ of the fourth sub-lens $L_4$ is $v_7$=30.0.

(K) The Abbe number $v_8$ of the fifth sub-lens $L_5$ is $v_8$=38.0.

(L) The Abbe number $v_9$ of the sixth sub-lens $L_6$ is $v_9$=30.0.

Therefore, $|N_3-N_2|=|N_3-N_4|=0.01367$, and $|N_8-N_7|=|N_8-N_9|=0.00342$, which satisfies the following Conditions (3-1), (3-2), (3-5) and (3-6). Also $|v_3-v_2|=|v_3-v_4|=29.0$ and $|v_8-v_7|=|v_8-v_9|=8.0$, which satisfies the following Conditions (3-3), (3-4), (3-7) and (3-8).

The Conditions (3-1), (3-2), (3-5) and (3-6) refer to the conditions given by the following Expression (3-1), (3-2), (3-5) and (3-6). The conditions (3-3), (3-4), (3-7) and (3-8) refer to the conditions given by the following Expression (3-3), (3-4), (3-7) and (3-8).

$$0 \leq |N_3-N_2| \leq 0.1 \qquad (3-1)$$

$$0 \leq |N_3-N_4| \leq 0.1 \qquad (3-2)$$

$$0 \leq |v_3-v_2| \leq 30.0 \qquad (3-3)$$

$$0 \leq |v_3-v_4| \leq 30.0 \qquad (3-4)$$

$$0 \leq |N_8-N_7| \leq 0.1 \qquad (3-5)$$

$$0 \leq |N_8-N_9| \leq 0.1 \qquad (3-6)$$

$$0 \leq |v_8-v_7| \leq 30.0 \qquad (3-7)$$

$$0 \leq |v_8-v_9| \leq 30.0 \qquad (3-8)$$

where $N_2$: refractive index of the first sub-lens $N_3$: refractive index of the second sub-lens $N_4$: refractive index of the third sub-lens $v_2$: Abbe number of the first sub-lens $v_3$: Abbe number of the second sub-lens $v_4$: Abbe number of the third sub-lens $N_7$: refractive index of the fourth sub-lens $N_8$: refractive index of the fifth sub-lens $N_9$: refractive index of the sixth sub-lens $v_7$: Abbe number of the fourth sub-lens $v_8$: Abbe number of the fifth sub-lens $v_9$: Abbe number of the sixth sub-lens The Conditions (3-1) to (3-8) refer to the conditions given by Expression (3-1) to (3-8) respectively, which is the same for the description herein below (description on Embodiment 6).

FIG. 11 shows a cross-sectional view of the imaging lens of Embodiment 3. As FIG. 11 shows, the first diaphragm $S_1$, which plays a role of an aperture stop, is formed at a position of an intersection of the first surface (surface at the object side) of the first sub-lens $L_1$ constituting the first lens 14 and the optical axis. The second diaphragm $S_2$, which plays a role of preventing a flare or smear is formed between the first lens 14 and the second lens 16.

The diaphragm surface of the first diaphragm $S_1$ is a plane $r_1$, so $r_1=\infty$ is shown in Table 3. The second diaphragm $S_2$ is a plane $r_6$, so $r_6=\infty$ is shown in Table 3. The open F number Fno is 2.96.

As Table 3 shows, $r_3=\infty$ and $r_4=\infty$, so the second sub-lens $L_2$ constituting the first lens 14 is a plane parallel glass plate, and $r_8=\infty$ and $r_9=\infty$, so the fifth sub-lens $L_5$ constituting the second lens 16 is a plane parallel glass plate.

$r_{11}$ is a positive value and $r_{12}$ is also a positive value, so the third lens 18 is a meniscus lens of which convex surface faces the object side on a paraxial line.

$r_2$ is a positive value, so the first sub-lens $L_1$ constituting the first lens 14 is a plano-convex lens where the object side face of this first sub-lens $L_1$ is a convex surface facing the object side on a paraxial line, and $r_5$ is a negative value, so the third sub-lens $L_3$ is a plano-convex lens where the image side of this third sub-lens $L_3$ is a convex surface facing the image side on a paraxial line.

$r_7$ is a negative value, so the fourth sub-lens $L_4$ constituting the second lens 16 is a plano-concave lens where the object side face of this fourth sub-lens $L_4$ is a concave surface facing the object side on a paraxial line, and $r_{10}$ is also a negative value, so the sixth sub-lens $L_6$ is a plano-convex lens where the image side face of this sixth sub-lens $L_6$ is a convex surface facing the image side on a paraxial line.

As FIG. 12 shows, the optical length L with respect to the focal distance f=1.00 mm is 1.137 mm, and the back focus bf is 0.392 mm.

Figure 13:
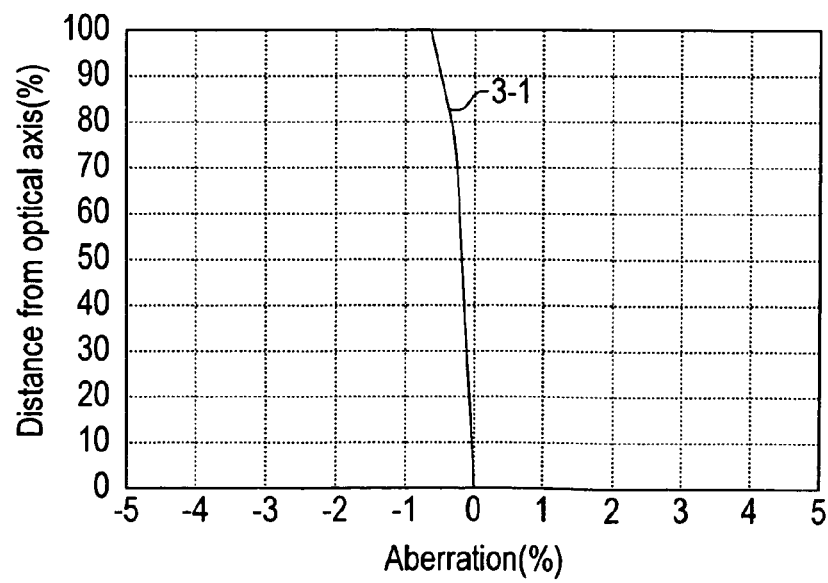
FIG. 13 is a graph depicting the distortion aberration of the imaging lens of Embodiment 3.
Figure 14:
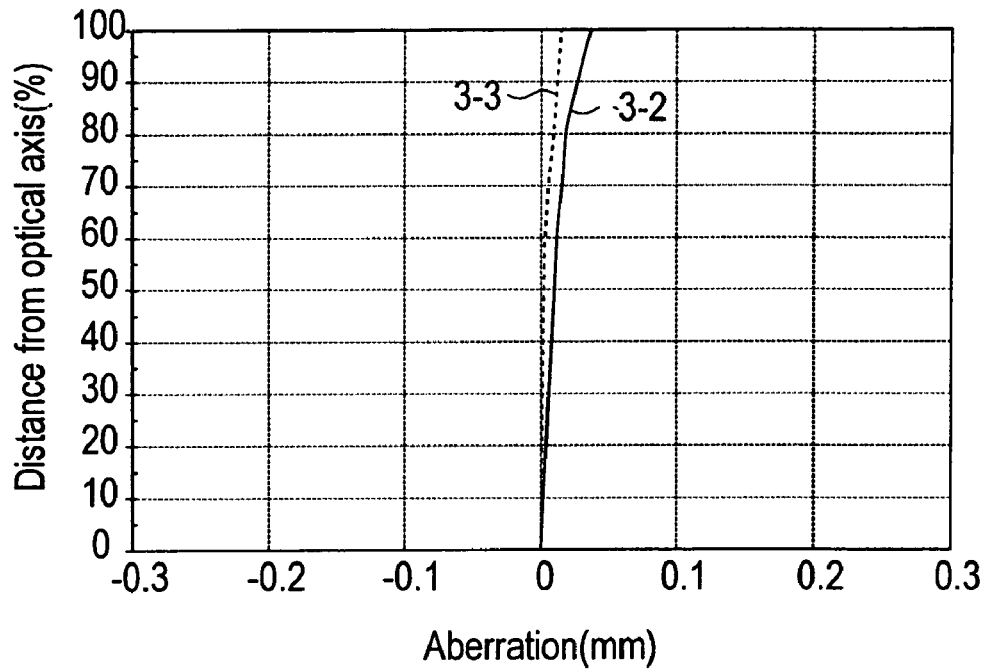
FIG. 14 is a graph depicting the astigmatism aberration of the imaging lens of Embodiment 3.
Figure 15:
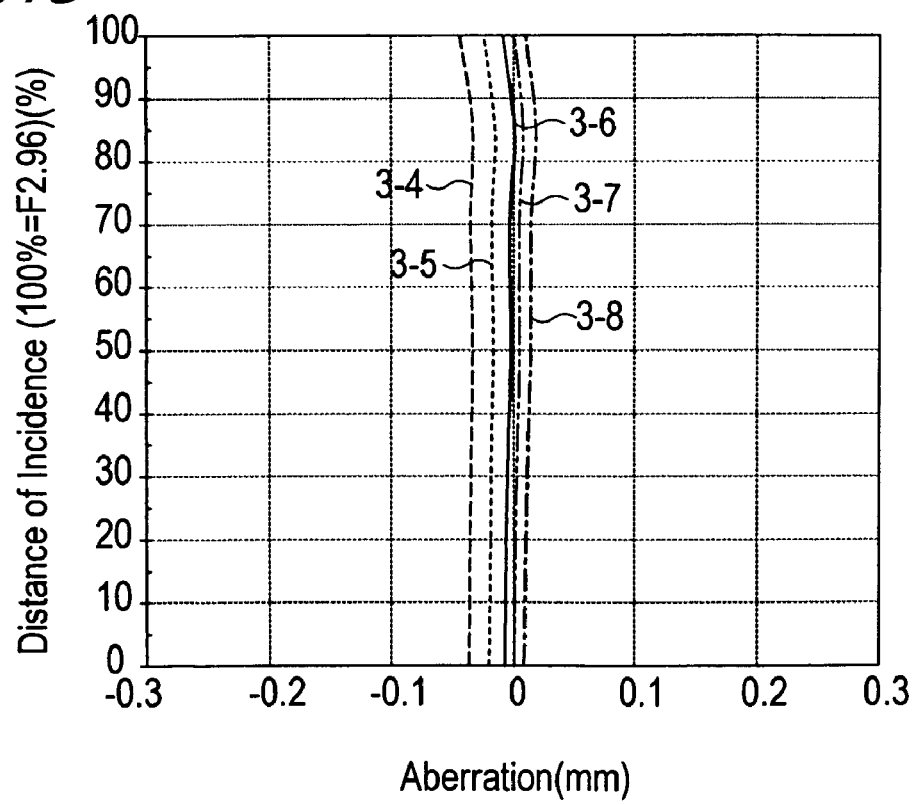
FIG. 15 is a graph depicting the chromatic/spherical aberration of the imaging lens of Embodiment 3.

FIG. 13 shows a graph of the distortion aberration curve 3-1, FIG. 14 shows a graph of the astigmatism aberration curve (aberration curve 3-2 on the meridional surface and aberrational curve 3-3 on the sagittal surface), and FIG. 15 shows a graph of the chromatic/spherical aberration curve (aberration curve 3-4 on g-line, aberration curve 3-5 on F-line, aberration curve 3-6 on e-line, aberration curve 3-7 on d-line, and aberration curve 3-8 on C-line).

The ordinates of the aberration curve in FIG. 13 and FIG. 14 show the image height by a % of the distance from the optical axis. In FIG. 13 and FIG. 14, 100% corresponds to 0.631 mm. The ordinate of an aberration curve in FIG. 15 shows the entrance height h (F number), and the maximum thereof corresponds to 2.96. The abscissa of FIG. 13 shows the aberration (%), and the abscissas of FIG. 14 and FIG. 15 show the value of the aberration (mm).

For the distortion aberration, the absolute value of the aberration is 0.64%, which is the maximum, at the position of 100% image height (image height: 0.631 mm), and the absolute value of the aberration is within 0.64% in a range where the image height is 0.631 mm or less.

For the astigmatism aberration, the absolute value of the aberration on the meridional surface is 0.0368 mm, which is the maximum, at the position of 100% image height (image height: 0.631 mm), and the absolute value of the aberration is within 0.0368 mm in a range where the image height is 0.631 mm or less.

For the chromatic/spherical aberration, the absolute value of the aberration curve 3-4 on the g-line is 0.0440 mm, which is the maximum, at 100% entrance height h, and the absolute value of the aberration is within 0.0440 mm.

Therefore according to the imaging lens of Embodiment 3, the optical length can be short enough to be installed in a portable telephone, the back focus can be long enough to insert such components as a filter and a cover glass between the imaging lens and the image sensing plane, and good images can be acquired.

Embodiment 4

Figure 16:
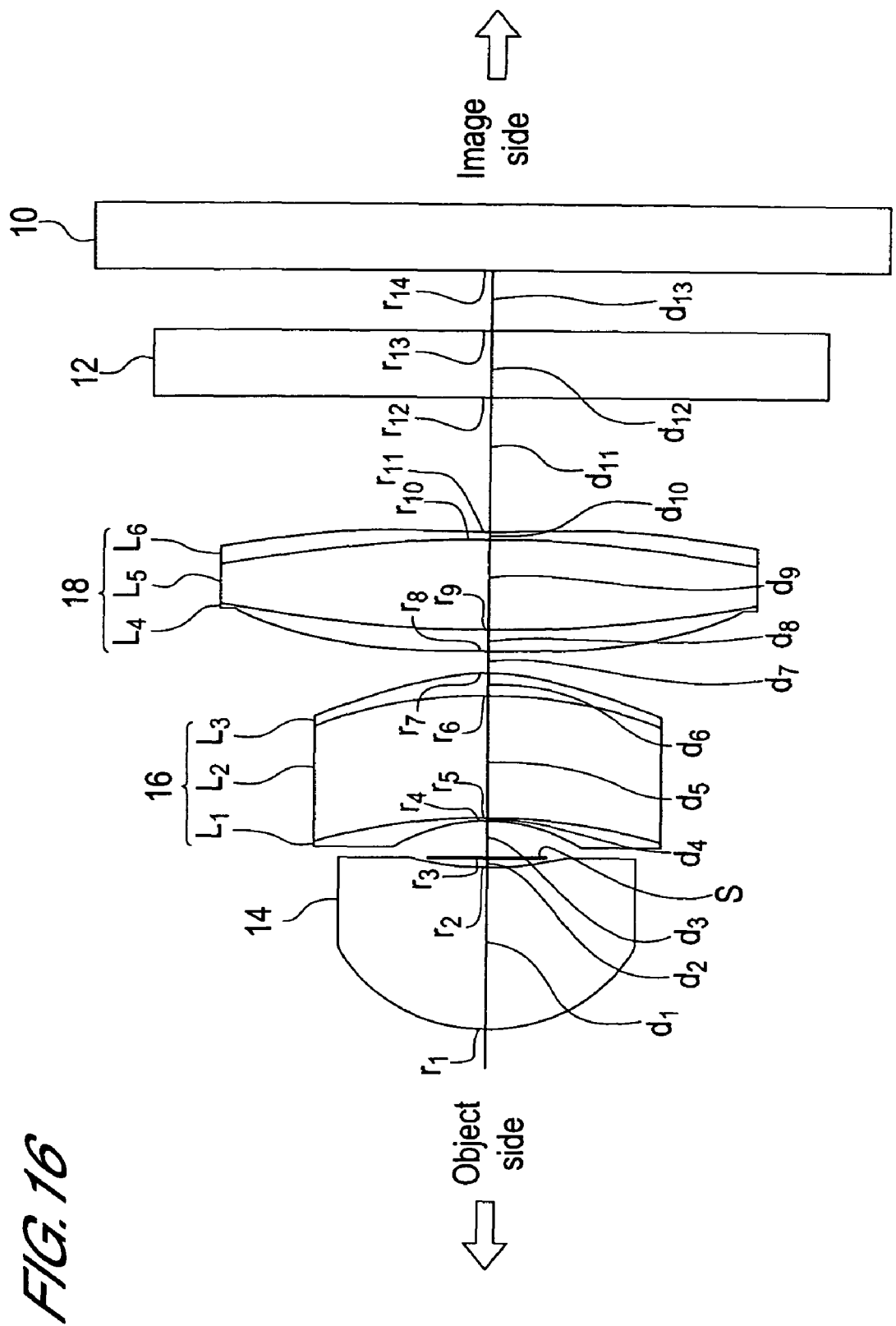
FIG. 16 is a diagram depicting a configuration of an imaging lens of Embodiment 4.
Figure 17:
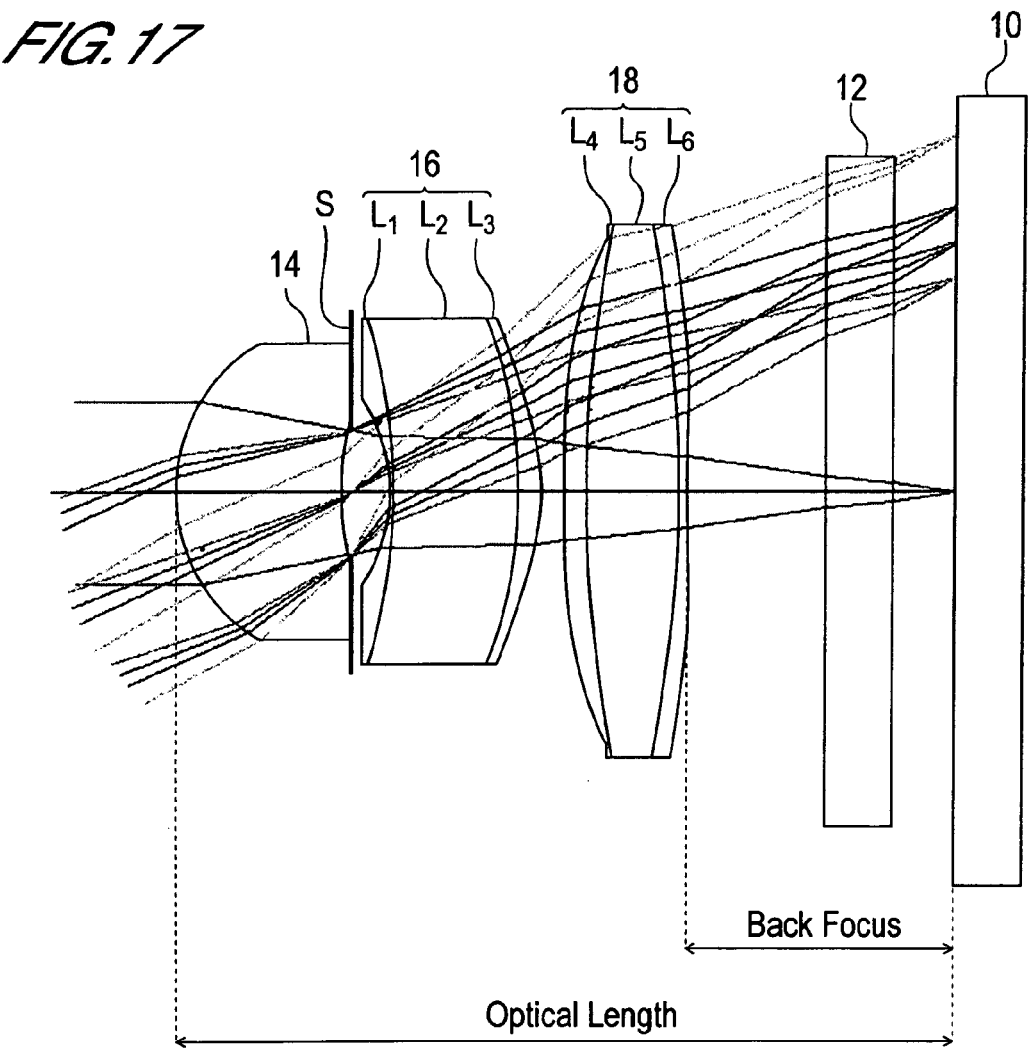
FIG. 17 is a diagram depicting optical paths of the imaging lens of Embodiment 4.

The imaging lens of Embodiment 0.4 is an imaging lens of the first aspect of the present invention, and the embodiment of the first imaging lens of the present invention, comprising a first lens 14, an aperture stop S, a second lens 16 and a third lens 18, where the first lens 14, the aperture stop S, the second lens 16 and the third lens 18 are arranged in this sequence from the object side to the image side, as shown in FIG. 16 and FIG. 17.

A single lens is used for the first lens 14. The second lens 16 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded. The third lens 18 is a junction type compound lens where a fourth sub-lens $L_4$, a fifth sub-lens $L_5$ and a sixth sub-lens $L_6$ are arranged in this sequence from the object side to the image side, the fourth sub-lens $L_4$ and the fifth sub-lens $L_5$ are bonded, and the fifth sub-lens $L_5$ and the sixth sub-lens $L_6$ are bonded.

In the imaging lens of Embodiment 4, the first lens 14, the second sub-lens $L_2$ and the fifth sub-lens $L_5$ are formed of the optical glass BK7 made by Hoya Corporation. The first, third, fourth and sixth sub-lenses are formed of the transparent curable silicone resin SMX-7852 (made by Fuji Polymer Industries Co., Ltd.).

(A) The refractive index $N_4$ of the first sub-lens $L_1$ is $N_4=1.51000$.

(B) The refractive index $N_5$ of the second sub-lens $L_2$ is $N_5=1.51630$.

(C) The refractive index $N_6$ of the third sub-lens $L_3$ is $N_6=1.51000$.

(D) The Abbe number $\nu_4$ of the first sub-lens $L_1$ is $\nu_4=56.0$.

(E) The Abbe number $\nu_5$ of the second sub-lens $L_2$ is $\nu_5=64.0$.

(F) The Abbe number $\nu_6$ of the third sub-lens $L_3$ is $\nu_6=56.0$.

(G) The refractive index $N_8$ of the fourth sub-lens $L_4$ is $N_8=1.51000$.

(H) The refractive index $N_9$ of the fifth sub-lens $L_5$ is $N_9=1.51630$.

(I) The refractive index $N_{10}$ of the sixth sub-lens $L_6$ is $N_{10}=1.51000$.

(J) The Abbe number $\nu_8$ of the fourth sub-lens $L_4$ is $\nu_8=56.0$.

(K) The Abbe number $\nu_9$ of the fifth sub-lens $L_5$ is $\nu_9=64.0$.

(L) The Abbe number $\nu_{10}$ of the sixth sub-lens $L_6$ is $\nu_{10}=56.0$.

Therefore, $|N_5-N_4|=|N_5-N_6|=|N_9-N_8|=|N_9-N_{10}|=0.00630$, which satisfies the above mentioned Conditions (1-1), (1-2), (1-5) and (1-6). Also $|\nu_5-\nu_4|=|\nu_5-\nu_6|=|\nu_9-\nu_8|=|\nu_9-\nu_{10}|=8.0$, which satisfies the above mentioned Conditions (1-3), (1-4), (1-7) and (1-8).

FIG. 16 shows a cross-sectional view of the imaging lens of Embodiment 4. As FIG. 16 shows, the aperture stop S is formed between the first lens 14 and the second lens 16. The diaphragm surface of the aperture stop S is a plane, so $r_3=\infty$ is shown in Table 4. The open F number Fno is 3.40.

As Table 4 shows, $r_5$ and $r_6$ are negative values, so the second sub-lens $L_2$ constituting the second lens 16 is a meniscus lens of which convex surface faces the image side, and $r_9$ is a positive value and $r_{10}$ is a negative value, so the fifth sub-lens L5 constituting the third lens 18 is a biconvex lens of which both side faces are convex surfaces.

$r_1$ is a positive value and $r_2$ is also a positive value, so the first lens 14 is a meniscus lens of which convex surface faces the object side on a paraxial line.

$r_4$ is a negative value, so the first sub-lens $L_1$ is a lens where the object side face of this first sub-lens $L_1$ is a concave surface facing the object side on a paraxial line, and $r_7$ is also a negative value, so the third sub-lens $L_3$ is a lens where the image side face of this third sub-lens $L_3$ is a convex surface facing the image side on a paraxial line.

$r_8$ is a positive value, so the fourth sub-lens $L_4$ constituting the third lens 18 is a lens where the object side face of this fourth sub-lens $L_4$ is a convex surface facing the object side on a paraxial line, and $r_{11}$ is also a positive value, so the sixth sub-lens $L_6$ is also a lens where the image side face of this sixth sub-lens $L_6$ is a concave surface facing the image side on a paraxial line.

As FIG. 17 shows, the optical length L with respect to the focal distance f=1.00 mm is 1.235 mm, and the back focus bf is 0.391 mm.

Figure 18:
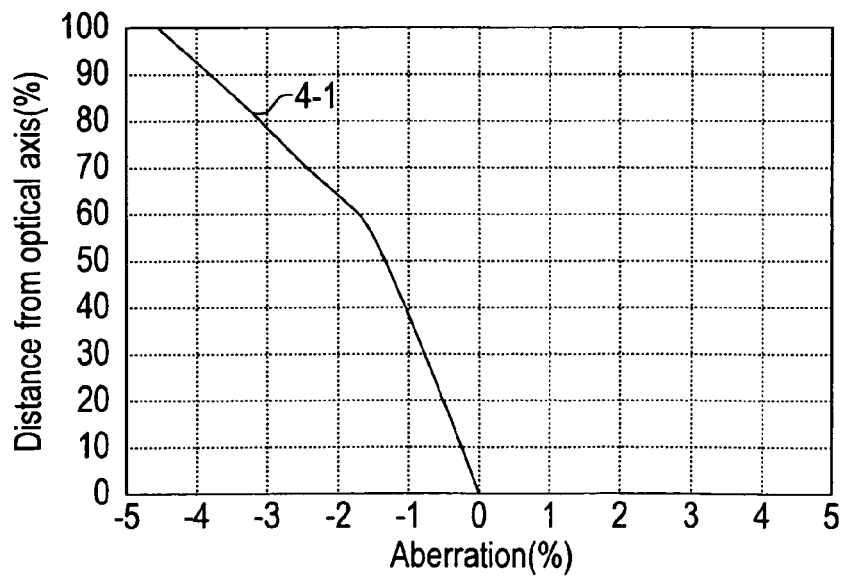
FIG. 18 is a graph depicting the distortion aberration of the imaging lens of Embodiment 4.
Figure 19:
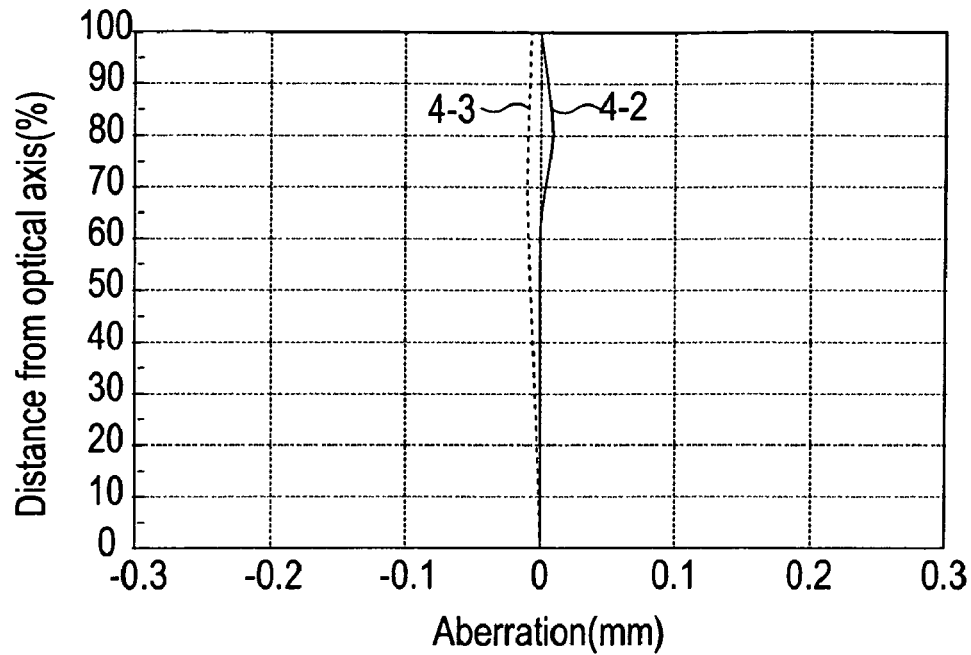
FIG. 19 is a graph depicting the astigmatism aberration of the imaging lens of Embodiment 4.
Figure 20:
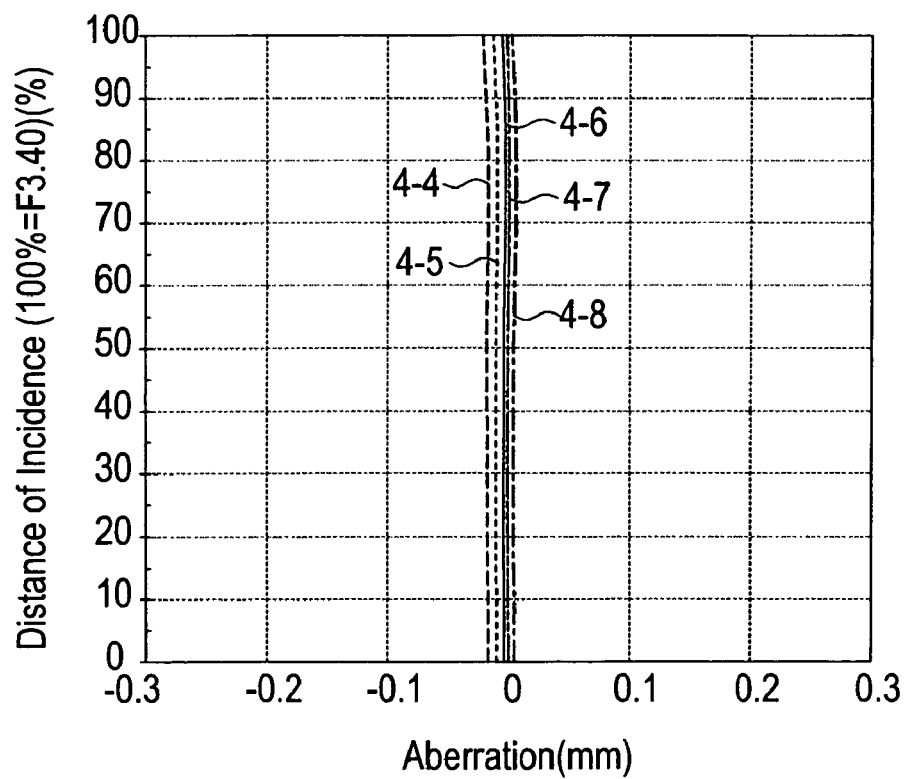
FIG. 20 is a graph depicting the chromatic/spherical aberration of the imaging lens of Embodiment 4.

FIG. 18 shows a graph of the distortion aberration curve 4-1, FIG. 19 shows a graph of the astigmatism aberration curve (aberration curve 4-2 on the meridional surface and aberration curve 4-3 on the sagittal surface), and FIG. 20 shows a graph of the chromatic/spherical aberration curve (aberration curve 4-4 on g-line, aberration curve 4-5 on F-line, aberration curve 4-6 on e-line, aberration curve 4-7 on d-line and aberration curve 4-8 on C-line).

The ordinates of the aberration curve in FIG. 18 and FIG. 19 show the image height by a % of the distance from the optical axis. In FIG. 18 and FIG. 19, 100% corresponds to 0.572 mm. The ordinate of the aberration curve in FIG. 20 shows the entrance height h (F number), and the maximum thereof corresponds to 3.40. The abscissa of FIG. 18 shows the aberration (%), and the abscissas of FIG. 19 and FIG. 20 show the value of the aberrations (mm).

For the distortion aberration, the absolute value of the aberration is 4.55%, which is the maximum, at the position of 100% image height (image height: 0.572 mm), and the absolute value of the aberration is within 4.55% in a range where the image height is 0.572 mm or less.

For the astigmatism aberration, the absolute value of the aberration on the sagittal surface is 0.0096 mm, which is the maximum, at the position of 70% image height (image height: 0.400 mm), and the absolute value of the aberration is within 0.0096 mm in a range where the image height is 0.572 mm or less.

For the chromatic/spherical aberration, the absolute value of the aberration curve 4-4 on the g-line is 0.0213 mm, which is the maximum, at 100% entrance height h, and the absolute value of the aberration is within 0.0213 mm.

Therefore according to the imaging lens of Embodiment 4, the optical length can be short enough to be installed in a portable telephone, the back focus can be long enough to insert such components as a filter and a cover glass between the imaging lens and the image sensing plane, and good images can be acquired.

Embodiment 5

Figure 21:
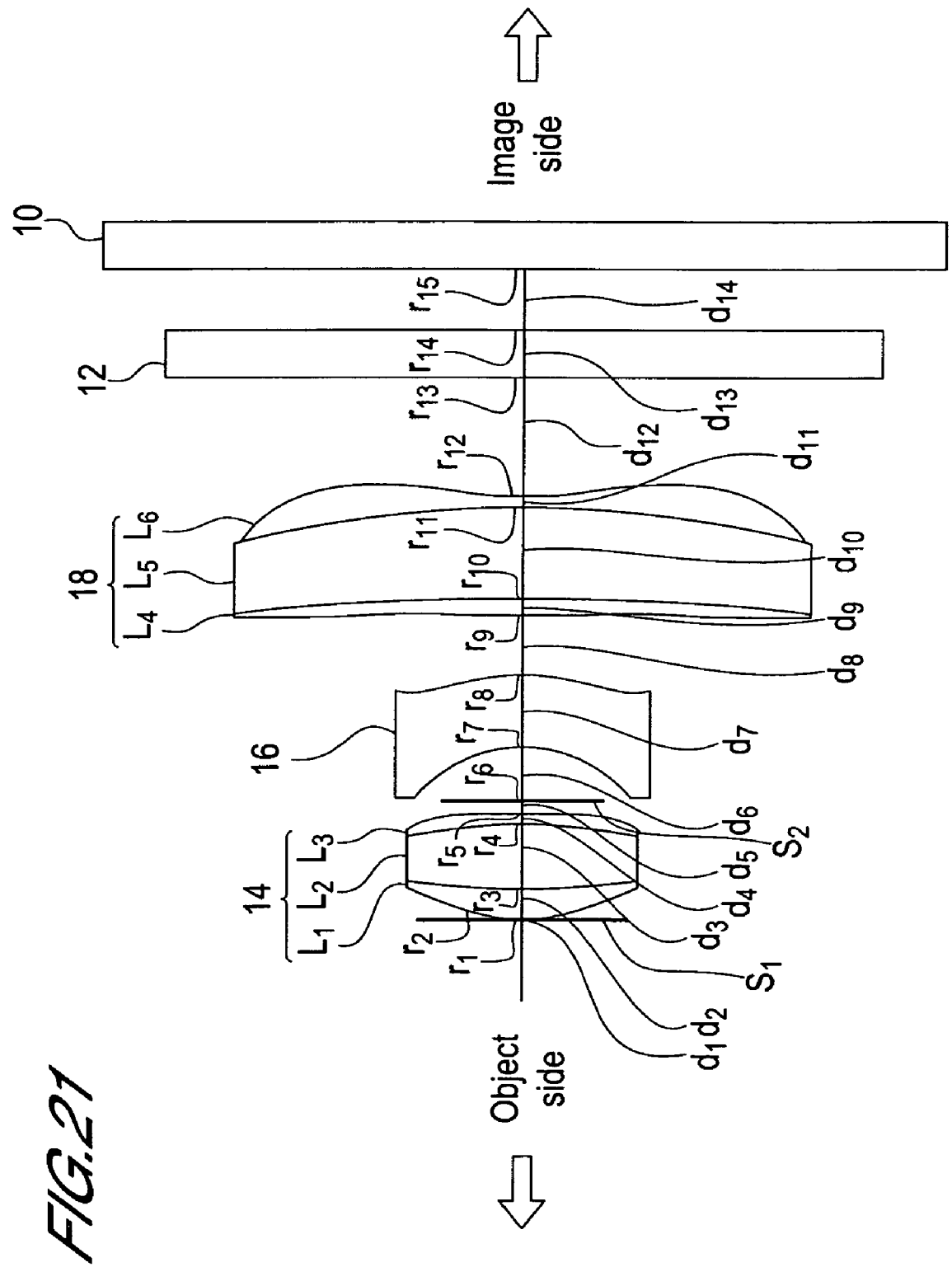
FIG. 21 is a diagram depicting a configuration of an imaging lens of Embodiment 5.
Figure 22:
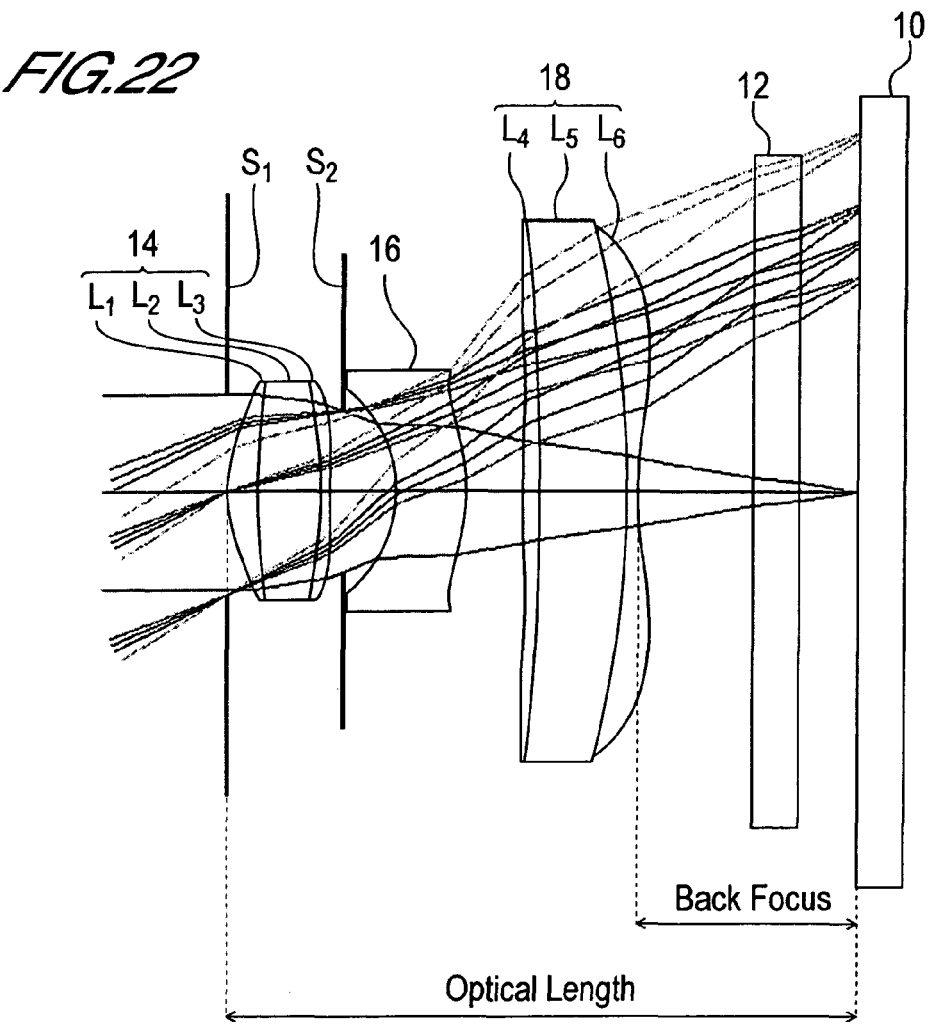
FIG. 22 is a diagram depicting optical paths of the imaging lens of Embodiment 5.

The imaging lens of Embodiment 5 is an imaging lens of the first aspect of the present invention, and the embodiment of the second imaging lens of the present invention, comprising an aperture stop (first diaphragm) $S_1$, a first lens 14, a second diaphragm $S_2$, a second lens 16 and a third lens 18, where the first diaphragm $S_1$, the first lens 14, the second diaphragm $S_2$, the second lens 16 and the third lens 18 are arranged in this sequence from the object side to the image side, as shown in FIG. 21 and FIG. 22.

A single lens is used for the second lens 16. The first lens 14 is a junction type compound lens where the first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded. The third lens 18 is a junction type compound lens where a fourth sub-lens $L_4$, a fifth sub-lens $L_5$ and a sixth sub-lens $L_6$ are arranged in this sequence from the object side to the image side, the fourth sub-lens $L_4$ and the fifth sub-lens $L_5$ are bonded, and the fifth sub-lens $L_5$ and the sixth sub-lens $L_6$ are bonded.

In the imaging lens of Embodiment 5, the second lens 16 and the first, third, fourth and sixth sub-lenses are formed of the transparent curable silicone resin SMX-7852 (made by Fuji Polymer Industries Co., Ltd.), and the second and fifth sub-lenses are formed of the optical glass BK7 made by Hoya Corporation.

(A) The refractive index $N_2$ of the first sub-lens $L_1$ is $N_2$=1.51000.

(B) The refractive index $N_3$ of the second sub-lens $L_2$ is $N_3$=1.51633.

(C) The refractive index $N_4$ of the third sub-lens $L_3$ is $N_4$=1.51000.

(D) The Abbe number $v_2$ of the first sub-lens $L_1$ is $v_2$=56.0.

(E) The Abbe number $v_3$ of the second sub-lens $L_2$ is $v_3$=64.0.

(F) The Abbe number $v_4$ of the third sub-lens $L_3$ is $v_4$=56.0.

(G) The refractive index $N_9$ of the fourth sub-lens $L_4$ is $N_9$=1.51000.

(H) The refractive index $N_{10}$ of the fifth sub-lens $L_5$ is $N_{10}$=1.51633.

(I) The refractive index $N_{11}$ of the sixth sub-lens $L_6$ is $N_{11}$=1.51000.

(J) The Abbe number $v_9$ of the fourth sub-lens $L_4$ is $v_9$=56.0.

(K) The Abbe number $v_{10}$ of the fifth sub-lens $L_5$ is $v_{10}$=64.0.

(L) The Abbe number $v_{11}$ of the sixth sub-lens $L_6$ is $v_{11}$=56.0.

Therefore, $|N_3-N_2|=|N_3-N_4|=|N_{10}-N_9|=|N_{10}-N_{11}|=0.00633$, which satisfies the above mentioned Conditions (2-1), (2-2), (2-5) and (2-6). Also $0 \leq |v_3-v_2|=|v_3-v_4|=|v_{10}-v_9|=|v_{10}-v_{11}|=8.0$, which satisfies the above mentioned Conditions (2-3), (2-4), (2-7) and (2-8).

FIG. 21 shows a cross-sectional view of the imaging lens of Embodiment 5. As FIG. 21 shows, the first diaphragm $S_1$, which plays a role of an aperture stop, is formed at a position of an intersection of the first surface (surface at the object side) of the first sub-lens $L_1$ constituting the first lens 14 and the optical axis. The second diaphragm $S_2$, which plays a role of preventing a flare or smear is formed between the first lens 14 and the second lens 16.

The diaphragm surface of the first diaphragm $S_1$ is a plane $r_1$, so $r_1=\infty$ is shown in Table 5. The second diaphragm $S_2$ is a plane $r_6$, so $r_6=\infty$ is shown in Table 5. The open F number Fno is 2.80.

As Table 5 shows, $r_7$ and $r_8$ are negative values, so the second lens 16 is a meniscus lens of which convex surface faces the image side on a paraxial line. $r_3$ is a positive value and $r_4$ is a negative value, so the second sub-lens $L_2$ constituting the first lens 14 is a biconvex lens of which both side faces are convex surfaces, and $r_{10}$ is a negative value and $r_{11}$ is also a negative value, so the fifth sub-lens $L_5$ constituting the third lens 18 is a meniscus lens of which convex surface faces the image side.

$r_2$ is a positive value, so the first sub-lens $L_1$ constituting the first lens 14 is a lens where the object side face of this first sub-lens $L_1$ is a convex surface facing the object side on a paraxial line, and $r_5$ is a negative value, so the third sub-lens $L_3$ is a lens where the image side face of this third sub-lens $L_3$ is a convex surface facing the image side on a paraxial line.

$r_9$ is a positive value, so the fourth sub-lens $L_4$ constituting the third lens 18 is a lens where the object side face of this fourth sub-lens $L_4$ is a convex surface facing the object side on a paraxial line, and $r_{12}$ is also a positive value, so the sixth sub-lens $L_6$ is a lens where the image side face of this sixth sub-lens $L_6$ is a concave surface facing the image side on a paraxial line.

As FIG. 22 shows, the optical length L with respect to the focal distance f=1.00 mm is 1.079 mm, and the back focus bf is 0.350 mm.

Figure 23:
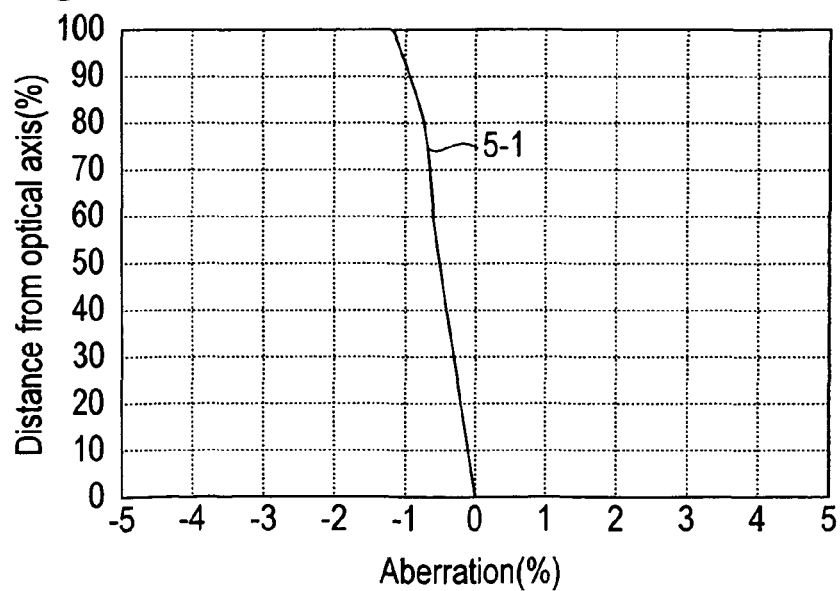
FIG. 23 is a graph depicting the distortion aberration of the imaging lens of Embodiment 5.
Figure 24:
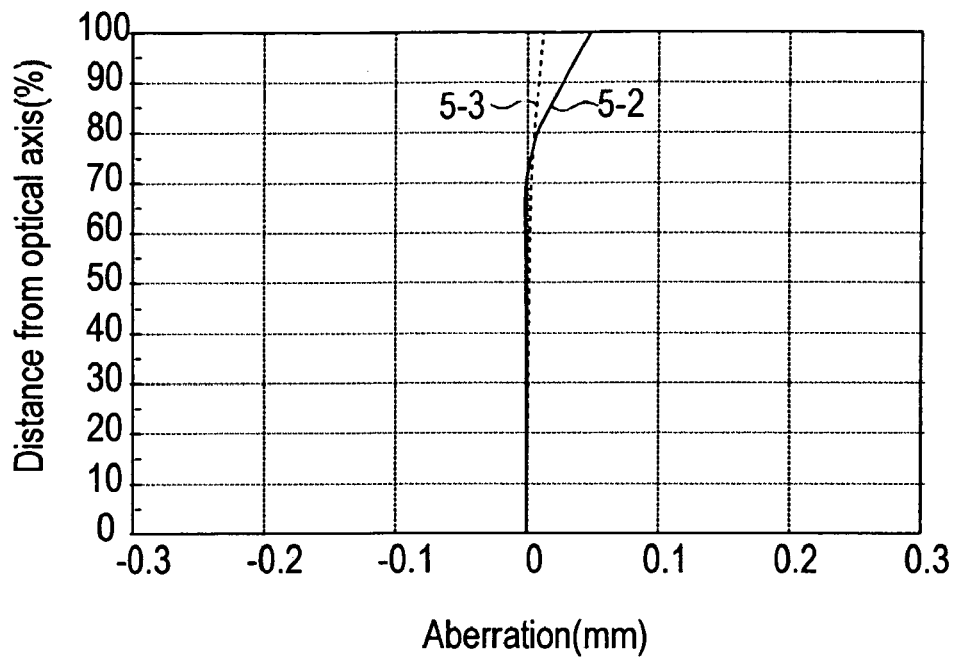
FIG. 24 is a graph depicting the astigmatism aberration of the imaging lens of Embodiment 5.
Figure 25:
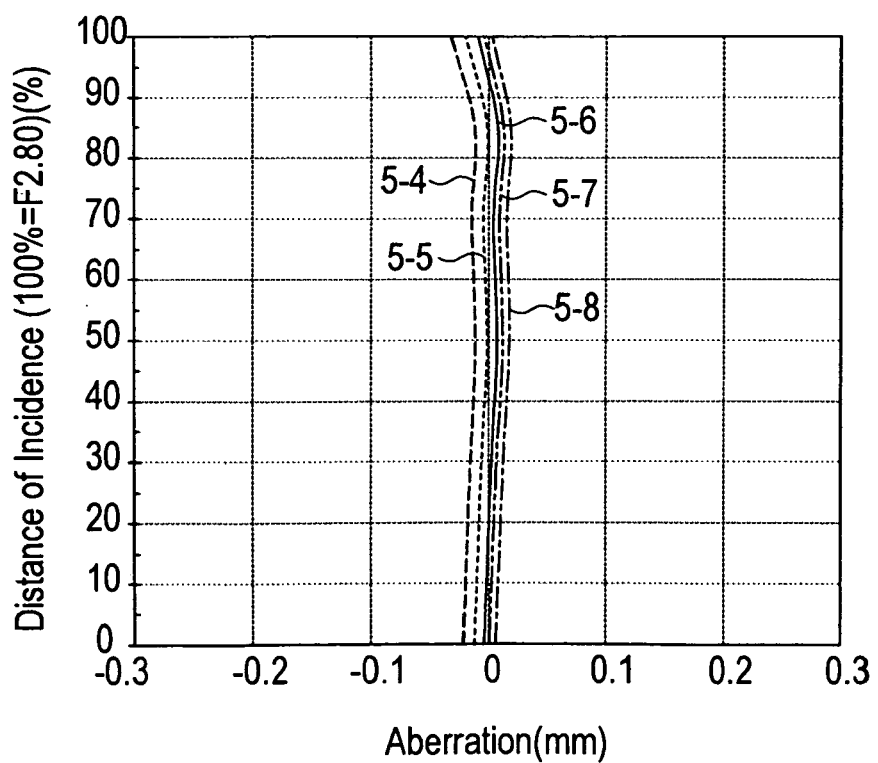
FIG. 25 is a graph depicting the chromatic/spherical aberration of the imaging lens of Embodiment 5.

FIG. 23 shows a graph of the distortion aberration curve 5-1, FIG. 24 shows a graph of the astigmatism aberration curve (aberration curve 5-2 on the meridional surface and the aberration curve 5-3 on the sagittal surface), and FIG. 25 shows a graph of a chromatic/spherical aberration curve (aberration curve 5-4 on g-line, aberration curve 5-5 on F-line, aberration curve 5-6 on e-line, aberration curve 5-7 on d-line and aberration curve 5-8 on C-line).

The ordinates of the aberration curve in FIG. 23 and FIG. 24 show the image height by a % of the distance from the optical axis. In FIG. 23 and FIG. 24, 100% corresponds to 0.620 mm. The ordinate of the aberration curve in FIG. 25 shows the entrance height h (F number), and the maximum thereof corresponds to 2.80. The abscissa of FIG. 23 shows the aberration (%), and the abscissas of FIG. 24 and FIG. 25 show the value of the aberrations (mm).

For the distortion aberration, the absolute value of the aberration is 1.18%, which is the maximum, at a position of 100% image height (image height: 0.620 mm), and the absolute value of the aberration is within 1.18% in a range where the image height is 0.620 mm or less.

For the astigmatism aberration, the absolute value of the aberration on the meridional surface is 0.0492 mm, which is the maximum, at a position of 100% image height (image height: 0.620 mm), and the absolute value of the aberration is within 0.0492 mm in a range where the image height is 0.620 mm or less.

For the chromatic/spherical aberration, the absolute value of the aberration curve 5-4 on the g-line is 0.0320 mm, which is the maximum at 100% entrance height h, and the absolute value of the aberration is within 0.0320 mm.

Therefore according to the imaging lens of Embodiment 5, the optical length can be short enough to be installed in a portable telephone, the back focus can be long enough to insert such components as a filter and a cover glass between the imaging lens and the image sensing plane, and good images can be acquired.

Embodiment 6

Figure 26:
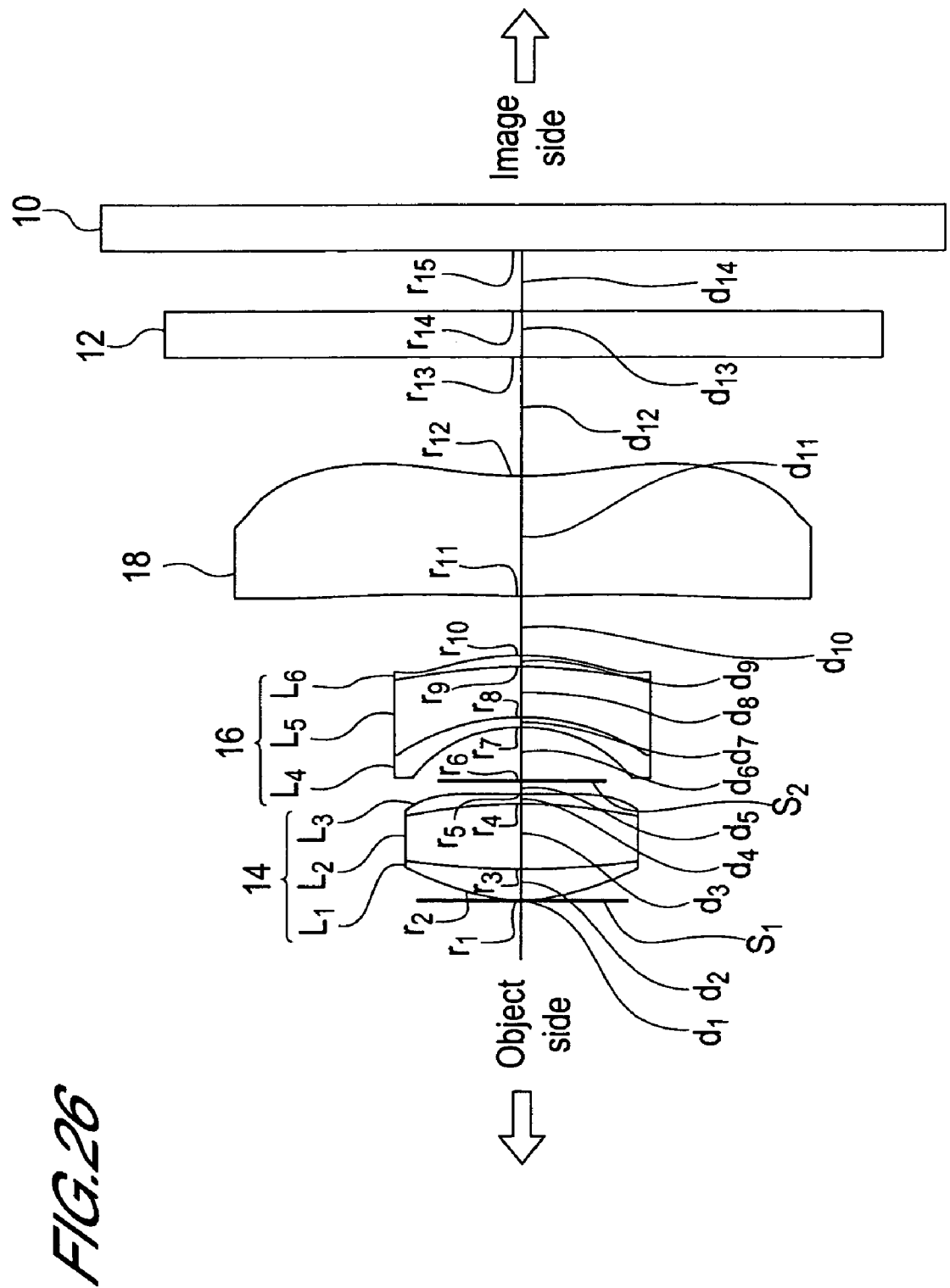
FIG. 26 is a diagram depicting a configuration of an imaging lens of Embodiment 6.
Figure 27:
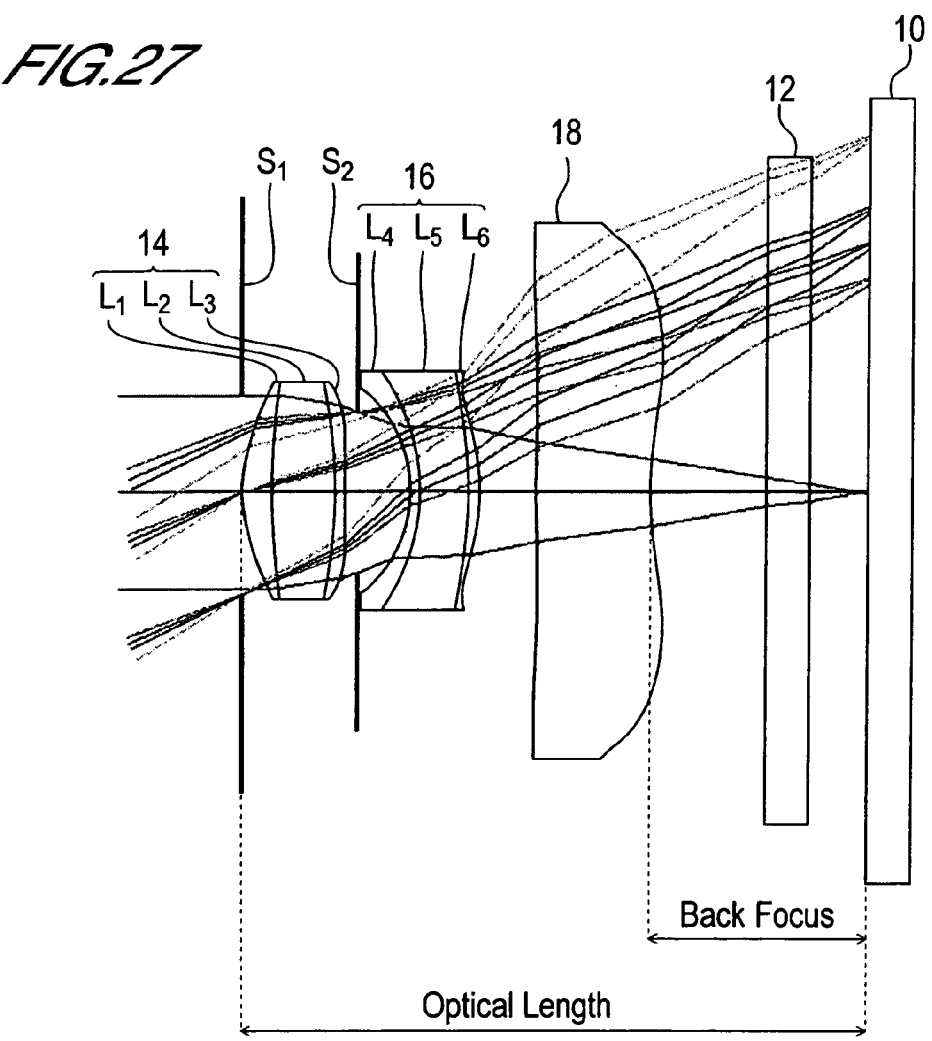
FIG. 27 is a diagram depicting optical paths of the imaging lens of Embodiment 6.

The imaging lens of Embodiment 6 is an imaging lens of the first aspect of the present invention, and the embodiment of the third imaging lens of the present invention, comprises an aperture stop (first diaphragm) $S_1$, a first lens 14, a second diaphragm $S_2$, a second lens 16 and a third lens 18, where the first diaphragm $S_1$, the first lens 14, the second diaphragm $S_2$, the second lens 16 and the third lens 18 are arranged in this sequence from the object side to the image side, as shown in FIG. 26 and FIG. 27.

A single lens is used for the third lens 18. The first lens 14 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded. The second lens 16 is a junction type compound lens where the fourth sub-lens $L_4$, a fifth sub-lens $L_5$ and a sixth sub-lens $L_6$ are arranged in this sequence from the object side to the image side, the fourth sub-lens $L_4$ and the fifth sub-lens $L_5$ are bonded, and the fifth sub-lens $L_5$ and the sixth sub-lens $L_6$ are bonded.

In the imaging lens of Embodiment 6, the second sub-lens $L_2$ and the fifth sub-lens $L_5$ are formed of the optical glass BK7. The first sub-lens $L_1$, the third sub-lens $L_3$, the fourth sub-lens $L_4$, the sixth sub-lens $L_8$ and the third lens 18 are formed of the transparent curable silicone resin SMX-7852 made by Fuji Polymer Industries Co., Ltd.

(A) The refractive index $N_2$ of the first sub-lens $L_1$ is $N_2$=1.51000.

(B) The refractive index $N_3$ of the second sub-lens $L_2$ is $N_3$=1.51633.

(C) The refractive index $N_4$ of the third sub-lens $L_3$ is $N_4$=1.51000.

(D) The Abbe number $v_2$ of the first sub-lens $L_1$ is $v_2$=56.0.

(E) The Abbe number $v_3$ of the second sub-lens $L_2$ is $v_3$=64.0.

(F) The Abbe number $v_4$ of the third sub-lens $L_3$ is $v_4$=56.0.

(G) The refractive index $N_7$ of the fourth sub-lens $L_4$ is $N_7$=1.51000.

(H) The refractive index $N_8$ of the fifth sub-lens $L_5$ is $N_8$=1.51633.

(I) The refractive index $N_9$ of the sixth sub-lens $L_6$ is $N_9$=1.51000.

(J) The Abbe number $v_7$ of the fourth sub-lens $L_4$ is $v_7$=56.0.

(K) The Abbe number $v_8$ of the fifth sub-lens $L_5$ is $v_8$=64.0.

(L) The Abbe number $v_9$ of the sixth sub-lens $L_6$ is $v_9$=56.0.

Therefore, $|N_3-N_2|=|N_3-N_4|=|N_8-N_7|=|N_8-N_9|=0.00633$, which satisfies the above mentioned Conditions (3-1), (3-2), (3-5) and (3-6). Also $|v_3-v_2|=|v_3-v_4|=|v_8-v_7|=|v_8-v_9|=8.0$, which satisfies the above mentioned Conditions (3-3), (3-4), (3-7) and (3-8).

FIG. 26 is a cross-sectional view of the imaging lens of Embodiment 6. As FIG. 26 shows, the first diaphragm $S_1$, which plays a role of an aperture stop, is formed at a position of an intersection of the first surface (surface at the object side) of the first sub-lens $L_1$ constituting the first lens 14 and the optical axis. The second diaphragm $S_2$, which plays a role of preventing a flare or smear, is formed between the first lens 14 and the second lens 16.

The diaphragm surface of the first diaphragm $S_1$ is a plane $r_i$, so $r_i=\infty$ shown in Table 6. The second diaphragm $S_2$ is a plane $r_6$, so $r_6=\infty$ is shown in Table 6. The open F number Fno is 2.80.

As Table 6 shows, $r_3$ is a positive value and $r_4$ is a negative value, so the second sub-lens $L_2$ constituting the first lens 14 is a biconvex lens of which both side faces are convex surfaces. $r_8$ is a negative value and $r_9$ is also a negative value, so the fifth sub-lens $L_5$ constituting the third lens 18 is a meniscus lens of which convex surface faces the image side.

$r_{11}$ is a positive value and $r_{12}$ is also a positive value, so the third lens 18 is a meniscus lens of which convex surface faces the object side on a paraxial line.

$r_2$ is a positive value, so the first sub-lens $L_1$ constituting the first lens 14 is a lens where the object side face of this first sub-lens $L_1$ is a convex surface facing the object side on a paraxial line. $r_5$ is a negative value, so the third sub-lens $L_3$ is a lens where the image side face of this third sub-lens $L_3$ is a convex surface facing the image side on a paraxial line.

$r_7$ is a negative value, so the fourth sub-lens $L_4$ constituting the second lens 16 is a lens where the object side face of this fourth sub-lens $L_4$ is a concave surface facing the object side on a paraxial line. $r_{10}$ is also a negative value, so the sixth sub-lens $L_6$ is a lens where the image side face of the sixth sub-lens $L_6$ is a convex surface facing the image side on a paraxial line.

As FIG. 27 shows, the optical length L with respect to the focal distance f=1.00 mm is 1.078 mm, and the back focus bf is 0.349 mm.

Figure 28:
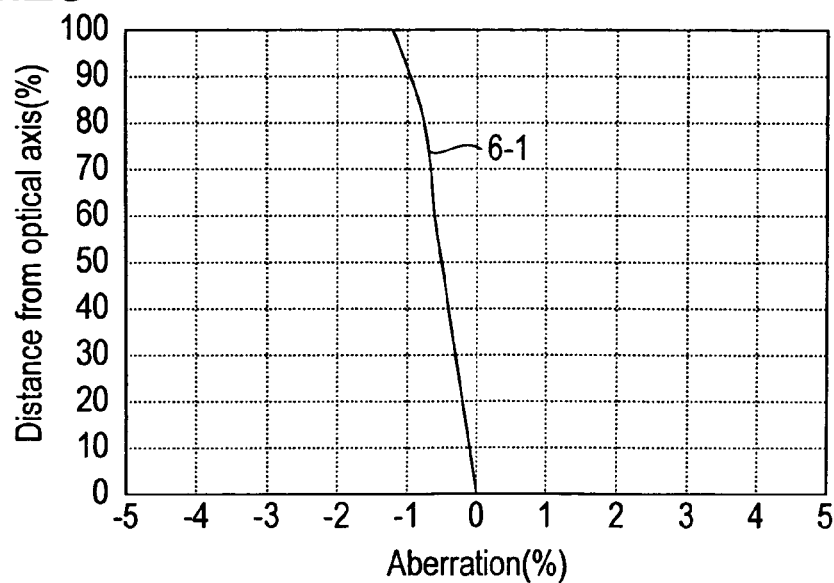
FIG. 28 is a graph depicting the distortion aberration of the imaging lens of Embodiment 6.
Figure 29:
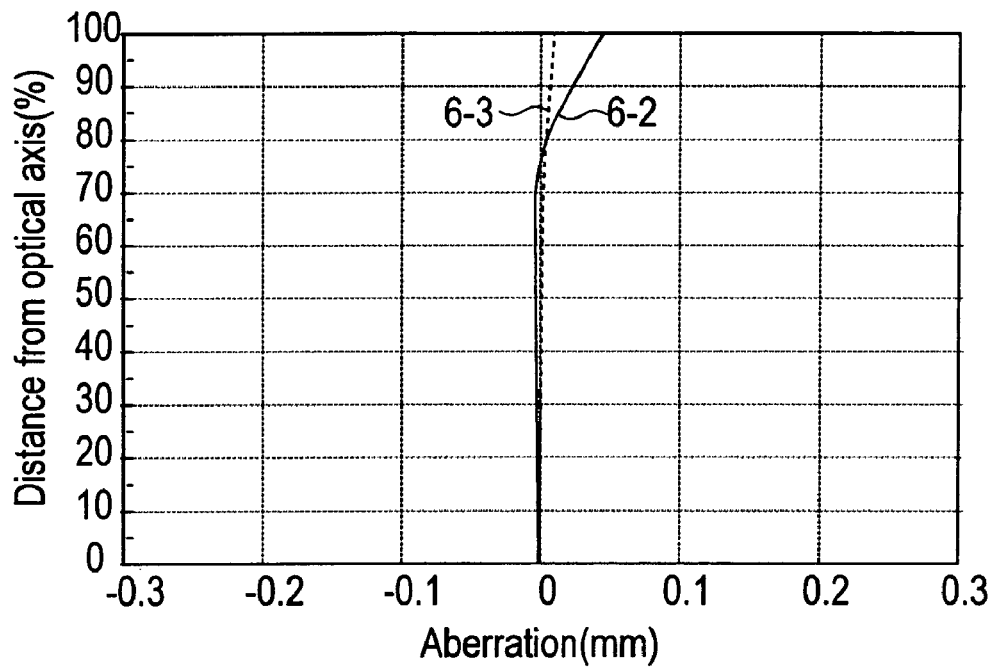
FIG. 29 is a graph depicting the astigmatism aberration of the imaging lens of Embodiment 6.
Figure 30:
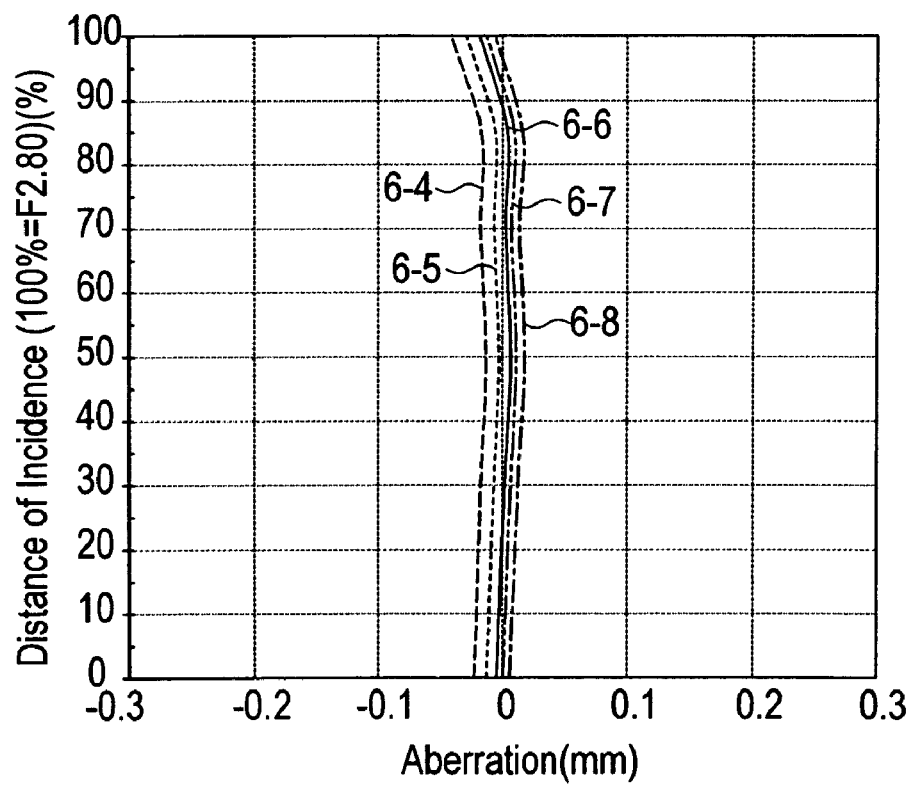
FIG. 30 is a graph depicting the chromatic/spherical aberration of the imaging lens of Embodiment 6.

FIG. 28 shows a graph of the distortion aberration curve 6-1, FIG. 29 shows a graph of the astigmatism aberration curve (aberration curve 6-2 on the meridional surface and aberration curve 6-3 on the sagittal surface), and FIG. 30 shows a graph of a chromatic/spherical aberration curve (aberration curve 6-4 on g-line, aberration curve 6-5 on F-line, aberration curve 6-6 on e-line, aberration curve 6-7 on d-line and aberration curve 6-8 on C line).

The ordinates of the aberration curve in FIG. 28 and FIG. 29 show the image height by a % of the distance from the optical axis. In FIG. 28 and FIG. 29, 100% corresponds to 0.620 mm. The ordinate of the aberration curve in FIG. 30 shows the entrance height h (F number), and the maximum thereof corresponds to 2.80. The abscissa of FIG. 28 shows the aberration (%), and the abscissas of FIG. 29 and FIG. 30 show the values of the aberrations (mm).

For the distortion aberration, the absolute value of the aberrations is 1.21%, which is the maximum, at the position of 100% image height (image height: 0.620 mm), and the absolute value of the aberration is within 1.21% in a range where the image height is 0.620 mm or less.

For the astigmatism aberration, the absolute value of the aberration on the meridional surface is 0.0455 mm, which is the maximum, at the position of 100% image height (image height: 0.620 mm), and the absolute value of the aberration is within 0.0455 mm in a range where the image height is 0.620 mm or less.

For the chromatic/spherical aberration, the absolute value of the aberration curve 6-4 on the g-line is 0.0411 mm, which is the maximum, at 100% entrance height h, and the absolute value of the aberration is within 0.0411 mm.

Therefore according to the imaging lens of Embodiment 6, the optical length can be short enough to be installed in a portable telephone, the back focus can be long enough to insert such components as a filter and a cover glass between the imaging lens and the image sensing plane, and good images can be acquired.

As the description on the imaging lenses according to Embodiment 1 to Embodiment 6 show, the problem to be solved by this invention is solved by designing each component lens so as to satisfy the conditions shown in the above Expression (1-1) to (1-8) in the case of the first imaging lens, so as to satisfy the conditions shown by the above Expressions (2-1) to (2-8) in the case of the second imaging lens, and so as to satisfy the conditions shown by the above Expressions (3-1) to (3-8) in the case of the third imaging lens. In other words, an imaging lens where various aberrations are well corrected, sufficient back focus is acquired and optical length is maintained short can be acquired.

As described above, the imaging lens of the present invention is suitable not only for a lens for a camera built into a portable telephone, personal computer or digital camera, but also for a camera built into a personal digital assistant (PDA), a lens for a camera built into a, toy having an image recognition function, and a lens for a camera built into monitoring, inspection or crime prevention equipment.

Embodiment 7

Figure 31:
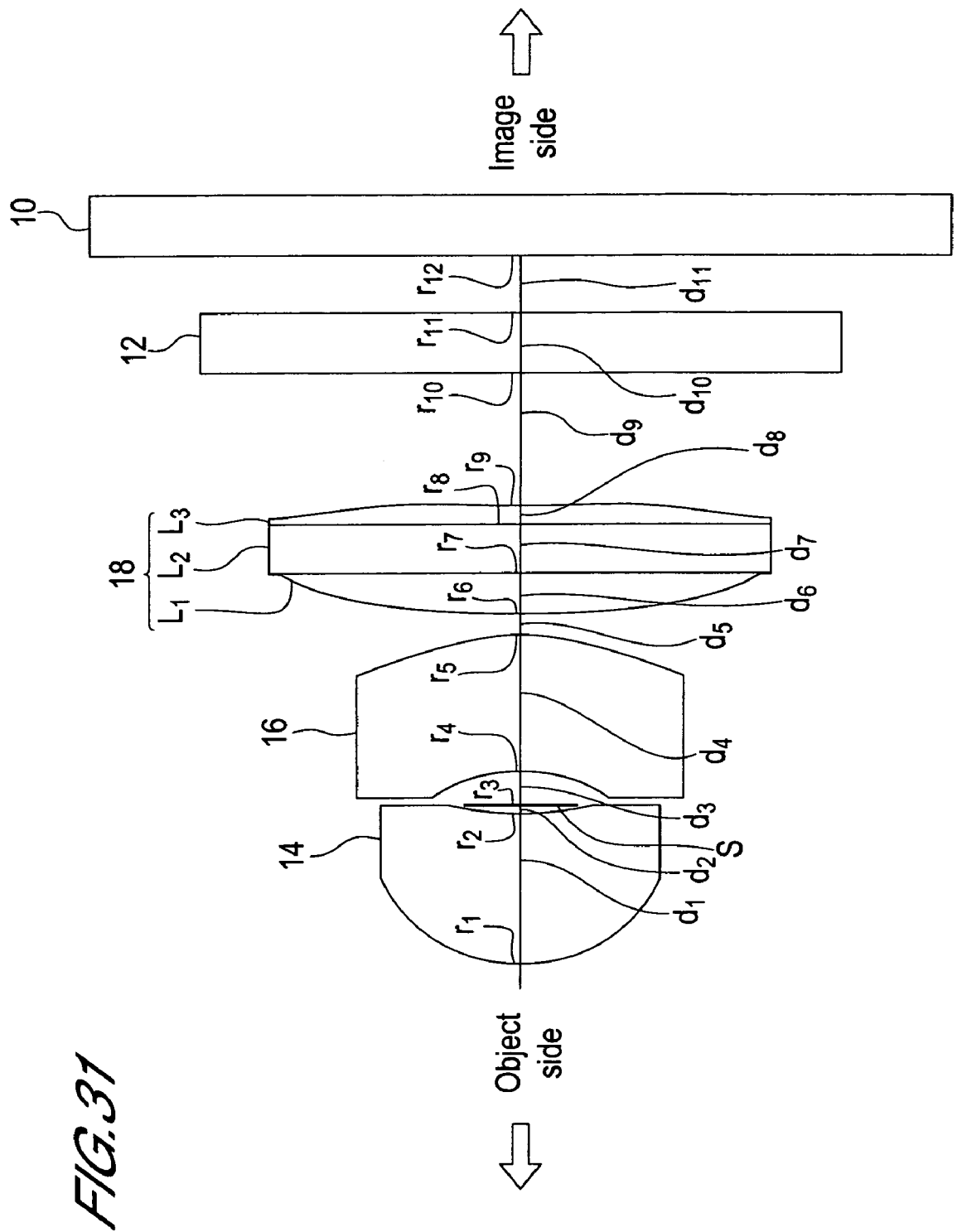
FIG. 31 is a diagram depicting a configuration of an imaging lens of Embodiment 7.
Figure 32:
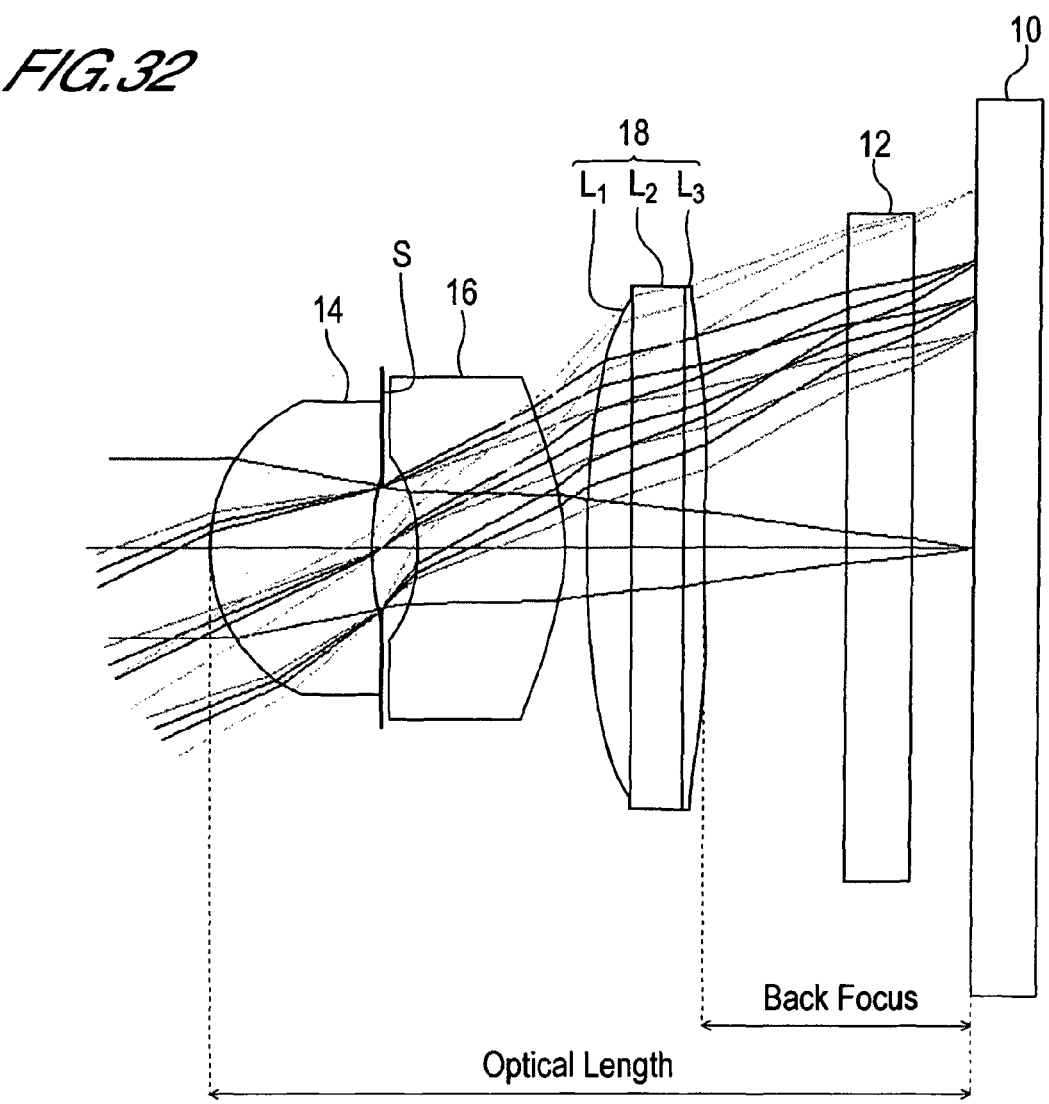
FIG. 32 is a diagram depicting optical paths of the imaging lens of Embodiment 7.

The imaging lens of Embodiment 7 is the imaging lens of the second aspect of the present invention and the embodiment of the fourth imaging lens of the present invention, comprising a first lens 14, an aperture stop S, a second lens 16 and a third lens 18, where the first lens 14, the aperture stop S, the second lens 16 and the third lens 18 are arranged in this sequence from the object side to the image side, as shown in FIG. 31 and FIG. 32.

A single lens is used for the first lens 14 and the second lens 16. The third lens 18 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded.

In the imaging lens of Embodiment 7, the first lens 14 and the second lens 16 are formed of the transparent curable silicone resin SMX-7852 made by Fuji Polymer Industries Co., Ltd. This transparent curable silicone resin SMX-7852, which is a curable resin material, is a thermo-setting type silicone resin material, and the lens can be formed by injection molding using a die. The first and third sub-lenses are also formed of the transparent curable silicone resin SMX-7852 (made by Fuji Polymer Industries Co., Ltd.), and the second sub-lens $L_2$ is formed of the optical glass BK7 made by Hoya Corporation.

(A) The refractive index $N_6$ of the first sub-lens $L_1$ is $N_6$=1.51000.

(B) The refractive index $N_7$ of the second sub-lens $L_2$ is $N_7$=1.51633.

(C) The refractive index $N_8$ of the third sub-lens $L_3$ is $N_8$=1.51000.

(D) The Abbe number $v_6$ of the first sub-lens $L_1$ is $v_6$=56.0.

(E) The Abbe number $v_7$ of the second sub-lens $L_2$ is $v_7$=64.0.

(F) The Abbe number $v_8$ of the third sub-lens $L_3$ is $v_8$=56.0.

Therefore, $|N_7-N_6|=|N_7-N_8|=0.00633$, which satisfies the following Conditions (4-1) and (4-2). Also $|v_7-v_6|=|v_7-v_8|=8.0$, which satisfies the following Conditions (4-3) and (4-4).

The Conditions (4-1), (4-2), (4-3) and (4-4) refer to the conditions given by the following Expressions (4-1), (4-2), (4-3) and (4-4).

$$0 \leq |N_7-N_6| \leq 0.1 \quad (4\text{-}1)$$

$$0 \leq |N_7-N_8| \leq 0.1 \quad (4\text{-}2)$$

$$0 \leq |v_7-v_6| \leq 30.0 \quad (4\text{-}3)$$

$$0 \leq |v_7-v_8| \leq 30.0 \quad (4\text{-}4)$$

where $N_6$: refractive index of the first sub-lens $N_7$: refractive index of the second sub-lens $N_8$: refractive index of the third sub-lens $v_6$: Abbe number of the first sub-lens $v_7$: Abbe number of the second sub-lens $v_8$: Abbe number of the third sub-lens FIG. 32 is a diagram depicting optical paths of the imaging lens of Embodiment 7. As FIG. 32 shows, the aperture stop S is disposed between the first lens 14 and the second lens 16. The diaphragm surface of the aperture stop S is a plane, so $r_3=\infty$ is shown in Table 7. The open F number Fno is 3.40.

As Table 7 shows, $r_7=\infty$ and $r_8=\infty$, so the second sub-lens $L_2$ constituting the third lens is a plane parallel glass plate.

$r_1$ is a positive value and $r_2$ is also a; positive value, so the first lens 14 is a meniscus lens of which convex surface faces the object side on a paraxial line.

$r_4$ is a negative value and $r_5$ is also a negative value, so the second lens 16 is a meniscus lens of which convex surface faces the image side on a paraxial line.

$r_6$ is a positive value, so the first sub-lens $L_1$ is a plano-convex lens where the object side face of this first sub-lens $L_1$ is a convex surface facing the object side on a paraxial line, and $r_9$ is also a positive value, so the third sub-lens $L_3$ is a plano-concave lens where the image side face of this third sub-lens $L_3$ is a concave surface facing the image side on a paraxial line.

As FIG. 32 shows, the optical length L with respect to the focal distance f=1.00 mm is 1.229 mm, and the back focus bf is 0.399 mm.

Figure 33:
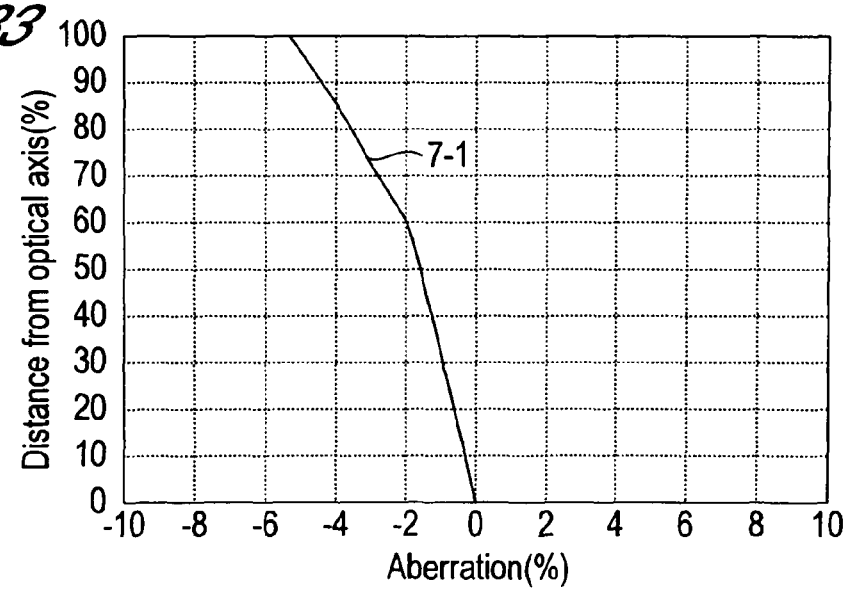
FIG. 33 is a graph depicting the distortion aberration of the imaging lens of Embodiment 7.
Figure 34:
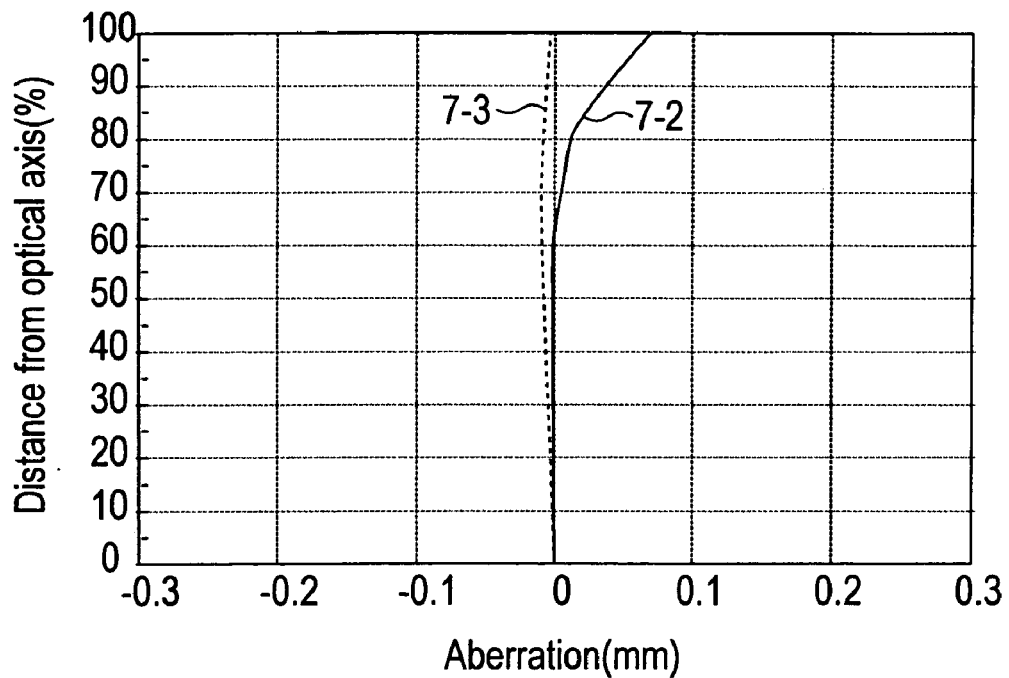
FIG. 34 is a graph depicting the astigmatism aberration of the imaging lens of Embodiment 7.
Figure 35:
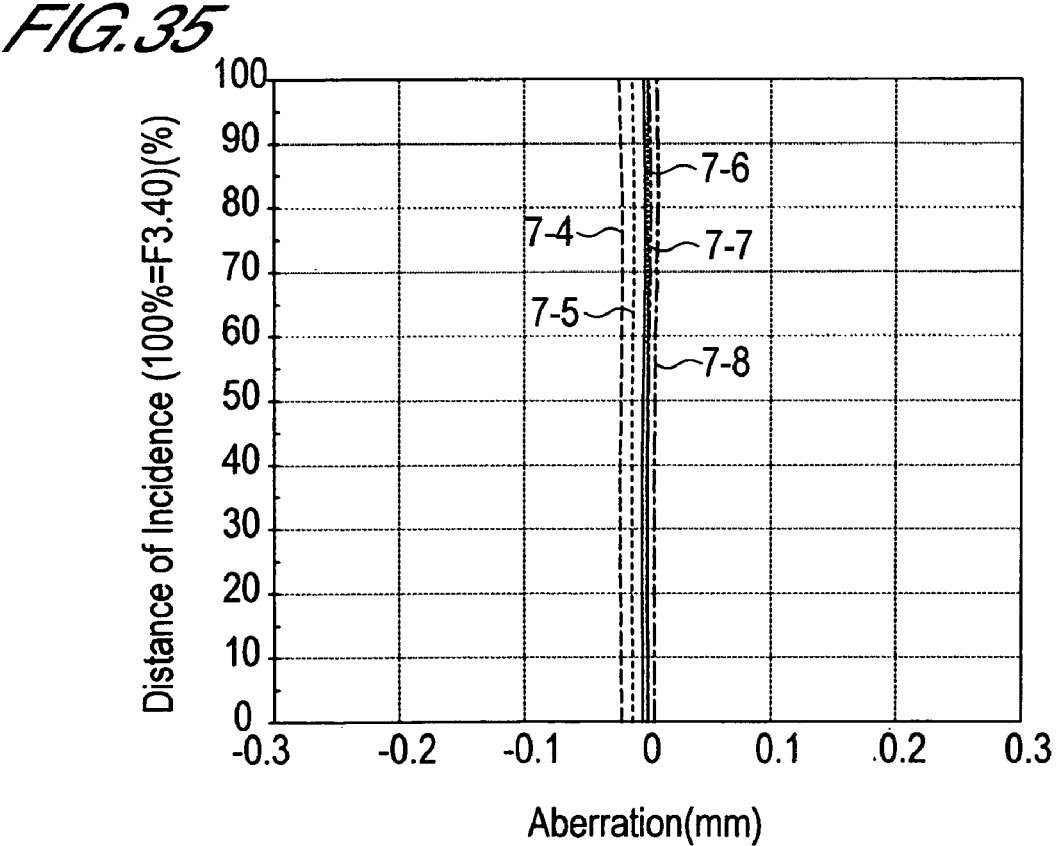
FIG. 35 is a graph depicting the chromatic/spherical aberration of the imaging lens of Embodiment 7.

FIG. 33 shows a graph of the distortion aberration curve 7-1, FIG. 34 shows a graph of the astigmatism aberration curve (aberration curve 7-2 on the meridional surface and the aberration curve 7-3 on the sagittal surface), and FIG. 35 shows a graph of a chromatic/spherical aberration curve (aberration curve 7-4 on g-line, aberration curve 7-5 on F-line, aberration curve 7-6 on e-line, aberration curve 7-7 on d-line and aberration curve 7-8 on C-line).

The ordinates of the aberration curve in FIG. 33 and FIG. 34 show the image height by a % of the distance from the optical axis. In FIG. 33 and FIG. 34, 100% corresponds to 0.586 mm. The ordinate of the aberration curve in FIG. 35 shows the entrance height h (F number), and the maximum thereof corresponds to 3.40. The abscissa of FIG. 33 shows the aberration (%), and the abscissas of FIG. 34 and FIG. 35 show the value of the aberrations (mm).

For the distortion aberration, the absolute value of the aberration is 5.32%, which is the maximum, at the position of 100% image height (image height: 0.586 mm), and the absolute value of the aberration is within 5.32% in a range where the image height is 0.586 mm or less.

For the astigmatism aberration, the absolute value of the aberration on the meridional surface is 0.0694 mm, which is the maximum, at the position of 100% image height (image height: 0.586 mm), and the absolute value of the aberration is within 0.0694 mm in a range where the image height is 0.586 mm or less.

For the chromatic/spherical aberration, the absolute value of the aberration curve 7-4 on the g-line is 0.0233 mm, which is the maximum, at 100% entrance height h, and the absolute value of the aberration is within 0.0233 mm.

Therefore according to the imaging lens of Embodiment 7, the optical length can be short enough to be installed in a portable telephone, the back focus can be long enough to insert such components as a filter and a cover glass between the imaging lens and the image sensing plane, and good images can be acquired.

Embodiment 8

Figure 36:
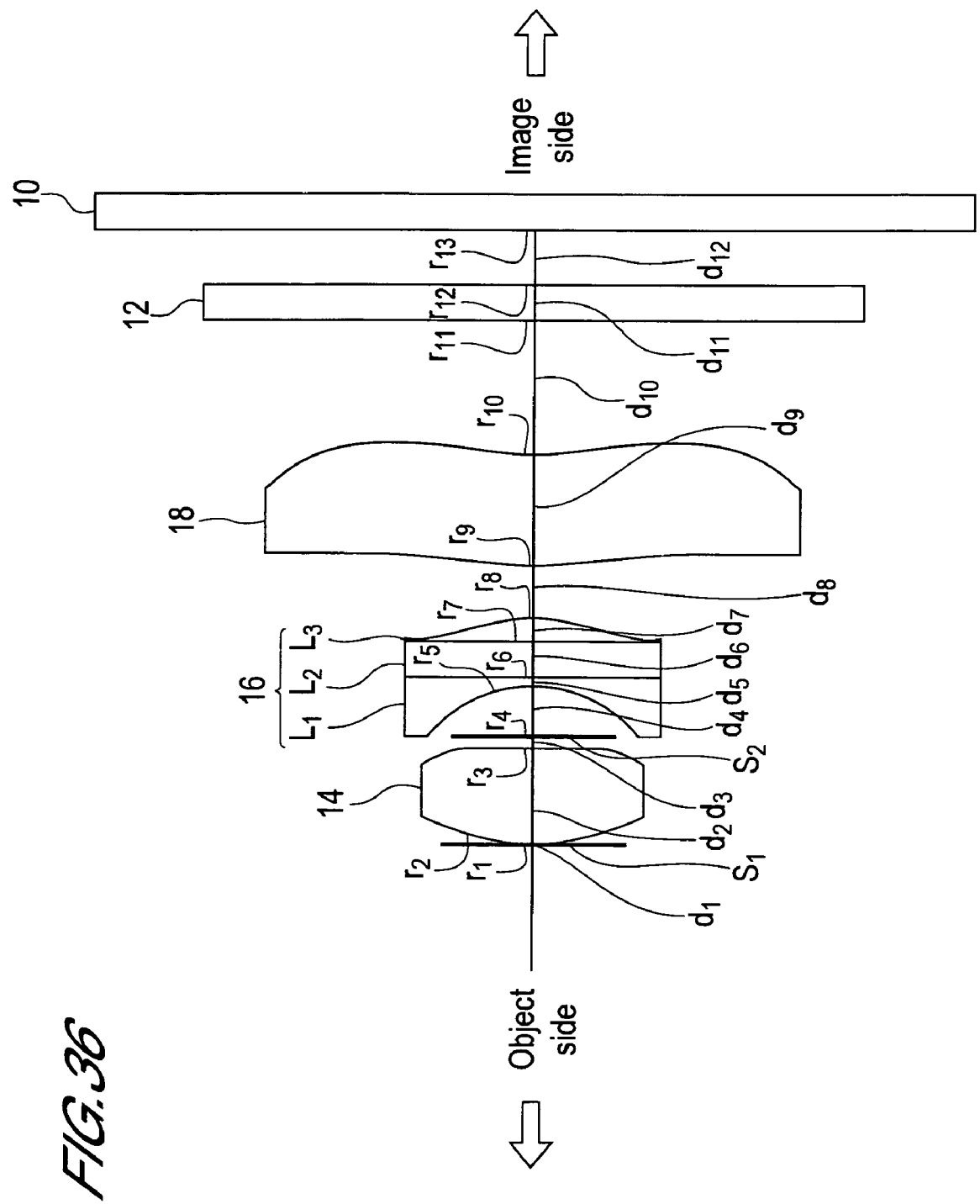
FIG. 36 is a diagram depicting a configuration of an imaging lens of Embodiment 8.
Figure 37:
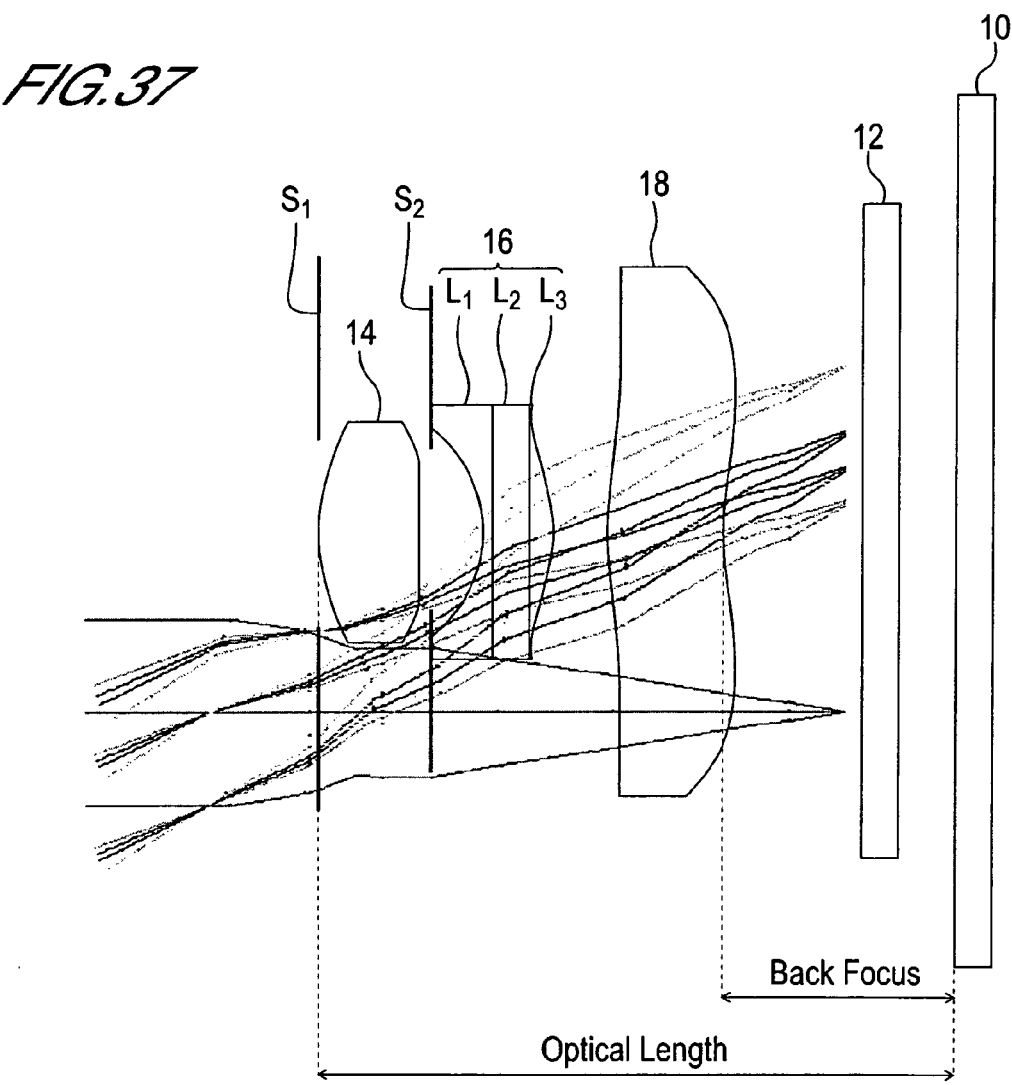
FIG. 37 is a diagram depicting optical paths of the imaging lens of Embodiment 8.

The imaging lens of Embodiment 8 is the imaging lens of the second aspect of the present invention and the embodiment of the fifth imaging lens of the present invention, comprising an aperture stop (first diaphragm) $S_1$, a first lens 14, a second diaphragm $S_2$, a second lens 16 and a third lens 18, which are arranged in this sequence from the object site to the image side, as shown in FIG. 36 and FIG. 37.

A single lens is sued for the first lens 14 and the third lens 18. The second lens 16 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded.

In the imaging lens of Embodiment 8, the first lens 14 is formed of the curable resin material SR-7010 (made by Dow Corning Toray Co., Ltd.), and the third lens 18 is formed of the optical glass BK7. The first and third sub-lenses are formed of the curable resin material SMX-7877 (made by Fuji Polymer Industries Co., Ltd.), and the second sub-lens is formed of the optical glass BK7 made by Hoya Corporation.

(A) The refractive index $N_5$ of the first sub-lens $L_1$ is $N_5=1.60000$.

(B) The refractive index $N_6$ of the second sub-lens $L_2$ is $N_6=1.60342$.

(C) The refractive index $N_7$ of the third sub-lens $L_3$ is $N_7=1.60000$.

(D) The Abbe number $v_5$ of the first sub-lens $L_1$ is $v_5=30.0$.

(E) The Abbe number $v_6$ of the second sub-lens $L_2$ is $v_6=38.0$.

(F) The Abbe number $v_7$ of the third sub-lens $L_3$ is $v_7=30.0$.

Therefore, $|N_6-N_5|=|N_6-N_7|=0.00342$, which satisfies the following Conditions (5-1) and (5-2). Also $|v_6-v_5|=|v_6-v_7|=8.0$, which satisfies the following Conditions (5-3) and (5-4).

The Conditions (5-1), (5-2), (5-3) and (5-4) refer to the conditions given by the following Expressions (5-1), (5-2), (5-3) and (5-4).

$$0 \leq |N_6-N_5| \leq 0.1 \tag{5-1}$$

$$0 \leq |N_6-N_7| \leq 0.1 \tag{5-2}$$

$$0 \leq |v_6-v_5| \leq 30.0 \tag{5-3}$$

$$0 \leq |v_6-v_7| \leq 30.0 \tag{5-4}$$

where $N_5$: refractive index of the first sub-lens $N_6$: refractive index of the second sub-lens $N_7$: refractive index of the third sub-lens $v_5$: Abbe number of the first sub-lens $v_6$: Abbe number of the second sub-lens $v_7$: Abbe number of the third sub-lens FIG. 36 shows a cross-sectional view of the imaging lens of Embodiment 8. As FIG. 36 shows, the first diaphragm $S_1$, which plays a role of an aperture stop, is formed at a position of an intersection of the first surface (surface at the object side) of the first sub-lens $L_1$ constituting the first lens 14 and the optical axis. The second diaphragm $S_2$, which plays a role of Preventing a flare or smear, is formed between the first lens 14 and the second lens 16.

The diaphragm surface of the first diaphragm $S_1$ is a plane $r_1$, so $r_1=\infty$ is shown in Table 8. The second diaphragm $S_2$ is a plane $r_4$, so $r_4=\infty$ is shown in Table 8. The open F number Fno is 2.96.

As Table 8 shows, $r_6=\infty$ and $r_7=\infty$, so the second sub-lens $L_2$ constituting the second lens 16 is a plane parallel glass plate.

$r_2$ is a positive value and $r_3$ is a negative value, so the first lens 14 is a biconvex lens of which both side faces are convex surfaces on a paraxial line.

$r_5$ is a negative value, so the first sub-lens $L_1$ constituting the second lens 16 is a plano-concave lens where the object side face of this first sub-lens $L_1$ is a concave surface facing the object side on a paraxial line, and $r_8$ is a negative value, so the third sub-lens $L_3$ is a plano-convex lens where the image side face of this third sub-lens $L_3$ is a convex surface facing the image side on a paraxial line.

As FIG. 37 shows, the optical length L with respect to the focal distance f=1.00 mm is 1.138 mm, and the back focus bf is 0.392 mm.

Figure 38:
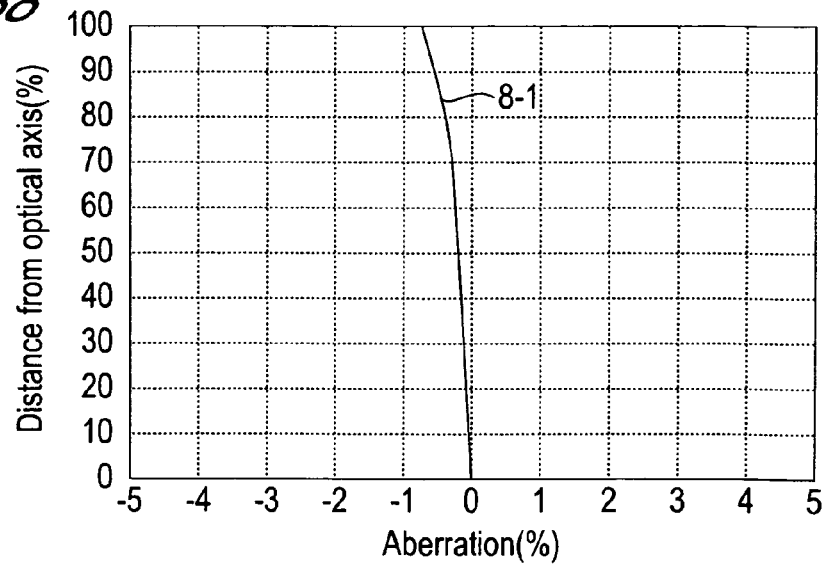
FIG. 38 is a graph depicting the distortion aberration of the imaging lens of Embodiment 8.
Figure 39:
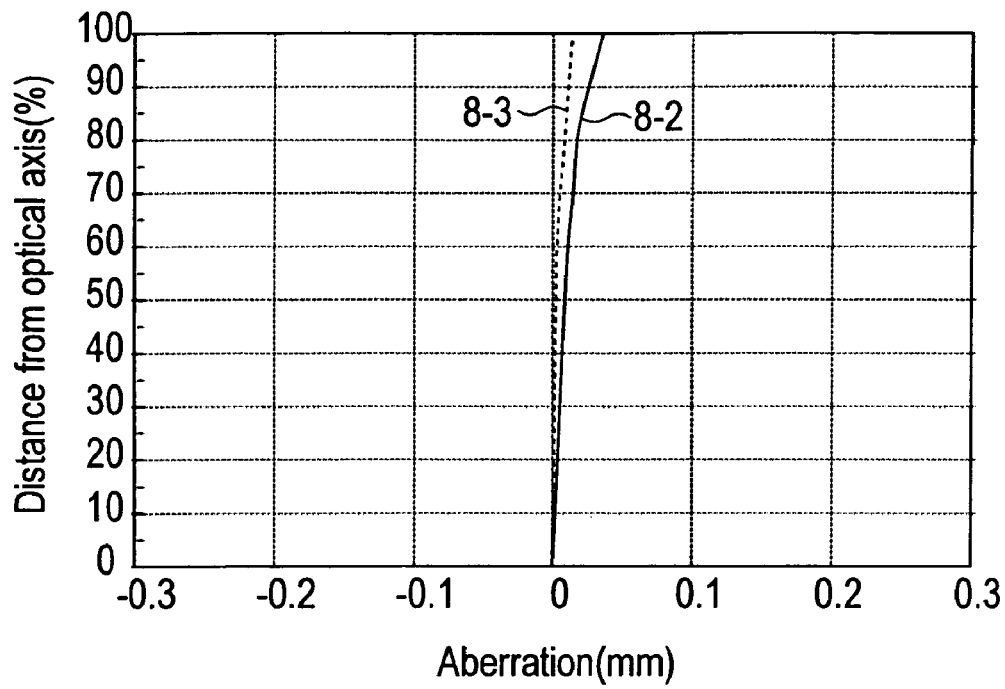
FIG. 39 is a graph depicting the astigmatism aberration of the imaging lens of Embodiment 8.
Figure 40:
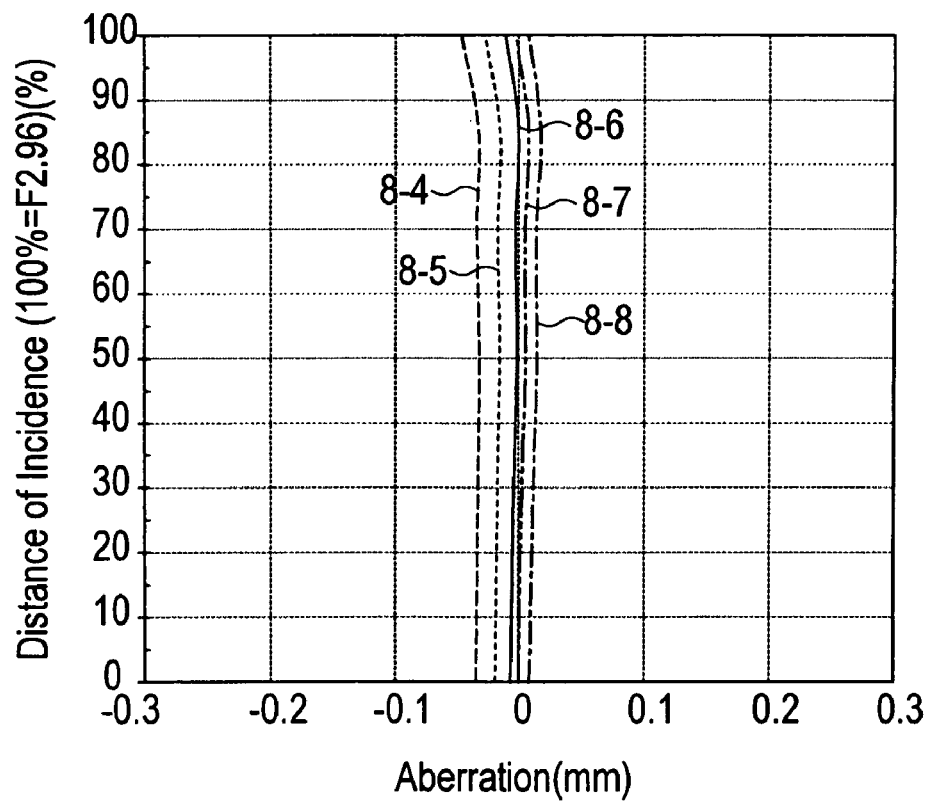
FIG. 40 is a graph depicting the chromatic/spherical aberration of the imaging lens of Embodiment 8.

FIG. 38 shows a graph of the distortion aberration curve 8-1, FIG. 39 shows a graph of the astigmatism aberration curve (aberration curve 8-2 on the meridional surface and the aberration curve 8-3 on the sagittal surface), FIG. 40 shows a graph of a chromatic/spherical aberration curve (aberration curve 8-4 on g-line, aberration curve 8-5 on F-line, aberration curve 8-6 on e-line, aberration curve 8-7 on d-line and aberration curve 8-8 on C-line).

The ordinates of the aberration curve in FIG. 38 and FIG. 39 show the image height by a % of the distance from the optical axis. In FIG. 38 and FIG. 39, 100% corresponds to 0.631 mm. The ordinate of the aberration curve in FIG. 40 shows the entrance height h (F number), and the maximum thereof corresponds to 2.96. The abscissa of FIG. 38 shows the aberration (%), and the abscissas of FIG. 39 and FIG. 40 show a value of the aberrations (mm).

For the distortion aberration, the absolute value of the aberration is 0.74%, which is the maximum, at the position of 100% image height (image height: 0.631 mm), and the absolute value of the aberration is within 0.74% in a range where the image height is 0.631 mm or less.

For the astigmatism aberration, the absolute value of the aberration on the meridional surface is 0.0362 mm, which is the maximum, at the position of 100% image height (image height: 0.631 mm), and the absolute value of the aberration is within 0.0362 mm in a range where the image height is 0.631 mm or less.

For the chromatic/spherical aberration, the absolute value of the aberration curve 8-4 on the g-line is 0.0470 mm, which is the maximum, at 100% entrance height h, and the absolute value of the aberration is within 0.0470 mm.

Therefore according to the imaging lens of Embodiment 8, the optical length can be short enough to be installed in a portable telephone, the back focus can be long enough to insert such components as a filter and a cover glass between the imaging lens and the image sensing plane, and good images can be acquired.

Embodiment 9

Figure 41:
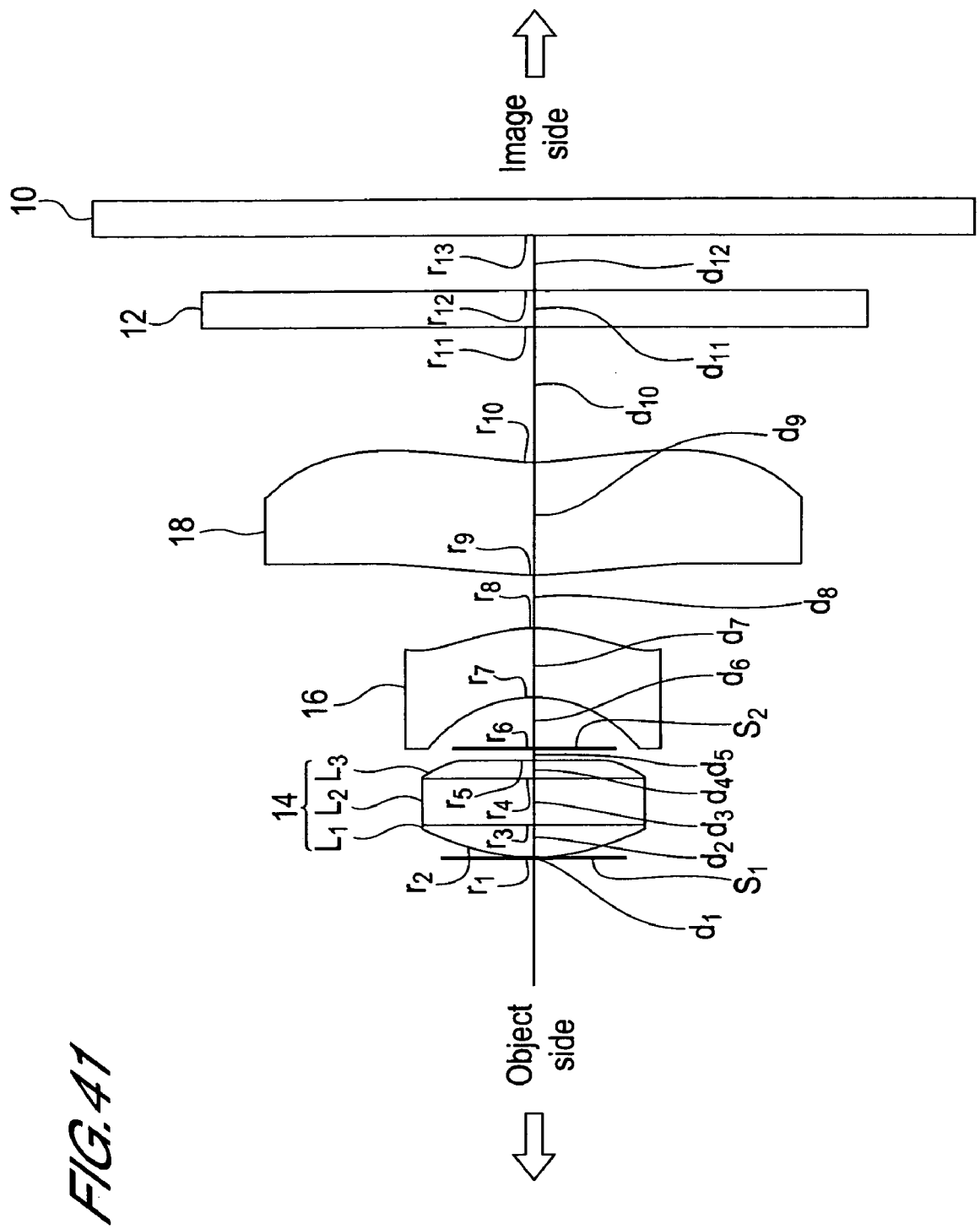
FIG. 41 is a diagram depicting a configuration of an imaging lens of Embodiment 9.
Figure 42:
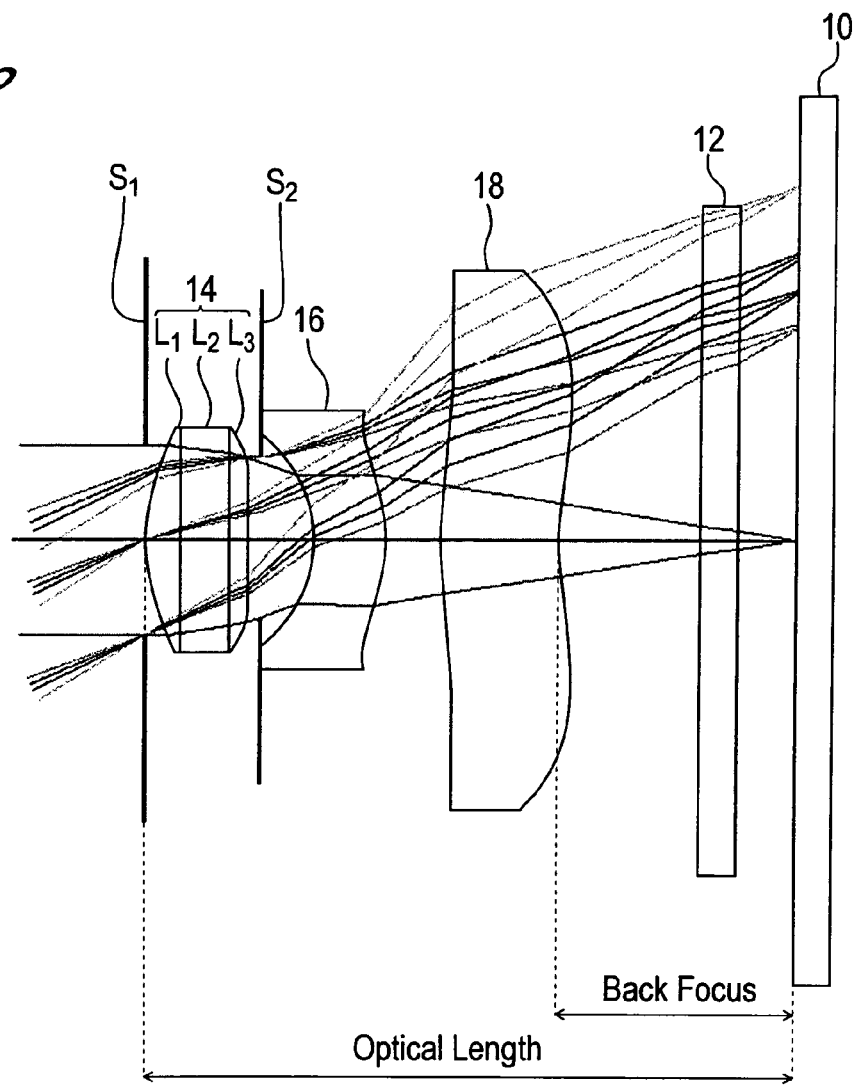
FIG. 42 is a diagram depicting optical paths of the imaging lens of Embodiment 9.

The imaging lens of Embodiment 9 is an imaging lens of the second aspect of the present invention, and the embodiment of the sixth imaging lens of the present invention, comprising an aperture stop (first diaphragm) $S_1$, a first lens 14, a second diaphragm $S_2$, a second lens 16 and a third lens 18 which are arranged in this sequence from the object side to the image side, as shown in FIG. 41 and FIG. 42.

A single lens is used for the second lens 16 and the third lens 18. The first lens 14 is a junction type compound lens where a first sub-lens $L_1$, a second sub-lens $L_2$ and a third sub-lens $L_3$ are arranged in this sequence from the object side to the image side, the first sub-lens $L_1$ and the second sub-lens $L_2$ are bonded, and the second sub-lens $L_2$ and the third sub-lens $L_3$ are bonded.

In the imaging lens of Embodiment 9, the first sub-lens $L_1$ and the third sub-lens $L_3$ are formed of a curable resin material SR-7010 (made by Dow Corning Toray Co., Ltd.). The second sub-lens $L_2$ and the third lens 18 are formed of the optical glass BK7. The second lens 16 is formed of the curable resin material SMX-7877 (made by Fuji Polymer Industries Co. Ltd.).

(A) The refractive index $N_2$ of the first sub-lens $L_1$ is $N_2=1.53000$.

(B) The refractive index $N_3$ of the second sub-lens $L_2$ is $N_3=1.51633$.

(C) The refractive index $N_4$ of the third sub-lens $L_3$ is $N_4=1.53000$.

(D) The Abbe number $\nu_2$ of the first sub-lens $L_1$ is $\nu_2=35.0$.

(E) The Abbe number $\nu_3$ of the second sub-lens $L_2$ is $\nu_3=64.0$.

(F) The Abbe number $\nu_4$ of the third sub-lens $L_3$ is $\nu_4=35.0$.

Therefore, $|N_3-N_2|=|N_3-N_4|=0.01367$, which satisfies the following Conditions (6-1) and (6-2). Also $|\nu_3-\nu_2|=|\nu_3-\nu_4|=29.0$, which satisfies the following Conditions (6-3) and (6-4).

The Conditions (6-1), (6-2), (6-3) and (6-4) refer to the conditions given by the following Expression (6-1), (6-2), (6-3) and (6-4).

$$0 \leq |N_3-N_2| \leq 0.1 \tag{6-1}$$

$$0 \leq |N_3-N_4| \leq 0.1 \tag{6-2}$$

$$0 \leq |\nu_3-\nu_2| \leq 30.0 \tag{6-3}$$

$$0 \leq |\nu_3-\nu_4| \leq 30.0 \tag{6-4}$$

where $N_2$: refractive index of the first sub-lens $N_3$: refractive index of the second sub-lens $N_4$: refractive index of the third sub-lens $\nu_2$: Abbe number of the first sub-lens $\nu_3$: Abbe number of the second sub-lens $\nu_4$: Abbe number of the third sub-lens FIG. 41 shows a cross-sectional view of the imaging lens of Embodiment 9. As FIG. 41 shows, the first diaphragm $S_1$, which plays a role of the aperture stop, is formed at a position of an intersection of the first surface (surface at the object side) of the first sub-lens $L_1$ constituting the first lens 14 and the optical axis. The second diaphragm $S_2$, which plays a role of preventing a flare or smear is formed between the first lens 14 and the second lens 16.

The diaphragm surface of the first diaphragm $S_1$ is a plane $r_1$, so $r_1=\infty$ is shown in Table 9. The second diaphragm $S_2$ is a plane $r_6$, so $r_6=\infty$ is shown in Table 9. The open F number Fno is 2.96.

As Table 9 shows, $r_3=\infty$ and $r_4=\infty$, so the second sub-lens $L_2$ constituting the first lens 14 is a plane parallel glass plate.

$r_7$ is a negative value and $r_8$ is also a negative value, so the second lens 16 is a meniscus lens of which convex surface faces the image side on a paraxial line. $r_9$ is a positive value and $r_{10}$ is also a positive value, so the third lens 18 is a meniscus lens of which concave surface faces the image side on a paraxial line.

$r_2$ is a positive value, so the first sub-lens $L_1$ constituting the first lens 14 is a plano-convex lens where the object side face of this first sub-lens $L_1$ is a convex surface facing the object side on a paraxial line, and $r_5$ is a negative value, so the third sub-lens $L_3$ is a plano-convex lens where the image side face of this third sub-lens $L_3$ is a convex surface facing the image side on a paraxial line.

As FIG. 42 shows, the optical length L with respect to the focal distance f=1.00 mm is 1.137 mm, and the back focus bf is 0.392 mm.

Figure 43:
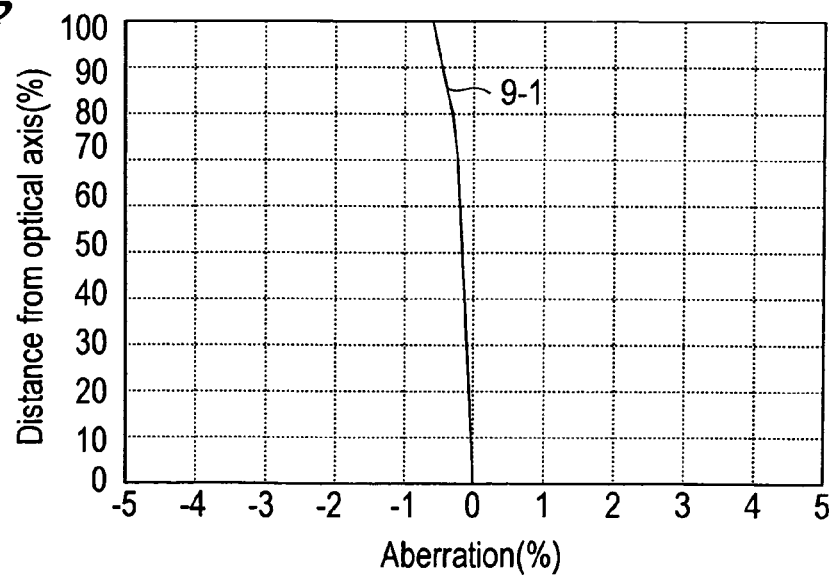
FIG. 43 is a graph depicting the distortion aberration of the imaging lens of Embodiment 9.
Figure 44:
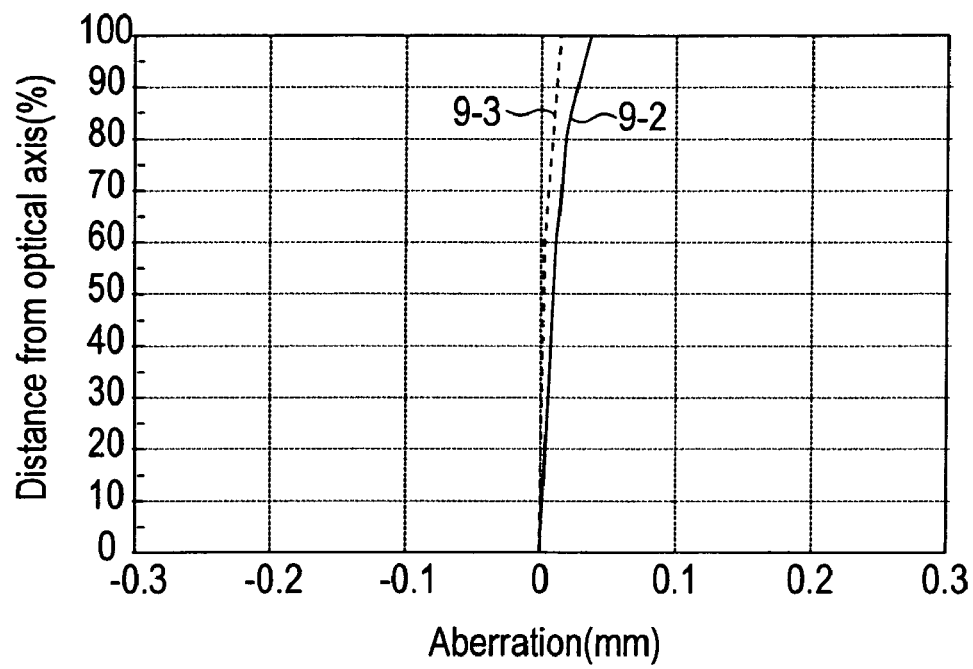
FIG. 44 is a graph depicting the astigmatism aberration of the imaging lens of Embodiment 9.
Figure 45:
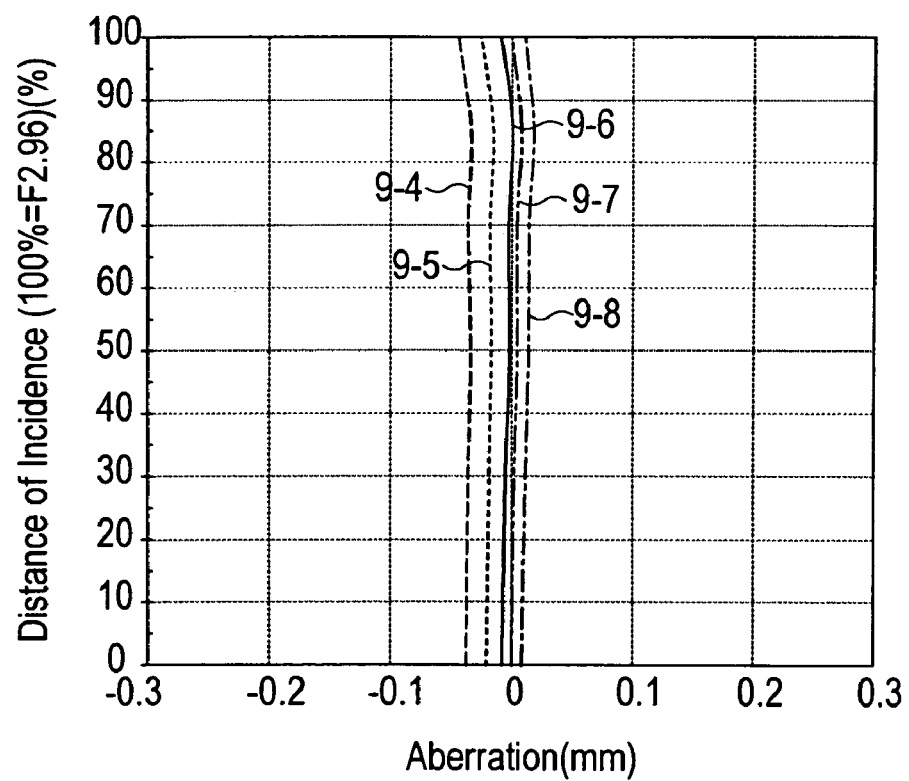
FIG. 45 is a graph depicting the chromatic/spherical aberration of the imaging lens of Embodiment 9.
Figure 46A:
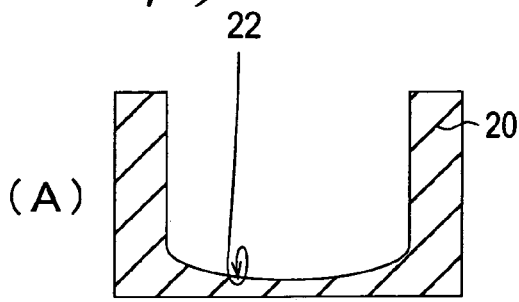
FIG. 46 is a diagram depicting the manufacturing steps of the junction type compound lens.
Figure 46B:
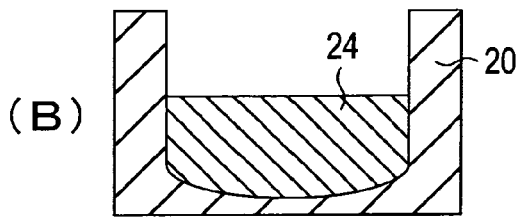
Figure 46C:
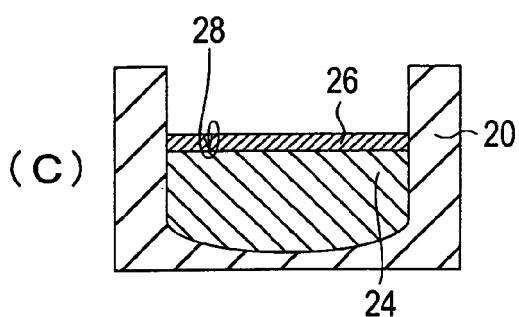
Figure 46D:
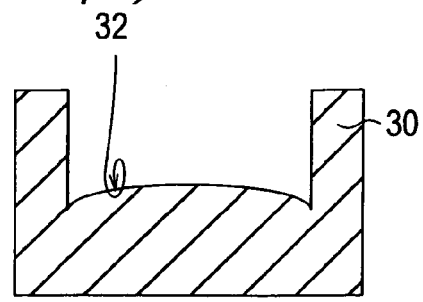
Figure 46E:
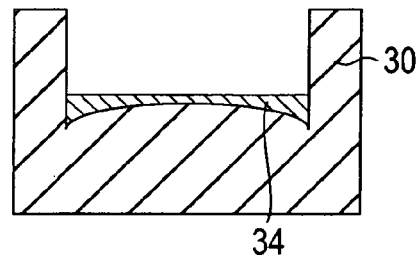
Figure 46F:
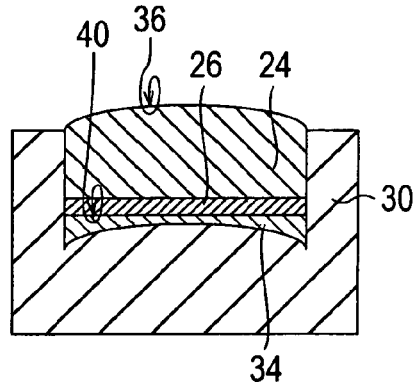
Figure 46G:
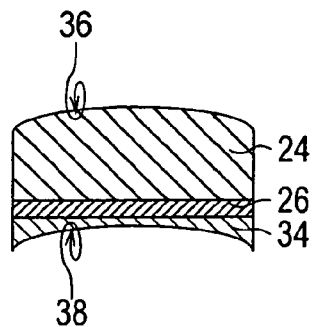

FIG. 43 shows a graph of the distortion aberration curve 9-1, FIG. 44 shows a graph of the astigmatism aberration curve (aberration curve 9-2 on the meridional surface and aberration curve 9-3 on the sagittal surface), FIG. 45 shows a chromatic/spherical aberration curve (aberration curve 9-4 on g-line, aberration curve 9-5 on F-line, aberration curve 9-6 on e-line, aberration curve 9-7 on d-line and aberration curve 9-8 on C-line).

The ordinates of the aberration curve in FIG. 43 and FIG. 44 show the image height by a % of the distance from the optical axis. In FIG. 43 and FIG. 44, 100% corresponds to 0.631 mm. The ordinate of the aberration curve in FIG. 45 shows the entrance height h (F number), and the maximum thereof corresponds to 2.96. The abscissa of FIG. 43 shows the aberration (%), and the abscissas of FIG. 44 and FIG. 45 show a value of the aberrations (mm).

For the distortion aberration, the absolute value of the aberration is 0.60%, which is the maximum, at the position of 100% image height (image height: 0.631 mm), and the absolute value of the aberration is within 0.60% in a range where the image height is 0.631 mm or less.

For the astigmatism aberration, the absolute value of the aberration on the meridional surface is 0.0379 mm, which is the maximum, at the position of 100% image height (image height: 0.631 mm), and the absolute value of the aberration is within 0.0379 mm in a range where the image height is 0.631 mm or less.

For the chromatic/spherical aberration, the absolute value of the aberration curve 9-4 on the g-line is 0.0439 mm, which is the maximum, at the 100% entrance height h, and the absolute value of the aberration is within 0.0439 mm.

Therefore according to the imaging lens of Embodiment 9, the optical length can be short enough to be installed in a portable telephone, the back focus can be long enough to insert such components as a filter and a cover glass between the imaging lens and the image sensing plane, and good images can be acquired.

<Manufacturing Method for Junction Type Compound Lens>

The junction type compound lens is manufactured by directly bonding or indirectly bonding sub-lenses. As mentioned above, this indirect bonding is implemented by using adhesive between sub-lenses. In this case, the first to the third sub-lenses are formed first, then an adhesive is coated onto a surface of the second sub-lens facing the first sub-lens or the third sub-lens, or onto the surface of the first sub-lens or the third sub-lens facing the second sub-lens, and both lenses are contacted.

These indirect bonding methods can be implemented by a known method once the first to the third sub-lenses are formed, so in this section a method for manufacturing the junction type compound lens by direct bonding will be described.

It is also possible to perform coating processing on at least one of the faces of the second sub-lens facing the first sub-lens or the third sub-lens, and both lenses are bonded. In this case, indirect bonding or direct bonding, which is described herein below, can be used after the coating processing.

The manufacturing steps for the junction type compound lens by a direct bonding method will now be described with reference to FIG. 46 (A) to (G). Here the junction type compound lens, comprised of the first sub-lens $L_1$, the second sub-lens $L_2$ and the third sub-lens $L_3$, is described as an example, but the steps are also the same for the junction type compound lens comprised of the fourth sub-lens $L_4$, the fifth sub-lens $L_5$ and the sixth sub-lens $L_6$. In this case, the first sub-lens $L_1$, the second sub-lens $L_2$ and the third sub-lens $L_3$ in the following description can be regarded as the fourth sub-lens $L_4$, the fifth sub-lens $L_5$ and the sixth sub-lens $L_6$ respectively.

FIG. 46 (A) to (G) are diagrams for describing the manufacturing steps of the junction type compound lens. FIG. 46 (A) to (F) show cross-sectional views of a cylindrical die used for forming the first sub-lens and the third sub-lens to be described below, sectioned at a direction along the center line of the cylinder, including this center line. In FIGS. 46 (B), (C), (E) and (F), the silicone resin and optical glass, which are materials constituting the junction type compound lens, are included. FIG. 46 (G) shows a cross-sectional view of the junction type compound lens formed by the manufacturing steps of the junction type compound lens, described with reference to FIGS. 46 (A) to (F), sectioned along the optical axis, including the optical axis.

FIG. 46 (A) is a cross-sectional view of a die 20 for forming the first sub-lens $L_1$ so as to be bonded to the second sub-lens $L_2$. The die 20 is a cylinder where the side wall of the inner face is cylindrical, and the bottom face 22 is a curved surface, which is convex downward, so as to mold the object side face of the first sub-lens $L_1$. In other words, the shape of the bottom face 22 is the same curved shape as the object side face of the first sub-lens $L_1$.

FIG. 46 (B) shows a state when liquid curable silicone resin 24 before curing is injected into the die 20. In the following description on the manufacturing steps of the junction type compound lens, a thermo-setting resin is used as an example, but UV curable resin may be used instead.

Thermo-setting resin refers to a resin which is cured by high temperature during molding. In thermo-setting resin, a side chain branching out of a long chained polymer is linked with a side chain of another polymer, by a cross-link reaction, and the resin is cured when this cross-link reaction progresses by high temperature, and polymers are three-dimensionally linked and no longer move. The cross-link reaction is an irreversible reaction, so cured thermo-setting resin is not softened even if it is heated again.

It is preferable that a filler and an adhesion reinforcement agent are mixed in the thermo-setting resin used for the present invention. This is for maintaining the bonding strength of the first sub-lens $L_1$ and the second sub-lens $L_2$, and the bonding strength of the second sub-lens $L_2$ and the third sub-lens $L_3$ to be a strength that is sufficient to prevent separation during use as an imaging lens.

UV curable resin, on the other hand, generally refers to a resin comprised of monomers, oligomers (which is an intermediate substance between polymers and monomers, and is a main component of resin), photo-initiators and additives. If ultraviolet is irradiated onto this mixture, the photo-initiators are transformed from a monomer (which is a diluent of the resin and constitutes a part of resin after curing) state, that is liquid, into a polymer state, that is solid, by a photo-polymerization reaction. It is also preferable that fillers and adhesion reinforcement agents are mixed in the UV curable resin, just like the above mentioned case of thermo-setting resin.

FIG. 46 (C) shows a state when one surface of the optical glass 26 to be the second sub-lens $L_2$ and the surface 28 of the transparent curable silicone resin 24 in a liquid state before curing are contacted. In this state, the temperature of the die 20 is increased to the curing temperature of the transparent curable silicone resin 24, so as to cure the transparent curable silicone resin 24. After the transparent curable silicone resin 24 is cured by heat, the die 20 is cooled, and the composed lens in a state where the cured transparent curable silicone resin 24 is bonded to the optical glass 26 is extracted. The compound lens in this state is a doublet lens, where the first sub-lens $L_1$ and the second sub-lens $L_2$ are bonded and joined.

The present inventor confirmed that the first sub-lens $L_1$ and the second sub-lens $L_2$, in the above mentioned imaging lenses of Embodiment 1 to Embodiment 6, can be formed so that the bonding strength thereof is maintained to be a strength with which separation does not occur during manufacturing steps and during use as an imaging lens.

FIG. 46 (D) is a cross-sectional view of a die 30 for forming the third sub-lens $L_3$ so as to be bonded to the above mentioned compound lens where the first sub-lens $L_1$ and the second sub-lens $L_2$ are bonded. Just like the above mentioned die 20, the die 30 is a cylinder where the side wall of the inner face is cylindrical, and the bottom face 32 is a curved surface which is convex upward, so as to mold the image side face of the third sub-lens $L_3$. In other words, the shape of the bottom face 32 is the same shape as the curved surface of the image side face of the third sub-lens $L_3$.

FIG. 46 (E) shows a state when transparent curable silicone resin 34 in liquid state before curing is injected into the die 30. For the transparent curable silicone resin 34, the same resin as the above mentioned transparent curable silicone resin 24 may be used, or a different resin may be used. In any case, an appropriate silicone resin is selected based on the convenience of designing the junction type compound lens of the present invention.

FIG. 46 (F) shows a state when the opposite surface of the first sub-lens $L_1$ formation surface of the second sub-lens $L_2$ of the above mentioned compound lens in which the first sub-lens $L_1$ and the second sub-lens $L_2$ are bonded, and the surface 40 of the transparent curable silicone resin 34 in liquid state before curing, are contacted. The compound lens in which the first sub-lens $L_1$ and the second sub-lens $L_2$ are bonded refer to a doublet junction type compound lens comprised of the transparent curable silicone resin 24 and the optical glass 26 (second sub-lens $L_2$).

In the state shown in FIG. 46 (F), the temperature of the die 30 is increased to the curing temperature of the transparent curable silicone resin 34, so as to cure the transparent curable silicone resin 34. At this time, the transparent curable silicone resin 24 has been cured by heat, so the shape does not change even if the temperature is increased to the curing temperature of the transparent curable silicone resin 34.

After the transparent curable silicone resin 34 is cured, the die 30 is cooled, and the junction type compound lens (triplet junction type compound lens of the present invention) in a state where the cured transparent curable silicone resin 34 (formed as the third sub-lens $L_3$) is bonded to the above mentioned doublet junction type compound lens in which the first sub-lens $L_1$ and the second sub-lens $L_2$ are bonded is extracted.

The present inventor confirmed that the second sub-lens $L_2$ and the third sub-lens $L_3$ in the above mentioned imaging lenses of Embodiment 1 to Embodiment 6 can be formed so that the bonding strength thereof is maintained to be a strength with which separation does not occur during manufacturing steps and during use as an imaging lens.

FIG. 46 (G) is a cross-sectional view of the junction type compound lens completed after the above manufacturing steps, sectioned in a direction along the optical axis. The transparent curable silicone resin 24 has become the first sub-lens $L_1$, the optical glass 26 has become the second sub-lens $L_2$, and the transparent curable silicone resin 34 has become the third sub-lens $L_3$. The junction type compound lens shown in FIG. 46 (G) has a shape where the object side face 36 of the first sub-lens is a convex surface facing the object side, and the image side face 38 of the third sub-lens is a concave surface facing the image side.

The manufacturing steps for the junction type compound lens described with reference to FIG. 46 (A) to (G) are the manufacturing steps using a die assuming the case of manufacturing a junction type compound lens in which the second sub-lens $L_2$ is a plane parallel glass plate, the first sub-lens $L_1$ is a plano-convex lens where the object side face 36 of this first sub-lens $L_1$ is a convex surface facing the object side, and the third sub-lens $L_3$ is a plano-concave lens where the image side face 38 of this third sub-lens $L_3$ is a concave surface facing the image side. However, it is obvious that a junction type compound lens of which concave/convex direction of the lens surfaces are different from this can also be manufactured by the same steps. The shape of the object side face 36 of the first sub-lens $L_1$ is determined by the shape of the bottom face 22 of the die 20. The shape of the image side face 38 of the third sub-lens $L_3$ is determined by the shape of the bottom face 32 of the die 30. In other words, the respective bottom shape of the die 20 and the die 30 can be matched with the shape of the object side face 36 of the first sub-lens $L_1$ and the shape of the image side face 38 of the third sub-lens $L_3$.

In the manufacturing steps of the junction type compound lens described with reference to FIG. 46 (A) to (G), the first sub-lens and the third sub-lens are formed of the thermo-setting resin, and a temperature controller for increasing the temperatures of the die 20 and the die 30 and for processing is required. The configuration of the temperature controller is a design issue of the manufacturing device for the junction type compound lens, therefore the temperature controller is omitted in FIG. 46 (A) to (G).

To form the first sub-lens $L_1$ and the third sub-lens $L_3$ using a UV curable resin, the manufacturing device for the junction type compound lens should be designed so that ultraviolet can be irradiated onto the UV curable resin from an area above the die 20 and die 30.

The invention claimed is:

1. An imaging lens, comprising a first lens, a second lens and a third lens, wherein
one of said first lens, said second lens and said third lens is a single lens formed of a curable resin material or a high softening temperature optical lens formation material,
one of the remaining two lenses is a junction type compound lens comprising three sub-lenses, which are, a first sub-lens, a second sub-lens and a third sub-lens bonded in this sequence, and the other one of the two lenses is a junction type compound lens further comprising three sub-lenses, which are, a fourth sub-lens, a fifth sub-lens and a sixth sub-lens bonded in this sequence,
in each of said two junction type compound lenses,
said first sub-lens and said third sub-lens are formed of a curable resin material,
said second sub-lens is formed of a high softening temperature optical lens formation material, said fourth sub-lens and said sixth sub-lens are formed of a curable resin material, and said fifth sub-lens is formed of a high softening temperature optical lens formation material, and the following Conditions (a-1) to (a-8) are satisfied:

$$0 \leq |N_2 - N_1| \leq 0.1 \tag{a-1}$$

$$0 \leq |N_2 - N_3| \leq 0.1 \tag{a-2}$$

$$0 \leq |\nu_2 - \nu_1| \leq 30.0 \tag{a-3}$$

$$0 \leq |\nu_2 - \nu_3| \leq 30.0 \tag{a-4}$$

$$0 \leq |N_5 - N_4| \leq 0.1 \tag{a-5}$$

$$0 \leq |N_5 - N_6| \leq 0.1 \tag{a-6}$$

$$0 \leq |\nu_5 - \nu_4| \leq 30.0 \tag{a-7}$$

$$0 \leq |\nu_5 - \nu_6| \leq 30.0 \tag{a-8}$$

where
$N_1$: refractive index of said first sub-lens
$N_2$: refractive index of said second sub-lens
$N_3$: refractive index of said third sub-lens
$\nu_1$: Abbe number of said first sub-lens
$\nu_2$: Abbe number of said second sub-lens
$\nu_3$: Abbe number of said third sub-lens
$N_4$: refractive index of said fourth sub-lens
$N_5$: refractive index of said fifth sub-lens
$N_6$: refractive index of said sixth sub-lens
$\nu_4$: Abbe number of said fourth sub-lens
$\nu_5$: Abbe number of said fifth sub-lens
$\nu_6$: Abbe number of said sixth sub-lens.

2. An imaging lens, comprising a first lens, a second lens and a third lens, wherein
two lenses of said first lens, said second lens and said third lens are single lenses formed of a curable resin material or a high softening temperature optical lens formation material, and the remaining one lens is a junction type compound lens comprising a first sub-lens, a second sub-lens and a third sub-lens bonded in this sequence, and
in said junction type compound lens,
said first sub-lens and said third sub-lens are formed of a curable resin material,
said second sub-lens is formed of a high softening temperature optical lens formation material, and
the following Conditions (b-1) to (b-4) are satisfied:

$$0 \leq |N_2 - N_1| \leq 0.1 \tag{b-1}$$

$$0 \leq |N_2 - N_3| \leq 0.1 \tag{b-2}$$

$$0 \leq |\nu_2 - \nu_1| \leq 30.0 \tag{b-3}$$

$$0 \leq |\nu_2 - \nu_3| \leq 30.0 \tag{b-4}$$

where
$N_1$: refractive index of said first sub-lens
$N_2$: refractive index of said second sub-lens
$N_3$: refractive index of said third sub-lens
$\nu_1$: Abbe number of said first sub-lens
$\nu_2$: Abbe number of said second sub-lens
$\nu_3$: Abbe number of said third sub-lens.

3. An imaging lens, comprising a first lens, an aperture stop, a second lens and a third lens, wherein
said first lens, said aperture stop, said second lens and said third lens are arranged in this sequence from an object side to an image side,
said first lens is a meniscus type single lens, a convex surface of which faces the object side on a paraxial line,
said second lens is a junction type compound lens where a first sub-lens, a second sub-lens and a third sub-lens are arranged in this sequence from the object side to the image side, and said first sub-lens and said second sub-lens are bonded, and said second sub-lens and said third sub-lens are bonded,
said third lens is a junction type compound lens where a fourth sub-lens, a fifth sub-lens and a sixth sub-lens are arranged in this sequence from the object side to the image side, and said fourth sub-lens and said fifth sub-lens are bonded, and said fifth sub-lens and said sixth sub-lens are bonded,
said first lens is formed of a curable resin material or a high softening temperature optical lens formation material,
said first sub-lens, said third sub-lens, said fourth sub-lens and said sixth sub-lens are formed of a curable resin material,
said second sub-lens and said fifth sub-lens are formed of a high softening temperature optical lens formation material, and
the following Conditions (1-1) to (1-8) are satisfied:

$$0 \leq |N_5 - N_4| \leq 0.1 \tag{1-1}$$

$$0 \leq |N_5 - N_6| \leq 0.1 \tag{1-2}$$

$$0 \leq |\nu_5 - \nu_4| \leq 30.0 \tag{1-3}$$

$$0 \leq |\nu_5 - \nu_6| \leq 30.0 \tag{1-4}$$

$$0 \leq |N_9 - N_8| \leq 0.1 \tag{1-5}$$

$$0 \leq |N_9 - N_{10}| \leq 0.1 \tag{1-6}$$

$$0 \leq |\nu_9 - \nu_8| \leq 30.0 \tag{1-7}$$

$$0 \leq |\nu_9 - \nu_{10}| \leq 0.0 \tag{1-8}$$

where
$N_4$: refractive index of said first sub-lens
$N_5$: refractive index of said second sub-lens
$N_6$: refractive index of said third sub-lens
$\nu_4$: Abbe number of said first sub-lens
$\nu_5$: Abbe number of said second sub-lens
$\nu_6$: Abbe number of said third sub-lens
$N_8$: refractive index of said fourth sub-lens
$N_9$: refractive index of said fifth sub-lens
$N_{10}$: refractive index of said sixth sub-lens
$\nu_8$: Abbe number of said fourth sub-lens
$\nu_9$: Abbe number of said fifth sub-lens
$\nu_{10}$: Abbe number of said sixth sub-lens.

4. The imaging lens according to claim 3, wherein
said second sub-lens is a plane parallel glass plate;
said first sub-lens is a plano-concave lens where the object side face of said first sub-lens is a concave surface that faces the object side on a paraxial line,
said third sub-lens is a plano-convex lens where the image side face of said third sub-lens is a convex surface that faces the image side on a paraxial line,
said fifth sub-lens is a plane parallel glass plate;
said fourth sub-lens is a plano-convex lens where the object side face of said fourth sub-lens is a convex surface that faces the object side on a paraxial line, and
said sixth sub-lens is a plano-concave lens where the image side face of said sixth sub-lens is a concave surface that faces the image side on a paraxial line.

5. The imaging lens according to claim 3, wherein
said second sub-lens is a meniscus lens of which convex surface faces the image side,
said first sub-lens is a lens where the object side face of said first sub-lens is a concave surface that faces the object side on a paraxial line,
said third sub-lens is a lens where the image side face of said third sub-lens is a convex surface that faces the image side on a paraxial line,
said fifth sub-lens is a biconvex lens of which both side faces are convex surfaces,
said fourth sub-lens is a lens where the object side face of said fourth sub-lens is a convex surface that faces the object side on a paraxial line, and
said sixth sub-lens is a lens where the image side face of said sixth sub-lens is a concave surface that faces the image side on a paraxial line.

6. An imaging lens, comprising an aperture stop (first diaphragm), a first lens, a second diaphragm, a second lens and a third lens, wherein
said aperture stop, said first lens, said second diaphragm, said second lens and said third lens are arranged in this sequence from an object side to an image side,
said first lens is a junction type compound lens, where a first sub-lens, a second sub-lens and a third sub-lens are arranged in this sequence from the object side to the image side, said first sub-lens and said second sub-lens are bonded, and said second sub-lens and said third sub-lens are bonded,
said second lens is a meniscus type single lens, of which convex surface faces the image side on a paraxial line,
said third lens is a junction type compound lens, where a fourth sub-lens, a fifth sub-lens and a sixth sub-lens are arranged in this sequence from the object side to the image side, said fourth sub-lens and said fifth sub-lens are bonded, and said fifth sub-lens and said sixth sub-lens are bonded,
said second lens is formed of a curable resin material or a high softening temperature optical lens formation material,
said first sub-lens, said third sub-lens, said fourth sub-lens and said sixth sub-lens are formed of a curable resin material,
said second sub-lens and said fifth sub-lens are formed of a high softening temperature optical lens formation material, and
the following Conditions (2-1) to (2-8) are satisfied:

$$0 \leq |N_3-N_2| \leq \qquad (2\text{-}1)$$

$$0 \leq |N_3-N_4| \leq 0.1 \qquad (2\text{-}2)$$

$$0 \leq |v_3-v_2| \leq 30.0 \qquad (2\text{-}3)$$

$$0 \leq |v_3-v_4| \leq 30.0 \qquad (2\text{-}4)$$

$$0 \leq |N_{10}-N_9| \leq 0.1 \qquad (2\text{-}5)$$

$$0 \leq |N_{10}-N_{11}| \leq 0.1 \qquad (2\text{-}6)$$

$$0 \leq |v_{10}-v_9| \leq 30.0 \qquad (2\text{-}7)$$

$$0 \leq |v_{10}-v_{11}| \leq 30.0 \qquad (2\text{-}8)$$

where
$N_2$: refractive index of said first sub-lens
$N_3$: refractive index of said second sub-lens
$N_4$: refractive index of said third sub-lens
$v_2$: Abbe number of said first sub-lens
$v_3$: Abbe number of said second sub-lens
$v_4$: Abbe number of said third sub-lens
$N_9$: refractive index of said fourth sub-lens
$N_{10}$: refractive index of said fifth sub-lens
$N_{11}$: refractive index of said sixth sub-lens
$v_9$: Abbe number of said fourth sub-lens
$v_{10}$: Abbe number of said fifth sub-lens
$v_{11}$: Abbe number of said sixth sub-lens.

7. The imaging lens according to claim 6, wherein
said second sub-lens is a plane parallel glass plate,
said first sub-lens is a plano-convex lens where the object side face of said first sub-lens is a convex surface that faces the object side on a paraxial line,
said third sub-lens is a plano-convex lens where the image side face of said third sub-lens is a convex surface that faces the image side on a paraxial line,
said fifth sub-lens is a plane parallel glass plate,
said fourth sub-lens is a piano-convex lens where the object side face of said fourth sub-lens is a convex surface that faces the object side on a paraxial line, and
said sixth sub-lens is a plano-concave lens where the image side face of said sixth sub-lens is a concave surface that faces the image side on a paraxial line.

8. The imaging lens according to claim 6, wherein
said second sub-lens is a biconvex lens of which both side faces are convex surfaces,
said first sub-lens is a lens where the object side face of said first sub-lens is a convex surface that faces the object side on a paraxial line,
said third sub-lens is a lens where the image side face of said third sub-lens is a convex surface that faces the image side on a paraxial line,
said fifth sub-lens is a meniscus lens of which convex surface faces the image side,
said fourth sub-lens is a lens where the object side face of said fourth sub-lens is a convex surface that faces the object side on a paraxial line, and
said sixth sub-lens is a lens where the image side face of said sixth sub-lens is a concave surface that faces the image side on a paraxial line.

9. An imaging lens, comprising an aperture stop (first diaphragm), a first lens, a second diaphragm, a second lens and a third lens, wherein
said aperture stop, said first lens, said second diaphragm, said second lens and said third lens are arranged in this sequence from an object side to an image side,
said first lens is a junction type compound lens, where a first sub-lens, a second sub-lens and a third sub-lens are arranged in this sequence from the object side to the image side, said first sub-lens and said second sub-lens are bonded, and said second sub-lens and said third sub-lens are bonded,
said second lens is a junction type compound lens, where a fourth sub-lens, a fifth sub-lens and a sixth sub-lens are arranged in this sequence from the object side to the image side, said fourth sub-lens and said fifth sub-lens are bonded, and said fifth sub-lens and said sixth sub-lens are bonded,
said third lens is a meniscus type single lens, of which concave surface faces the image side on a paraxial line,
said first sub-lens, said third sub-lens, said fourth sub-lens and said sixth sub-lens are formed of a curable resin material,
said second sub-lens and said fifth sub-lens are formed of a high softening temperature optical lens formation material, said third lens is formed of a curable resin material or high softening temperature optical lens formation material, and the following Conditions (3-1) to (3-8) are satisfied:

$$0 \leq |N_3-N_2| \leq 0.1 \quad (3\text{-}1)$$

$$0 \leq |N_3-N_4| \leq 0.1 \quad (3\text{-}2)$$

$$0 \leq |\nu_3-\nu_2| \leq 30.0 \quad (3\text{-}3)$$

$$0 \leq |\nu_3-\nu_4| \leq 30.0 \quad (3\text{-}4)$$

$$0 \leq |N_8-N_7| \leq 0.1 \quad (3\text{-}5)$$

$$0 \leq |N_8-N_9| \leq 0.1 \quad (3\text{-}6)$$

$$0 \leq |\nu_8-\nu_7| \leq 30.0 \quad (3\text{-}7)$$

$$0 \leq |\nu_8-\nu_9| \leq 30.0 \quad (3\text{-}8)$$

where
$N_2$: refractive index of said first sub-lens
$N_3$: refractive index of said second sub-lens
$N_4$: refractive index of said third sub-lens
$\nu_2$: Abbe number of said first sub-lens
$\nu_3$: Abbe number of said second sub-lens
$\nu_4$: Abbe number of said third sub-lens
$N_7$: refractive index of said fourth sub-lens
$N_8$: refractive index of said fifth sub-lens
$N_9$: refractive index of said sixth sub-lens
$\nu_7$: Abbe number of said fourth sub-lens
$\nu_8$: Abbe number of said fifth sub-lens
$\nu_9$: Abbe number of said sixth sub-lens.

10. The imaging lens according to claim 9, wherein
said second sub-lens is a plane parallel glass plate,
said first sub-lens is a plano-convex lens where the object side face of said first sub-lens is a convex surface that faces the object side on a paraxial line,
said third sub-lens is a plano-convex lens where the image side face of said third sub-lens is a convex surface that faces the image side on a paraxial line,
said fifth sub-lens is a plane parallel glass plate,
said fourth sub-lens is a plano-concave lens where the object side face of said fourth sub lens is a concave surface that faces the object side on a paraxial line, and
said sixth sub-lens is a plano-convex lens where the image side face of said sixth sub-lens is a convex surface that faces the image side on a paraxial line.

11. The imaging lens according to claim 9, wherein
said second sub-lens is a biconvex lens of which both side faces are convex surfaces,
said first sub-lens is a lens where the object side face of said first sub-lens is a convex surface that faces the object side on a paraxial line,
said third sub-lens is a lens where the image side face of said third sub-lens is the convex surface that faces the image side on a paraxial line,
said fifth sub-lens is a meniscus lens of which convex surface faces the image side,
said fourth sub-lens is a lens where the object side face of said fourth sub-lens is a concave surface that faces the object side on a paraxial line, and
said sixth sub-lens is a lens where the image side face of said sixth sub-lens is a convex surface that faces the image side on a paraxial line.

12. An imaging lens, comprising a first lens, an aperture step, a second lens and a third lens, wherein
said first lens, said aperture stop, said second lens and said third lens are arranged in this sequence from an object side to an image side,
said first lens is a meniscus type single lens of which convex surface faces the object side on a paraxial line,
said second lens is a meniscus type single lens of which convex surface faces the image side on a paraxial line,
said third lens is a junction type compound lens where a first sub-lens, a second sub-lens and a third sub-lens are arranged in this sequence from the object side to the image side, and said first sub-lens and said second sub-lends are bonded, and said second sub-lens and said third sub-lens are bonded,
said first lens, said second lens, said first sub-lens and said third sub-lens are formed of a curable resin material,
said second sub-lens is formed of a high softening temperature optical lens formation material, and the following Conditions (4-1) to (4-4) are satisfied:

$$0 \leq |N_7-N_6| \leq 0.1 \quad (4\text{-}1)$$

$$0 \leq |N_7-N_8| \leq 0.1 \quad (4\text{-}2)$$

$$0 \leq |\nu_7-\nu_6| \leq 30.0 \quad (4\text{-}3)$$

$$0 \leq |\nu_7-\nu_8| \leq 30.0 \quad (4\text{-}4)$$

where
$N_6$: refractive index of said first sub-lens
$N_7$: refractive index of said second sub-lens
$N_8$: refractive index of said third sub-lens
$\nu_6$: Abbe number of said first sub-lens
$\nu_7$: Abbe number of said second sub-lens
$\nu_8$: Abbe number of said third sub-lens.

13. The imaging lens according to claim 12, wherein
said second sub-lens is a plane parallel glass plate,
said first sub-lens is a plano-convex lens where the object side face of said first sub-lens is a convex surface that faces the object side on a paraxial line, and
said third sub-lens is a piano-concave lens where the image side face of said third sub-lens is a concave surface that faces the image side on a paraxial line.

14. An imaging lens, comprising an aperture stop (first diaphragm), a first lens, a second diaphragm, a second lens and a third lens, wherein
said aperture stop, said first lens, said second diaphragm, said second lens and said third lens are arranged in this sequence from the object side to the image side,
said first lens is a biconvex lens of which both side faces are convex surfaces,
said second lens is a junction type compound lens, where a first sub-lens, a second sub-lens and a third sub-lens are arranged in this sequence from the object side to the image side, said first sub-lens and said second sub-lens are bonded, and said second sub-lens and said third sub-lens are bonded,
said third lens is a meniscus type single lens of which concave surface faces the image side on a paraxial line,
said first lens, said first sub-lens and said third sub-lens are formed of a curable resin material, said second sub-lens and said third lens are formed of a high softening temperature optical lens formation material, and the following Conditions (5-1) to (5-4) are satisfied:

$0 \leq |N_6 - N_5| \leq 0.1$ (5-1)

$0 \leq |N_6 - N_7| \leq 0.1$ (5-2)

$0 \leq |\nu_6 - \nu_5| \leq 30.0$ (5-3)

$0 \leq |\nu_6 - \nu_7| \leq 30.0$ (5-4)

where
$N_5$: refractive index of said first sub-lens
$N_6$: refractive index of said second sub-lens
$N_7$: refractive index of said third sub-lens
$\nu_5$: Abbe number of said first sub-lens
$\nu_6$: Abbe number of said second sub-lens
$\nu_7$: Abbe number of said third sub-lens.

15. The imaging lens according to claim 14, wherein said second sub-lens is a plane parallel glass plates,
said first sub-lens is a plano-concave lens where the object side face of said first sub-lens is a concave surface that faces the object side on a paraxial line, and
said third sub-lens is a piano-convex lens where the image side face of said third sub-lens is a convex surface that faces the image side on a paraxial line.

16. An imaging lens, comprising an aperture stop (first diaphragm), a first lens, a second diaphragm, a second lens and a third lens, wherein
said aperture stop, said first lens, said second diaphragm, said second lens and said third lens are arranged in this sequence from an object side to an image side,
said first lens is a junction type compound lens where a first sub-lens, a second sub-lens and a third sub-lens are arranged in this sequence from the object side to the image side, said first sub-lens and said second sub-lens are bonded, and said second sub-lens and said third sub-lens are bonded,
said second lens is a meniscus type single lens of which convex surface faces the image side on a paraxial line,
said third lens is a meniscus type single lens of which concave surface faces the image side on a paraxial line,
said first sub-lens, said third sub-lens and said second lens are formed of a curable resin material,
said second sub-lens and said third lens are formed of a high softening temperature optical lens formation material, and the following Conditions (6-1)-(6-4) are satisfied:

$0 \leq |N_3 - N_2| \leq 0.1$ (6-1)

$0 \leq |N_3 - N_4| \leq 0.1$ (6-2)

$0 \leq |\nu_3 - \nu_2| \leq 30.0$ (6-3)

$0 \leq |\nu_3 - \nu_4| \leq 30.0$ (6-4)

where
$N_2$: refractive index of said first sub-lens
$N_3$: refractive index of said second sub-lens
$N_4$: refractive index of said third sub-lens
$\nu_2$: Abbe number of said first sub-lens
$\nu_3$: Abbe number of said second sub-lens
$\nu_4$: Abbe number of said third sub-lens.

17. The imaging lens according to claim 16, wherein said second sub-lens is a plane parallel glass plate,
said first sub-lens is a piano-convex lens where the object side face of said first sub-lens is a convex surface that faces the object side on a paraxial line, and
said third sub-lens is a plano-convex lens where the image side face of said third sub-lens is a convex surface that faces the image side on a paraxial line.

18. The imaging lens according to claim 1, wherein the object side face of said first lens, the image side face of said first lens, the object side face of said second lens, the image side face of said second lens, the object side face of said third lens, and the image side face of said third lens are aspherical.

19. The imaging lens according to claim 1, wherein said curable resin material is a transparent curable silicone resin.

* * * * *